US012587678B2

(12) United States Patent
Takahashi et al.

(10) Patent No.: US 12,587,678 B2
(45) Date of Patent: Mar. 24, 2026

(54) INFORMATION PROCESSING APPARATUS AND METHOD THEREOF

(71) Applicant: Sony Group Corporation, Tokyo (JP)

(72) Inventors: Ryohei Takahashi, Tokyo (JP);
Mitsuhiro Hirabayashi, Tokyo (JP)

(73) Assignee: SONY GROUP CORPORATION,
Tokyo (JP)

( * ) Notice: Subject to any disclaimer, the term of this
patent is extended or adjusted under 35
U.S.C. 154(b) by 210 days.

(21) Appl. No.: 18/572,190

(22) PCT Filed: Jun. 29, 2022

(86) PCT No.: PCT/JP2022/025963
§ 371 (c)(1),
(2) Date: Dec. 20, 2023

(87) PCT Pub. No.: WO2023/277062
PCT Pub. Date: Jan. 5, 2023

(65) Prior Publication Data
US 2024/0292026 A1      Aug. 29, 2024

Related U.S. Application Data

(60) Provisional application No. 63/216,603, filed on Jun.
30, 2021.

(51) Int. Cl.
*H04N 19/597*        (2014.01)
*H04N 19/59*         (2014.01)
*H04N 19/96*         (2014.01)

(52) U.S. Cl.
CPC ........... *H04N 19/597* (2014.11); *H04N 19/59*
(2014.11); *H04N 19/96* (2014.11)

(58) Field of Classification Search
None
See application file for complete search history.

(56) References Cited

U.S. PATENT DOCUMENTS

| | | | |
|---|---|---|---|
| 2021/0029187 A1 | 1/2021 | Oh | |
| 2022/0351421 A1* | 11/2022 | Oh | H04N 19/33 |
| 2022/0366611 A1* | 11/2022 | Bai | H04N 21/8146 |

FOREIGN PATENT DOCUMENTS

| | | |
|---|---|---|
| CN | 112492385 A | 3/2021 |
| WO | 2021/049333 A1 | 3/2021 |

OTHER PUBLICATIONS

Emre B. Aksu, "Technologies Under Consideration for Carriage of
Point Cloud Data", Document: N18607, International Organization
for Standardization, ISO/IEC JTC 1/SC 29/WG 11, Coding of
Moving Pictures and Audio, Gothenburg, SE, Jul. 2019, 66 pgs.
(APP,APP) (Year: 2019).*

(Continued)

*Primary Examiner* — Kaitlin A Retallick
(74) *Attorney, Agent, or Firm* — XSENSUS LLP

(57) ABSTRACT

The present disclosure relates to an information processing
apparatus and method capable of suppressing an increase in
load of reproduction processing.
The metadata including the spatial configuration informa-
tion of the subgroup and the dependency information of the
subgroup and the layer-group is generated on the basis of the
bitstream of the geometry of the 3D data, and the file storing
the bitstream and the metadata are generated. Further, on the
basis of the spatial configuration information of the sub-
group and the dependency information of the subgroup and
the layer-group stored in the file as metadata, a bitstream of
the geometry of the 3D data corresponding to the desired
layer-group and the subgroup stored in the file is extracted,
and the extracted bitstream is decoded. The present disclo-
sure can be applied to, for example, an information process-
ing apparatus, an information processing method, or the like.

18 Claims, 44 Drawing Sheets

(56)　　　　　　　References Cited

OTHER PUBLICATIONS

International Search Report and Written Opinion mailed on Sep. 20, 2022, received for PCT Application PCT/JP2022/025963, filed on Jun. 29, 2022, 9 pages including English Translation.

"Information technology—MPEG-I (Coded Representation of Immersive Media)—Part 9: Geometry-based Point Cloud Compression"("Text of ISO/IEC FDIS 23090-9 Geometry-based Point Cloud Compression(draft 8)"), ISO/IEC 23090-9:2020(E), MDS19617, May 18, 2021, pp. 1-162.

"Potential Improvement of ISO/IEC 23090-18 Carriage of Geometry-based Point Cloud Compression Data", ISO/IEC JTC 1/SC 29/WG 03 N0141, MDS19974, Mar. 25, 2021, pp. 1-41.

Oh et al., "[G-PCC][EE13.44] Report on fine granularity slices", ISO/IEC JTC 1/SC 29/WG 7 m56750, Apr. 30, 2021, pp. 1-8.

"Information technology—Coding of audio-visual objects- Part 12: ISO base media file format, Technical Corrigendum 1", ISO/IEC FDIS 14496-12:2020(E), ISO/IEC 14496-12:2015/Cor.1, ISO/IEC JTC1/SC 29/WG 11, Jun. 3, 2016, pp. 1-290.

"Technologies under consideration on carriage of Point Cloud data". 127.MPEG Meeting; Gothenburg; (Motion Picture Expert Group or ISO/IEC JTC1/SC29/WG11), No. n18607, Aug. 26, 2019, XP030206799.

Ryohei Takahashi et al: "On harmonization of partial access metadata", 130. MPEG Meeting; Apr. 20, 2020-Apr. 24, 2020;ALPBACH; (Motion Picture Expert Group or ISO/IEC JTC1/SC29/WG11), No. m53458, Apr. 15, 2020 (Apr. 15, 2020), XP030286996.

Sejin Oh et al: "[40.1] On Encapsulation of G-PCC data in ISOBMFF", 132. MPEG Meeting; Oct. 12, 2020-Oct. 16, 2020: Online; (Motion Picture Expert Group or ISO/IEC JTC1/SC29/WG11), No. m54982 , Oct. 7, 2020 (Oct. 7, 2020), XP030292481.

* cited by examiner

Figure 2:
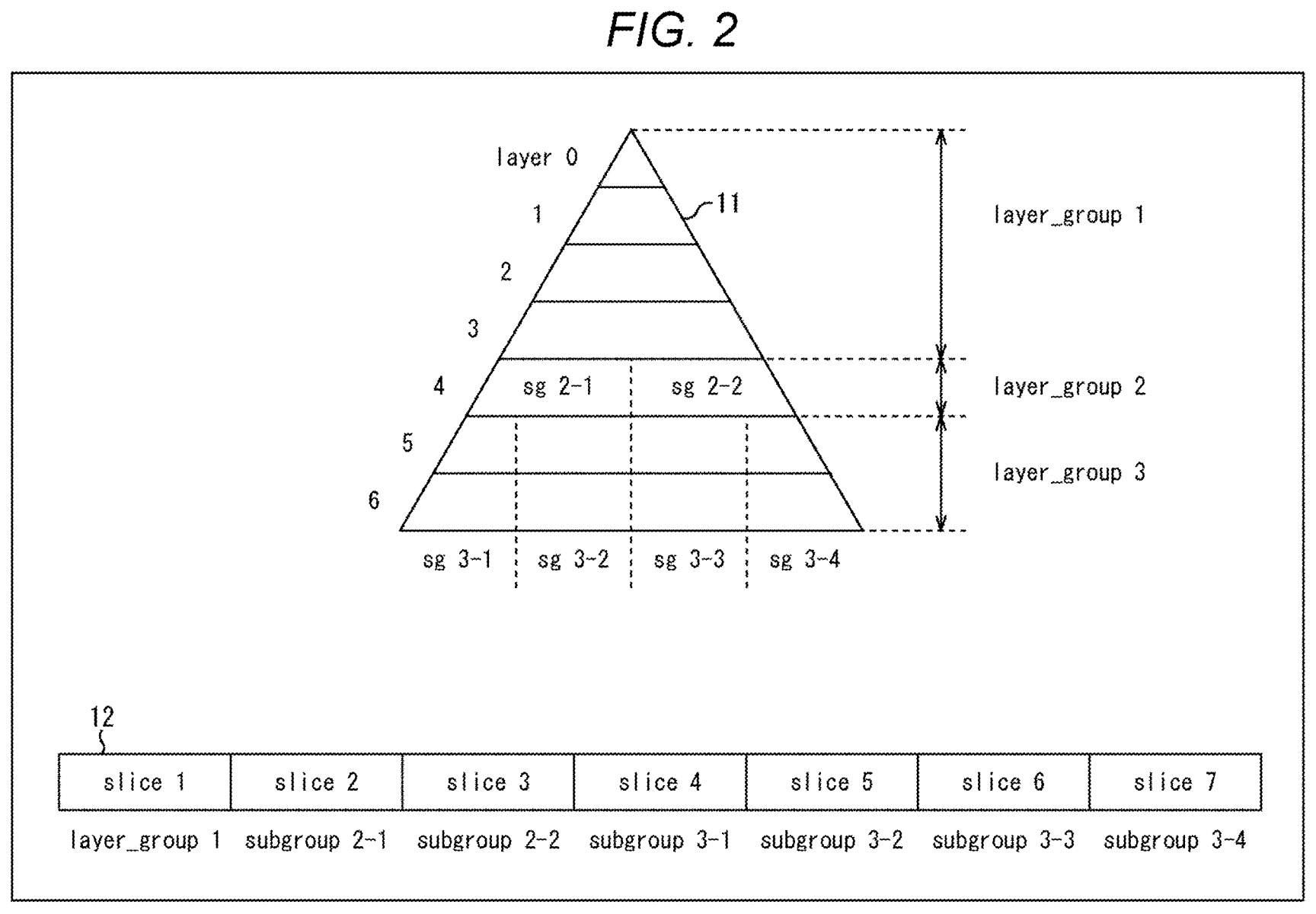

| geometry_data_unit_header ( ) { | Descriptor |
|---|---|
| ...... | |
|   layer_group_enabled_flag | u(1) |
|   if(layer_group_enabled_flag) { | |
|   num_layer_groups_minus1 | u(8) |
|   layer_group_id | u(8) |
|   dependent_slice_flag | u(1) |
|   if(dependent_slice_flag) { | |
|     ref_slice_id | u(8) |
|     ref_layer_group_id | u(8) |
|   } | |
|   num_layers_minus1 | u(8) |
|   layer_group_stream_len_bits | ue(v) |
|   layer_group_stream_len | u(v) |
|   subgroup_enabled_flag | u(1) |
|   if(subgroup_enabled_flag) { | |
|     num_subgroups_minus1 | u(8) |
|     subgroup_id | u(8) |
|     ref_subgroup_id | u(8) |
|   } | |
|   num_points_bits_minus1 | ue(v) |
|   num_points | u(v) |
|   subgroup_bbox_origin_bits_minus1 | ue(v) |
|   for(i=0; i<3; i++) | |
|     subgroup_bbox_origin[i] | u(v) |
|   subgroup_bbox_size_bits_minus1 | ue(v) |
|   for(i=0; i<3; i++) | |
|     subgroup_bbox_size[i] | u(v) |
|   } | |
|   ...... | |
| } | |

Figure 4:
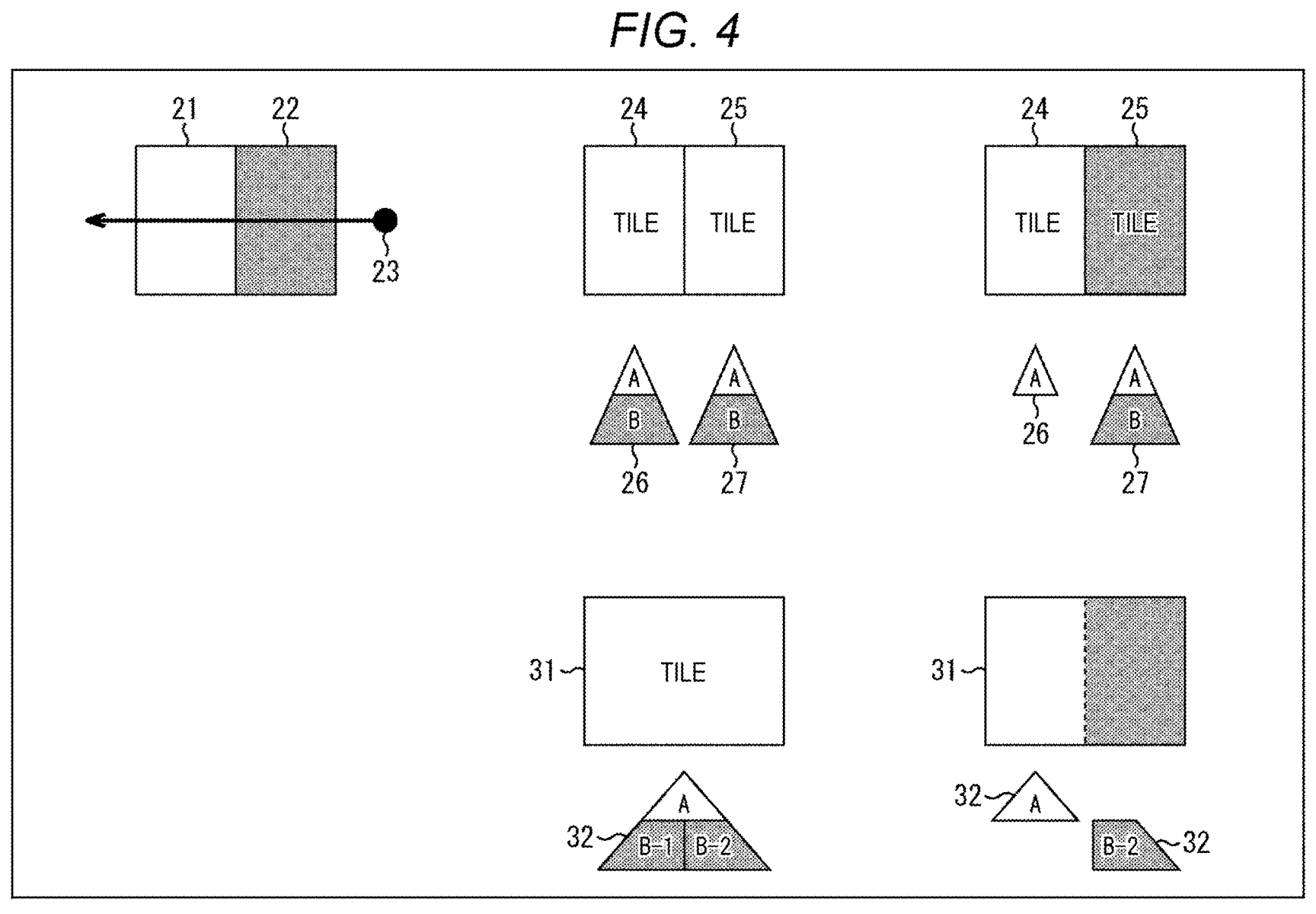

Figure 5:
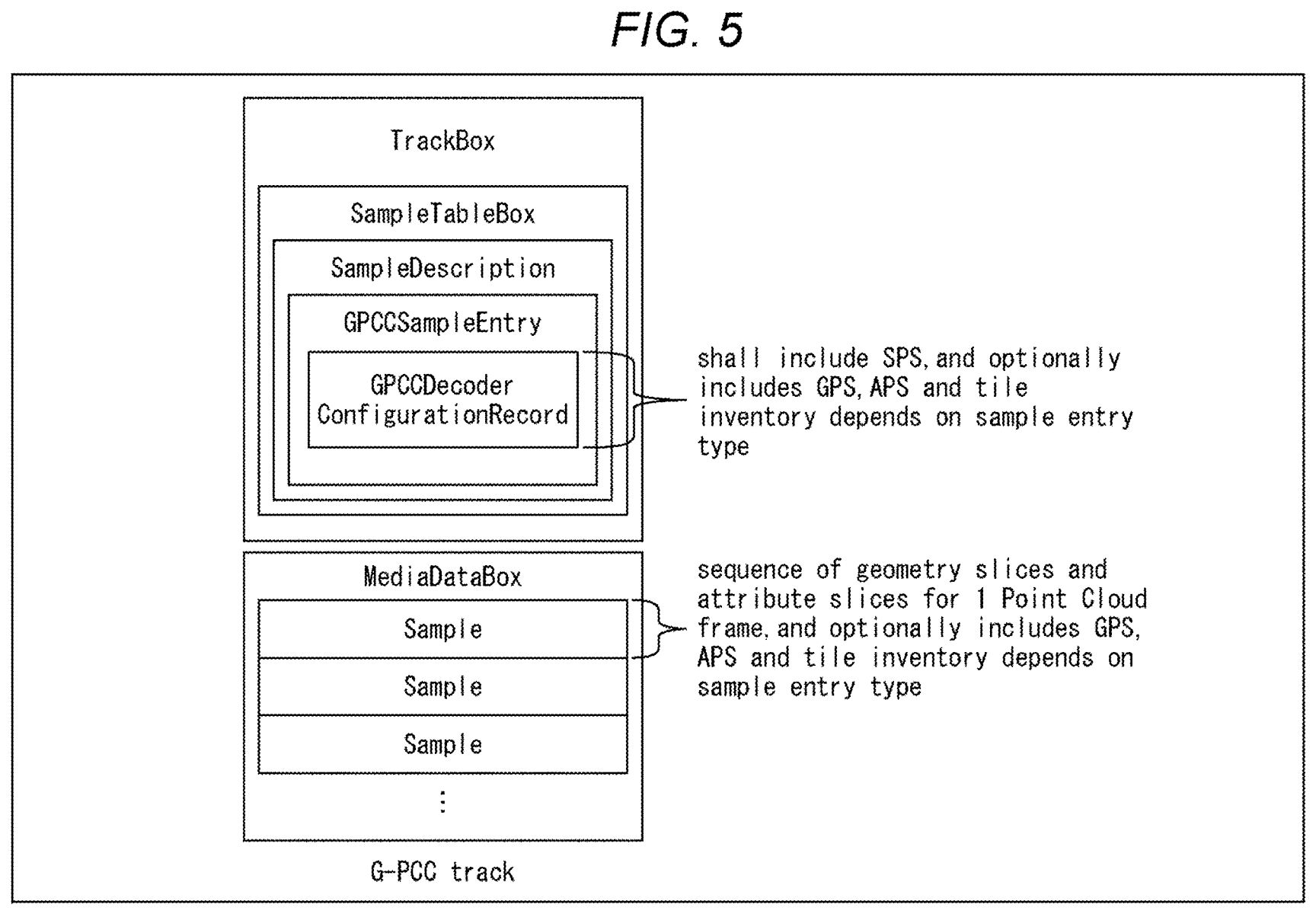

TrackBox

SampleTableBox

SampleDescription

GPCCSampleEntry

GPCCDecoder
ConfigurationRecord shall include SPS, and optionally
includes GPS, APS and tile
inventory depends on sample entry
type MediaDataBox Sample Sample Sample

..

sequence of geometry slices and
attribute slices for 1 Point Cloud
frame, and optionally includes GPS,
APS and tile inventory depends on
sample entry type G-PCC track

*FIG. 6*

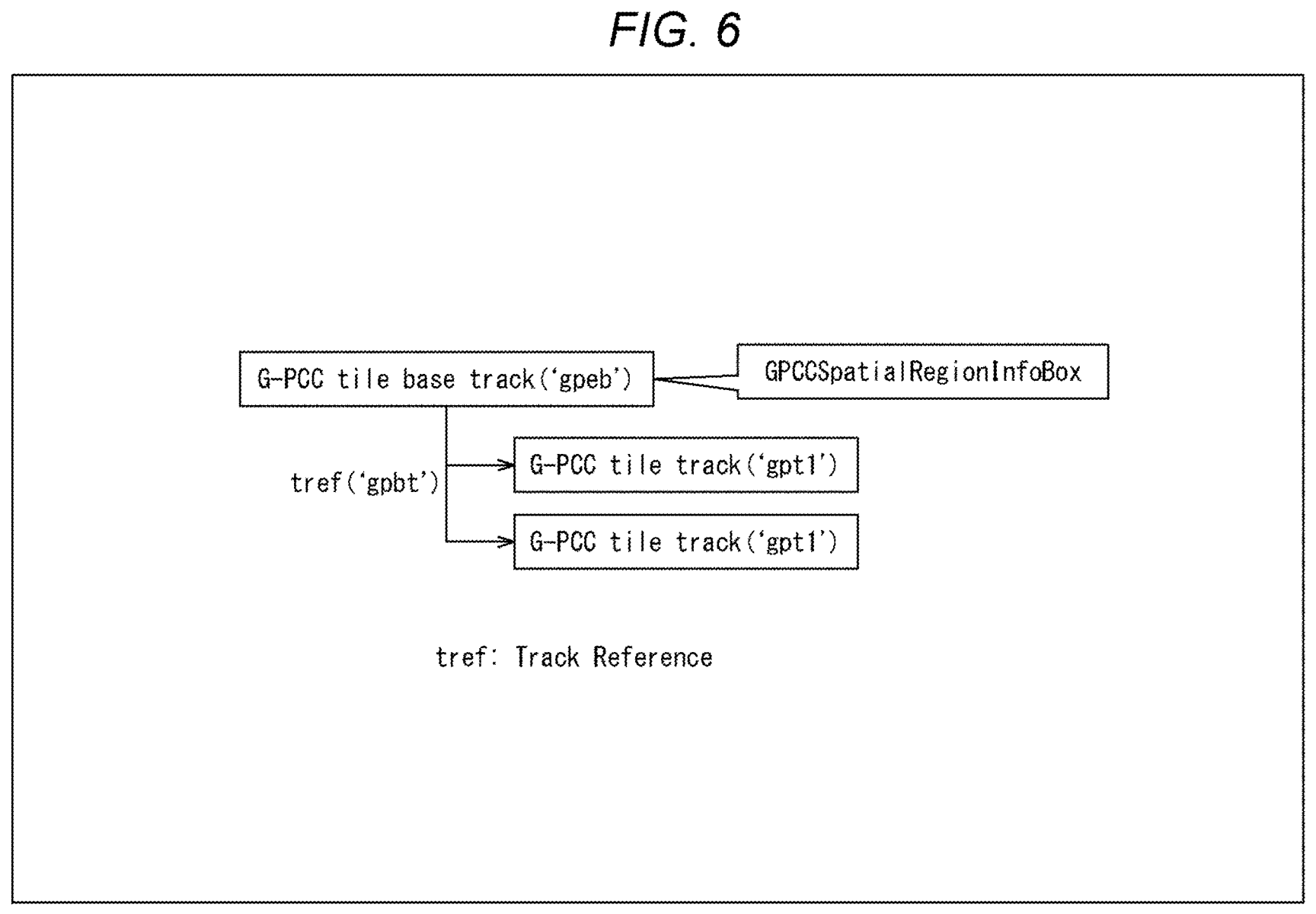

GPCCSpatialRegionInfoBox

G-PCC tile base track('gpeb')

G-PCC tile track('gpt1')

G-PCC tile track('gpt1')

tref('gpbt')

tref: Track Reference

*FIG. 9*

```
aligned(8) class GPCCSpatialRegionInfoBox extends FullBox('gpsr',0,0) {
    unsigned int(15)  num_regions;
    unsigned int(1)   tile_id_present;
    for (int i=0; i<num_regions; i++) {
        3DSpatialRegionStruct(1);
        if(tile_id_present) {
            unsigned int(16) num_tiles;
            for(int j=0; j<num_tiles;j++)
                unsigned int(16) tile_id;
        }
    }
}
```

*FIG. 10*

```
aligned(8) class 3DSpatialRegionStruct(dimension_included) {
    unsigned int(16) 3d_region_id;
    unsinged int(16)          anchor_x;
    unsinged int(16)          anchor_y;
    unsinged int(16)          anchor_z;

if (dimension_included)
    {
        unsinged int(16)          region_dx;
        unsinged int(16)          region_dy;
        unsinged int(16)          region_dz;
    }
}
```

*FIG. 11*

```
aligned(8) class GPCCTileSampleEntry
          extends VolumetricVisualSampleEntry('gpt1') {
unsigned int(1) dynamic_tile_flag;
bit(7) reserved = 0;
if(!dynamic_tile_flag){
   unsigned int(16) num_tiles_in_track;
   for(i=0; i < num_tiles_in_track; i++){
      unsigned int(16) tile_id;
   }
}
GPCCTileConfigurationBox config;    // optional
GPCCComponentInfoBox type;                  // optional
}
```

*FIG. 12* dynamic spatial region timed metadata track('gpdr')

GPCCSpatialRegionInfoBox

G-PCC tile base track('gpeb')

G-PCC tile track('gpt1')

G-PCC tile track('gpt1')

tref('cdsc')

tref('gpbt')

tref: Track Reference

FIG. 13

| | |
|---|---|
| #1 | STORE SPATIAL CONFIGURATION INFORMATION OF subgroup AND DEPENDENCY INFORMATION OF layer_group AND subgroup IN SYSTEM LAYER OF FILE CONTAINER |
| #1-1 | STORE SPATIAL CONFIGURATION INFORMATION OF subgroup IN Sample Entry OF FILE CONTAINER |
| #1-1-1 | STORE ALL layer_groups AND subgroups IN 1 track<br>STORE DEPENDENCY INFORMATION OF layer_group AND subgroup IN sub sample information box |
| #1-1-2 | STORE layer_groups AND subgroups IN SEPARATE tracks<br>SET DEPENDENCY INFORMATION OF layer_group AND subgroup IN track reference |
| #1-2 | STORE SPATIAL CONFIGURATION INFORMATION OF subgroup AND DEPENDENCY INFORMATION OF layer_group AND subgroup IN Sample Entry OF FILE CONTAINER |
| #1-2-1 | STORE ALL layer_groups AND subgroups IN 1 track |
| #1-2-2 | STORE layer_groups AND subgroups IN SEPARATE tracks |

*FIG. 14*

G-PCC track(gpe1 or gpeg)                    111 timed metadata(3D spatial region & layer)    112

*FIG. 15*

```
aligned(8) class GPCCSampleEntry extends VolumetricVisualSampleEntry ('gpe1') {
    GPCCConfigurationBox config;
    GPCCSpatialRegionInfoBox spatialInfo;
    GPCCLayerInfoBox layerInfo; // optional
    GPCCLayerQualityInfoBox qualityInfo; // optional
}
```

*FIG. 16*

```
aligned(8) class GPCCLayerInfoBox extends FullBox('gply', version=0, 0) {
    unsigned int(1) tile_present;
    bit(7) reserved=0;
    if(tile_present){
        unsigned int(8) num_tiles;
        for(int i=0; i < num_tiles; i++) {
            unsigned int(16) tile_id;
            LayerInfoStruct();
    }else
        LayerInfoStruct();
}
```

FIG. 17

```
aligned(8) class LayerInfoStruct() {
    unsigned int(8) num_deepest_subgroups;
    for (int i=0; i < num_deepest_subgroups; i++) {
        unsigned int(8) layer_group_id;
        unsigned int(8) subgroup_id;
        3DSpatialRegionStruct(1);
    }
}
```

FIG. 18

```
aligned(8) class GPCCLayerQualityInfoBox() extends
FullBox('gplq', version=0, 0) {
    unsigned int(8) num_layer_groups;
    for (int i=0; i < num_layer_groups; i++) {
        unsigned int(8) layer_group_id;
        unsigned int(8) num_tree_depth;
    }
}
```

*FIG. 19*

```
aligned(8) class SubSampleInformationBox extends FullBox('subs', version, flags) {
    unsigned int(32) entry_count;
    int i, j;
    for (i=0; i < entry_count; i++) {
        unsigned int(32) sample_delta;  // TARGET sample
        unsigned int(16) subsample_count;  // NUMBER OF subsamples
        if (subsample_count > 0) {
            for (j=0; j < subsample_count; j++) {
                if (version == 1)
                {
                    unsigned int(32) subsample_size;  // SIZE OF subsample
                }
                else
                {
                    unsigned int(16) subsample_size;  // SIZE OF subsample
                }
                unsigned int(8) subsample_priority;
                unsigned int(8) discardable;
                unsigned int(32) codec_specific_parameters;  // INFORMATION OF subsample DETERMINED BY ENCODING CODEC
            }
        }
    }
}
```

FIG. 20

```
if (flags == 0) {
    ... // data unit base
} else if (flags == 1) {
    ... // tile base
} else if (flags == 2) {
    unsigned int(8)      layer_group_id;
    unsigned int(8)      subgroup_id;
    unsigned int(8)      ref_layer_group_id;
    unsigned int(8)      ref_subgroup_id;

```
aligned(8) class GPCCTrackLayerInfoBox extends FullBox('gptl', version=0, 0) {
    unsigned int(8) num_layer_groups;
    for (int i=0; i < num_layer_groups; i++) {
        unsigned int(8) layer_group_id;
        unsigned int(8) num_subgroups;
        for (int j=0; j < num_subgroups; j++) {
            unsigned int(8) subgroup_id;
        }
    }
}
```

*FIG. 25*

```
aligned(8) class SliceOrderBox extends FullBox('sord', version=0, 0) {
    unsigned int(8) num_tracks;
    for (int i=0; i < num_tracks; i++) {
        unsigned int(32) track_id;
    }
}
```

FIG. 26

```
aligned(8) class LayerInfoStruct() {
    unsigned int(8) num_layer_groups;
    for (int i=0; i < num_layer_groups; i++) {
        unsigned int(8) layer_group_id;
        unsigned int(8) num_tree_depth;
        unsigned int(8) num_subgroups;
        for (int j=0; j < num_subgroups; j++) {
            3DSpatialRegionStruct(1);
            unsigned int(8) subgroup_id;
            unsigned int(8) ref_subgroup_id;
        }
    }
}
```

*FIG. 27*

```
if (flags == 0) {
    ... // data unit base
} else if (flags == 1) {
    ... // tile base
} else if (flags == 2) {
    unsigned int(8)    layer_group_id;
    unsigned int(8)    subgroup_id;
    bit(16)            reserved = 0;
}
```

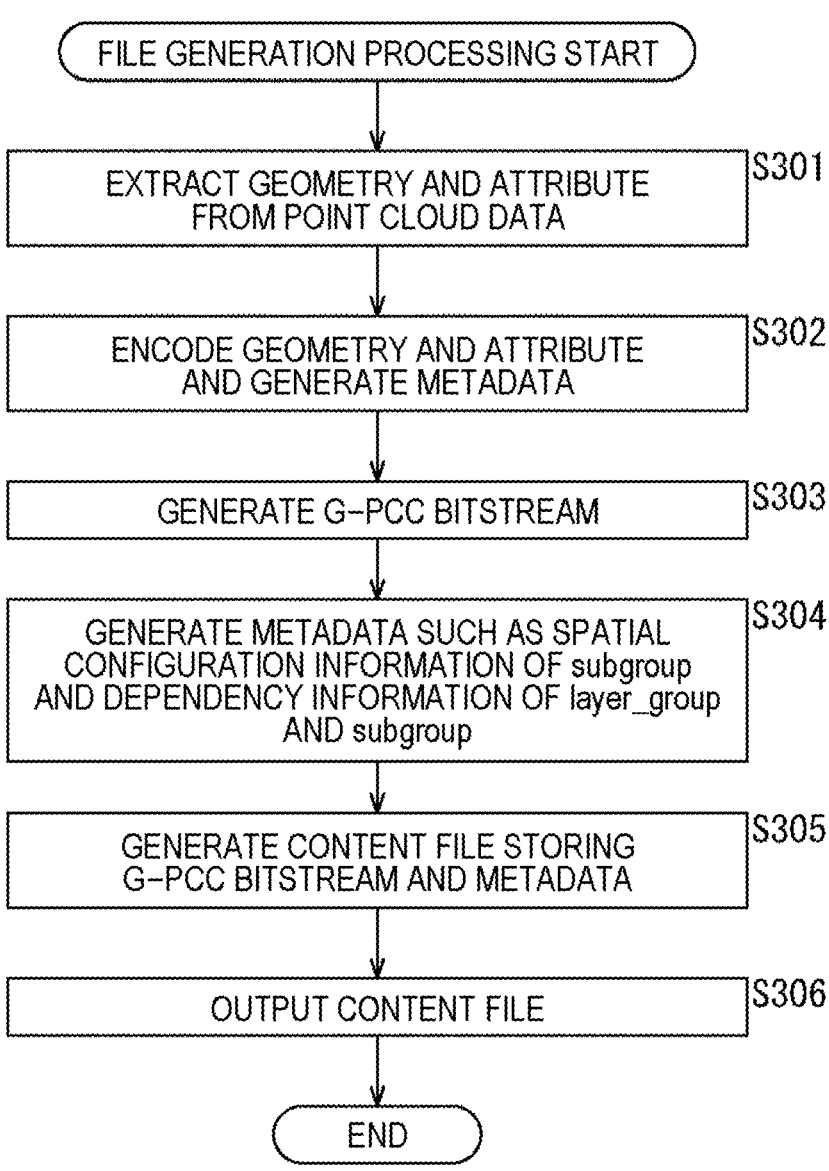

FILE GENERATION PROCESSING START

EXTRACT GEOMETRY AND ATTRIBUTE FROM POINT CLOUD DATA   S301

ENCODE GEOMETRY AND ATTRIBUTE AND GENERATE METADATA   S302

GENERATE G-PCC BITSTREAM   S303

GENERATE METADATA SUCH AS SPATIAL CONFIGURATION INFORMATION OF subgroup AND DEPENDENCY INFORMATION OF layer_group AND subgroup   S304

GENERATE CONTENT FILE STORING G-PCC BITSTREAM AND METADATA   S305

OUTPUT CONTENT FILE   S306

END

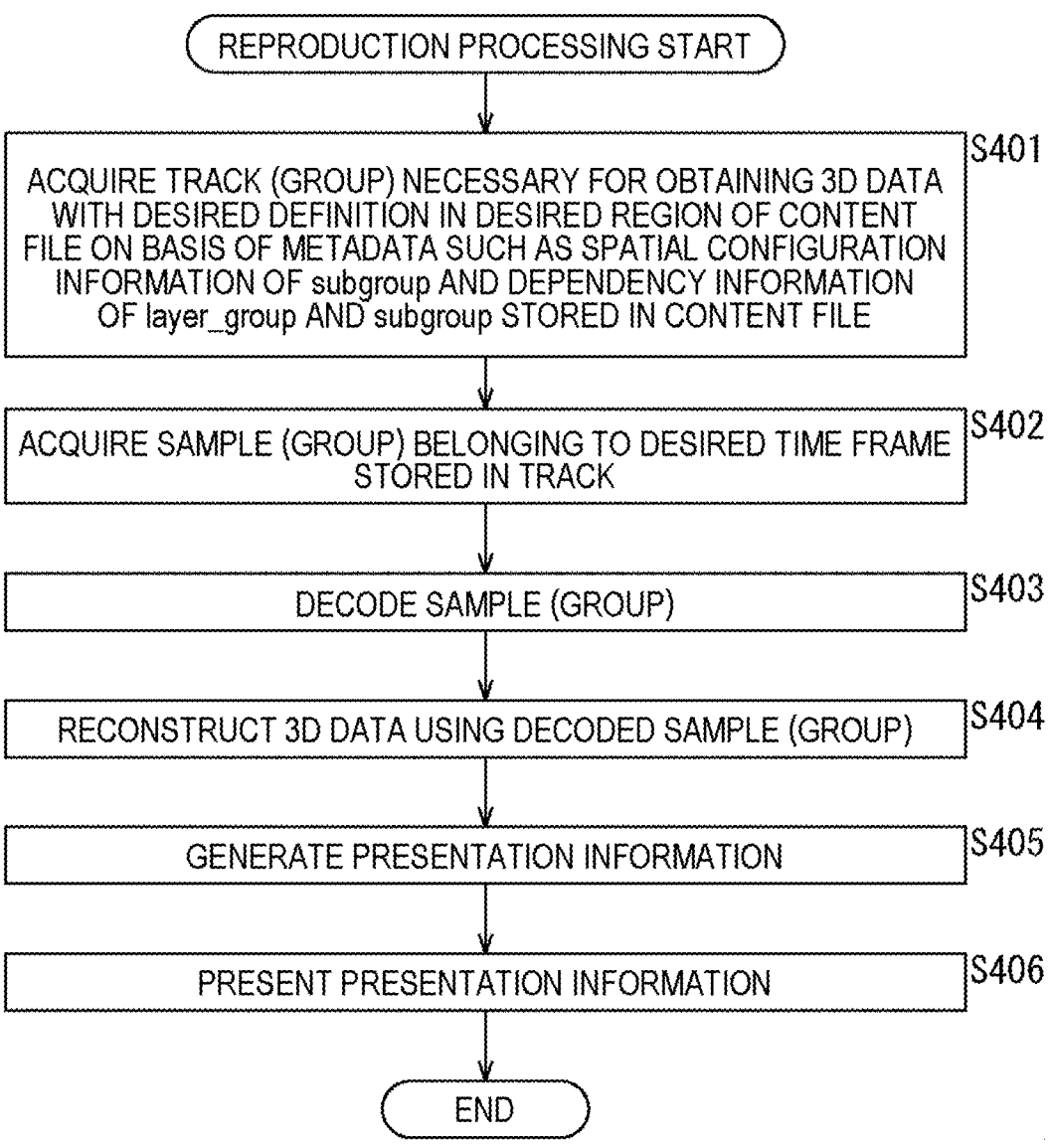

REPRODUCTION PROCESSING START

ACQUIRE TRACK (GROUP) NECESSARY FOR OBTAINING 3D DATA WITH DESIRED DEFINITION IN DESIRED REGION OF CONTENT FILE ON BASIS OF METADATA SUCH AS SPATIAL CONFIGURATION INFORMATION OF subgroup AND DEPENDENCY INFORMATION OF layer_group AND subgroup STORED IN CONTENT FILE    S401

ACQUIRE SAMPLE (GROUP) BELONGING TO DESIRED TIME FRAME STORED IN TRACK    S402

DECODE SAMPLE (GROUP)    S403

RECONSTRUCT 3D DATA USING DECODED SAMPLE (GROUP)    S404

GENERATE PRESENTATION INFORMATION    S405

PRESENT PRESENTATION INFORMATION    S406

END

FIG. 35

| | |
|---|---|
| #1 | STORE SPATIAL CONFIGURATION INFORMATION OF subgroup AND DEPENDENCY INFORMATION OF layer_group AND subgroup IN SYSTEM LAYER OF FILE CONTAINER |
| #1-3 | STORE SPATIAL CONFIGURATION INFORMATION OF subgroup AND DEPENDENCY INFORMATION OF layer_group AND subgroup IN MPD OF DASH |
| #1-3-1 | IN FILE CONTAINER, STORE SPATIAL CONFIGURATION INFORMATION OF subgroup IN Sample Entry, AND SET DEPENDENCY INFORMATION OF layer_group AND subgroup IN track reference |
| #1-3-2 | IN FILE CONTAINER, STORE SPATIAL CONFIGURATION INFORMATION OF subgroup AND DEPENDENCY INFORMATION OF layer_group AND subgroup IN Sample Entry |

FIG. 36

| Elements and attributes | Use | Data type | Description |
|---|---|---|---|
| gpig | 0..1 | gpcc:layerGroupMapType | Container element. |
| gpig.layerInfo | 1..N | gpcc:layerInfoType | |
| gpig.layerInfo@tileId | O | xs:unsignedShort | IDENTIFIER OF tile IN WHICH Layer INFORMATION IS APPLIED |
| gpig.layerInfo.subGroup | 1..N | gpcc:layergroupType | Subgorup INFORMATION. ONLY subgroup OF layer-group OF tree LOWERMOST LAYER is SIGNALED |
| gpig.layerInfo.subGroup@layerGroupid | M | xs:unsignedShort | Layer group IDENTIFIER |
| gpig.layerInfo.subGroup@subGroupid | M | xs:unsignedShort | subgroup IDENTIFIER |
| gslg.layerInfo.layerGroup.subGroup.spatialRegion | 1 | gpcc:spatialRegionMapType | An element whose attributes define a 3D spatial region |

Legend:
For attributes: M=Mandatory, O=Optional, OD=Optional with Default Value, CM=Conditionally Mandatory.
For elements: <minOccurs>..<maxOccurs> (N=unbounded)
Elements are bold; attributes are non-bold and preceded with an @.

FIG. 37

| Attributes | Use | Data type | Description |
|---|---|---|---|
| gpli | 1..N | | Container element |
| gpli@layerGroupIds | M | xs:unsignedShort | The value of the layer_group_id field of layer groups present in the layer base track and layer track. |
| gpli@numTreeDepth | M | xs:unsignedShort | NUMBER OF octree depths INCLUDED IN Layer group |
| gpli@subGroupIds | O | xs:UIntVectorType | A list of space-separated identifiers corresponding to the value of the subgroup_id field of subgroups present in the layer base track and layer track. |

Legend:
For attributes: M=Mandatory, O=Optional, OD=Optional with Default Value, CM=Conditionally Mandatory.
For elements: ⟨minOccurs⟩..⟨maxOccurs⟩ (N=unbounded)
Elements are bold; attributes are non-bold and preceded with an @.

FIG. 38

| Elements and attributes | Use | Data type | Description |
|---|---|---|---|
| gplg | 0..1 | gpcc:layerGroupMapType | Container element. |
| gplg.layerInfo | 1..N | gpcc:layerInfoType | |
| gplg.layerInfo@tileId | O | xs:unsignedShort | IDENTIFIER OF tile IN WHICH Layer INFORMATION IS APPLIED |
| gplg.layerInfo.layerGroup | 1..N | gpcc:layerGroupType | Layer group INFORMATION. LISTED IN ORDER OF DEPENDENCY. |
| gplg.layerInfo.layerGroup@id | M | xs:unsignedShort | Layer group IDENTIFIER |
| gplg.layerInfo.layerGroup@numTreeDepth | M | xs:unsignedShort | NUMBER OF octree depths INCLUDED IN Layer group |
| gplg.layerInfo.layerGroup.subGroup | 0..N | gpcc:subGroupType | |
| gplg.layerInfo.layerGroup.subGroup@id | M | xs:unsignedShort | Subgroup IDENTIFIER |
| gplg.layerInfo.layerGroup.subGroup@refId | M | xs:unsignedShort | IDENTIFIER OF subgroup WITH WHICH THIS subgroup HAS DEPENDENCY |
| gslg.layerGroup.subGroup.spatialRegion | 1 | gpcc:spatialRegionMapType | An element whose attributes define a 3D spatial region |

Legend:
For attributes: M=Mandatory, O=Optional, OD=Optional with Default Value, CM=Conditionally Mandatory.
For elements: <minOccurs>..<maxOccurs> (N=unbounded)
Elements are bold: attributes are non-bold and preceded with an @.

FIG. 39

| Attributes | Use | Data type | Description |
|---|---|---|---|
| gpli | 1..N | | Container element |
| gpli@layerGroupIds | M | xs:unsignedShort | The value of the layer_group_id field of layer groups present in the layer base track and layer track. |
| gpli@subGroupIds | O | xs:UIntVectorType | A list of space-separated identifiers corresponding to the value of the subgroup_id field of subgroups present in the layer base track and layer track. |

Legend:
For attributes: M=Mandatory, O=Optional, OD=Optional with Default Value, CM=Conditionally Mandatory.
For elements: <minOccurs>..<maxOccurs> (N=unbounded)
Elements are bold; attributes are non-bold and preceded with an @.

INFORMATION PROCESSING APPARATUS AND METHOD THEREOF

CROSS-REFERENCE TO RELATED APPLICATIONS

The present application is based on PCT filing PCT/JP2022/025963, filed Jun. 29, 2022, which claims priority from U.S. Provisional Patent Application No. 63/216,603, filed Jun. 30, 2021, the entire contents of each are incorporated herein by reference.

TECHNICAL FIELD

The present disclosure relates to an information processing apparatus and method, and more particularly, to an information processing apparatus and method capable of suppressing an increase in load of reproduction processing.

BACKGROUND ART

Geometry-based point cloud compression (G-PCC), which is an encoding technique for encoding a point cloud, which is a set of points having position information and attribute information (for example, color, reflectance, and the like) in a three-dimensional space, by dividing the point cloud into geometry indicating a three-dimensional shape and attribute indicating attribute information, is being standardized in MPEG-I Part 9 (ISO/IEC (International Organization for Standardization/International Electrotechnical Commission) 23090-9) (see, for example, Non-Patent Document 1).

Furthermore, there is International Organization for Standardization Base Media File Format (ISOBMFF) which is a file container specification of an international standard technique, Moving Picture Experts Group-4 (MPEG-4) for moving image compression (see, for example, Non-Patent Document 2).

Further, for the purpose of improving the efficiency of reproduction processing and network distribution of a G-PCC bitstream which is a bitstream of encoded data encoded by the G-PCC from a local storage, a method of storing a G-PCC bitstream in a file of ISOBMFF is being standardized in MPEG-I Part 18 (ISO/IEC 23090-18) (see, for example, Non-Patent Document 3).

Furthermore, in a case where a point cloud is reproduced by decoding the G-PCC bitstream, a method has been conceived in which a point cloud in a viewable region at a specific time/field of view is reproduced with high definition and a point cloud in a non-viewable region is reproduced with low definition by region-base partial access and LOD-base partial access for each tile (see, for example, Non-Patent Document 4).

In the case of this method, the granularity of the partial access depends on the number of tiles. That is, it is necessary to increase the number of tiles in order to reduce the granularity of partial access and improve the efficiency of partial decoding and adaptive distribution. However, when the number of tiles increases, the encoding efficiency of the G-PCC bitstream may decrease.

Therefore, an encoding method using a layer-group or a subgroup has been proposed (see, for example, Patent Document 1). In the case of this method, the granularity of the partial access can be made finer without increasing the number of tiles. Therefore, a reduction in the encoding efficiency of the G-PCC bitstream can be suppressed.

Even in a case where the G-PCC bitstream is stored in the ISOBMFF file as described in Non-Patent Document 3, application of the method described in Patent Document 1 has been desired in order to improve the efficiency of partial decoding and adaptive distribution while suppressing a reduction in the encoding efficiency of the G-PCC bitstream.

However, in order to realize partial decoding and adaptive distribution by the method described in Patent Document 1, it is necessary to grasp a spatial configuration of each subgroup (a position, a size, or the like of a three-dimensional region corresponding to the subgroup) and a dependency relationship between the layer-group and the subgroup in order to determine which layer-group and subgroup are reproduced according to a viewpoint or the like.

CITATION LIST

Non-Patent Document

Non-Patent Document 1: "Information technology—MPEG-I (Coded Representation of Immersive Media)—Part 9: Geometry-based Point Cloud Compression" ("Text of ISO/IEC FDIS 23090-9 Geometry-based Point Cloud Compression (draft 8)"), ISO/IEC 23090-9:2020(E), MDS19617, 2021/5/18

Non-Patent Document 2: "Information technology-Coding of audio-visual objects-Part 12: ISO base media file format, TECHNICAL CORRIGENDUM 1", ISO/IEC FDIS 14496-12:2020(E), ISO/IEC 14496-12:2015/Cor.1, ISO/IEC JTC 1/SC 29/WG 11, 2016/6/3

Non-Patent Document 3: "Potential Improvement of ISO/IEC 23090-18 Carriage of Geometry-based Point Cloud Compression Data", ISO/IEC JTC 1/SC 29/WG 03 N0141, MDS19974, 2021/3/25

Non-Patent Document 4: Hyun-Mook Oh, Hyejung Hur, "[G-PCC][EE13.44] Report on fine granularity slices", ISO/IEC JTC 1/SC 29/WG 7 m56750, 2021/4/30

PATENT DOCUMENT

Patent Document 1: WO 2021/049333

SUMMARY OF THE INVENTION

Problems to be Solved by the Invention

However, these pieces of information have been stored in the header region of the G-PCC bitstream. Therefore, in a case where the G-PCC bitstream is stored in the ISOBMFF file as described in Non-Patent Document 3, when the method described in Patent Document 1 is applied, it is necessary to parse the G-PCC bitstream in order to obtain these pieces of information. Therefore, the load of the reproduction processing increases, and there is a possibility that the efficiency of partial decoding and adaptive distribution is reduced.

The present disclosure has been made in view of such a situation, and an object thereof is to suppress an increase in load of reproduction processing.

Solutions to Problems

An information processing apparatus according to one aspect of the present technology is an information processing apparatus including: a metadata generation unit that generates metadata including spatial configuration information of a subgroup and dependency information of the subgroup and a layer-group on the basis of a bitstream of a geometry of 3D data; and a file generation unit that generates a file that stores the bitstream and the metadata, in which the layer-group is constituted by one or more layers in a tree structure based on definition of the geometry, the subgroup is configured by the geometry divided for each region in the layer-group, the spatial configuration information includes information indicating a position and a size of a region corresponding to the subgroup, and the dependency information is information indicating the subgroup or the layer-group as a reference destination.

An information processing method according to one aspect of the present technology is an information processing method including: generating metadata including spatial configuration information of a subgroup and dependency information of the subgroup and a layer-group on the basis of a bitstream of a geometry of 3D data; and generating a file that stores the bitstream and the metadata, in which the layer-group is constituted by one or more layers in a tree structure based on definition of the geometry, the subgroup is configured by the geometry divided for each region in the layer-group, the spatial configuration information includes information indicating a position and a size of a region corresponding to the subgroup, and the dependency information is information indicating the subgroup or the layer-group as a reference destination.

An information processing apparatus according to another aspect of the present technology is an information processing apparatus including: an extraction unit that extracts a bitstream of a geometry of 3D data corresponding to a layer-group and a subgroup desired stored in a file on the basis of spatial configuration information of the subgroup and dependency information of the subgroup and the layer-group stored in the file as metadata; and a decoding unit that decodes the bitstream extracted, in which the layer-group is constituted by one or more layers in a tree structure based on definition of the geometry, the subgroup is configured by the geometry divided for each region in the layer-group, the spatial configuration information includes information indicating a position and a size of a region corresponding to the subgroup, and the dependency information is information indicating the subgroup or the layer-group as a reference destination.

An information processing method according to another aspect of the present technology is an information processing method including: extracting a bitstream of a geometry of 3D data corresponding to a layer-group and a subgroup desired stored in a file on the basis of spatial configuration information of the subgroup and dependency information of the subgroup and the layer-group stored in the file as metadata; and decoding the bitstream extracted, in which the layer-group is constituted by one or more layers in a tree structure based on definition of the geometry, the subgroup is configured by the geometry divided for each region in the layer-group, the spatial configuration information includes information indicating a position and a size of a region corresponding to the subgroup, and the dependency information is information indicating the subgroup or the layer-group as a reference destination.

In the information processing apparatus and the method according to one aspect of the present technology, metadata including spatial configuration information of a subgroup and dependency information of the subgroup and a layer-group is generated on the basis of a bitstream of a geometry of 3D data, and a file that stores the bitstream and the metadata is generated. The layer-group is constituted by one or more layers in the tree structure based on the definition of the geometry. The subgroup is configured by the geometry divided for each region in the layer-group. The spatial configuration information includes information indicating the position and size of the region corresponding to the subgroup. The dependency information is information indicating a subgroup or a layer-group as a reference destination.

In an information processing apparatus and a method according to another aspect of the present technology, a bitstream of a geometry of 3D data corresponding to a desired layer-group and subgroup stored in a file is extracted on the basis of spatial configuration information of a subgroup and dependency information of the subgroup and a layer-group stored as metadata in the file, and the extracted bitstream is decoded. The layer-group is constituted by one or more layers in the tree structure based on the definition of the geometry. The subgroup is configured by the geometry divided for each region in the layer-group. The spatial configuration information includes information indicating the position and size of the region corresponding to the subgroup. The dependency information is information indicating a subgroup or a layer-group as a reference destination.

BRIEF DESCRIPTION OF DRAWINGS

FIG. 2 is a diagram for explaining layer-groups and subgroups.

FIG. 3 is a diagram illustrating an example of syntax of a geometry data unit header.

FIG. 4 is a diagram for explaining layer-groups and subgroups.

FIG. 5 is a diagram illustrating an example of a structure of a G-PCC file.

FIG. 6 is a diagram illustrating an example of a track structure of a G-PCC file.

FIG. 9 is a diagram illustrating an example of GPCCSpatialRegionInfoBox.

FIG. 10 is a diagram illustrating an example of 3DSpatialRegionStruct.

FIG. 11 is a diagram illustrating an example of GPCCTileSampleEntry.

FIG. 12 is a diagram illustrating an example of a track structure of a G-PCC file.

FIG. 13 is a diagram for explaining an example of an information transmission method for partial decoding and adaptive distribution using a layer-group and a subgroup.

FIG. 14 is a diagram illustrating an example of a track structure of a G-PCC file.

FIG. 15 is a diagram illustrating an example of GPCCSampleEntry.

FIG. 16 is a diagram illustrating an example of GPCCLayerInfoBox.

FIG. 17 is a diagram illustrating an example of LayerInfoStruct.

FIG. 18 is a diagram illustrating an example of GPCCLayerQualityInfoBox.

FIG. 19 is a diagram illustrating an example of SubSampleInformationBox.

FIG. 20 is a diagram illustrating an example of codec_specific_parameters.

FIG. 21 is a diagram illustrating an example of GPCCTrackLayerInfoBox.

FIG. 25 is a diagram illustrating an example of SliceOrderBox.

FIG. 26 is a diagram illustrating an example of LayerInfoStruct.

FIG. 27 is a diagram illustrating an example of codec_specific_parameters.

FIG. 30 is a block diagram illustrating a main configuration example of a file generation device.

FIG. 31 is a flowchart illustrating an example of a flow of file generation processing.

FIG. 32 is a block diagram illustrating a main configuration example of a reproduction device.

FIG. 33 is a block diagram illustrating a main configuration example of a reproduction processing unit.

FIG. 34 is a flowchart illustrating an example of a flow of reproduction processing.

FIG. 35 is a diagram for explaining an example of an information transmission method for partial decoding and adaptive distribution using a layer-group and a subgroup.

FIG. 36 is a diagram illustrating an example of a layer base descriptor.

FIG. 37 is a diagram illustrating an example of a Layer id descriptor.

FIG. 38 is a diagram illustrating an example of a layer base descriptor.

FIG. 39 is a diagram illustrating an example of a Layer id descriptor.

FIG. 42 is a block diagram illustrating a main configuration example of a reproduction device.

FIG. 44 is a block diagram illustrating a main configuration example of a computer.

MODE FOR CARRYING OUT THE INVENTION

Figure 1:
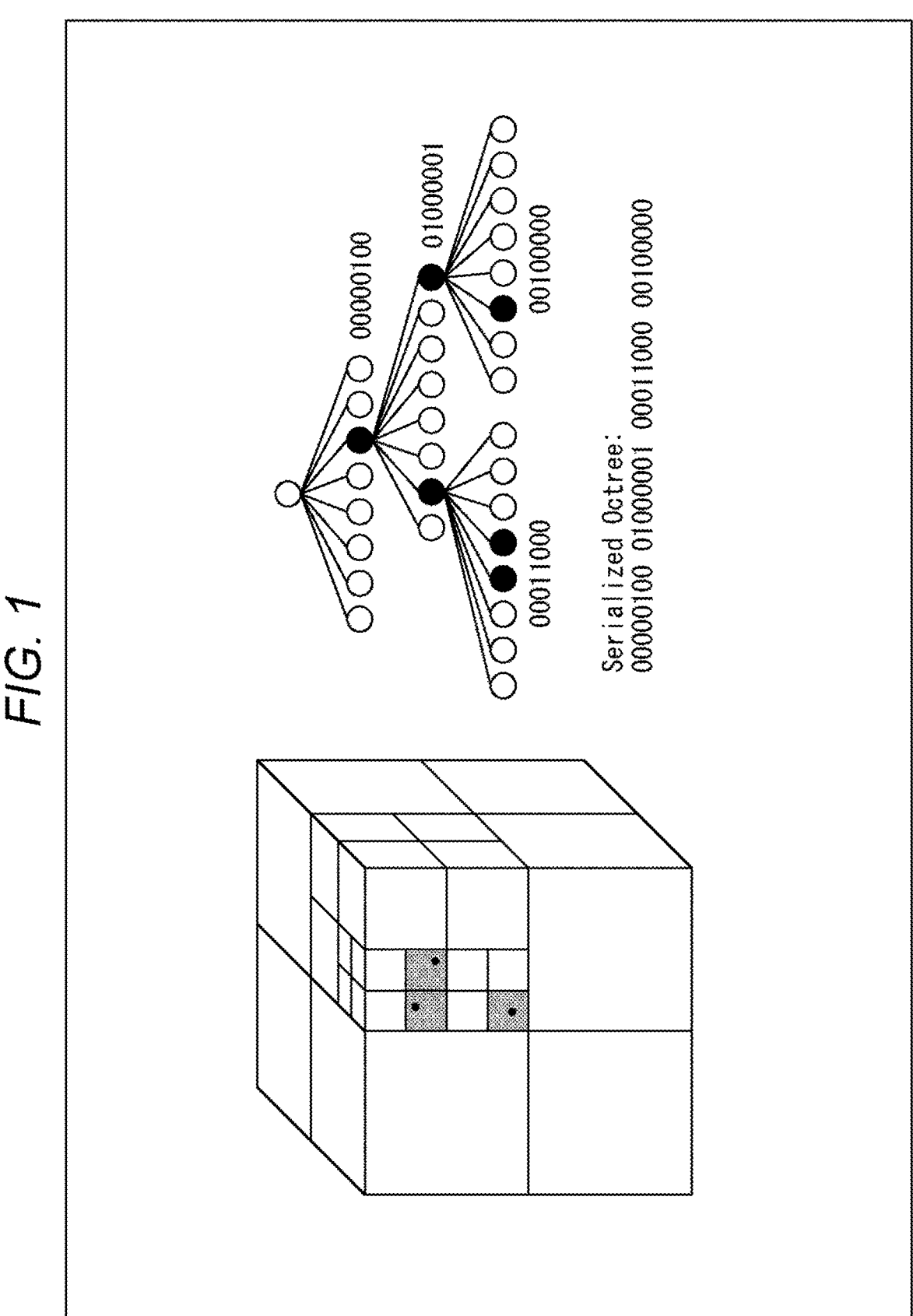
FIG. 1 is a diagram for explaining an outline of a G-PCC.

Hereinafter, modes for carrying out the present disclosure (hereinafter referred to as embodiments) will be described. Note that the description will be made in the following order.

1. Documents and the Like Supporting Technical Content and Technical Terms
2. Partial Decoding and Adaptive Distribution of G-PCC Bitstream
3. Transmission of Space Configuration Information and Dependency Information by Content File
4. First Embodiment (File Generation Device and Reproduction Device)
5. Transmission of Space Configuration Information and Dependency Information by Control File 6. Second Embodiment (File Generation Device and Reproduction Device)
7. Supplementary note

1. Documents and the Like Supporting Technical Content and Technical Terms

The scope disclosed in the present technology includes not only the contents described in the embodiments but also the contents described in the following non-patent documents and patent documents which are publicly known at the time of filing, the contents of other documents referred to in the following non-patent documents and patent documents, and the like.

Non-Patent Document 1: (described above)
Non-Patent Document 2: (described above)
Non-Patent Document 3: (described above)
Non-Patent Document 4: (described above)
Non-Patent Document 5: https://www.matroska.org/index.html
Patent Document 1: (described above)

That is, the contents described in the above-described non-patent documents, patent documents, and the like, the contents of other documents referred to in the above-described non-patent documents, patent documents, and the like serve as bases for determining the support requirement.

2. Partial Decoding and Adaptive Distribution of G-PCC Bitstream

<Point Cloud>

Conventionally, there has been 3D data such as a point cloud representing a three-dimensional structure by point position information, attribute information, and the like.

For example, in a case of a point cloud, a three-dimensional structure (three-dimensional shaped object) is expressed as a set of a large number of points. The point cloud includes position information (also referred to as geometry) and attribute information (also referred to as attribute) of each point. The attribute can include any information. For example, color information, reflectance information, normal line information, and the like of each point may be included in the attribute. As described above, the point cloud has a relatively simple data structure, and can express any three-dimensional structure with sufficient accuracy by using a sufficiently large number of points.

<Overview of G-PCC>

Non-Patent Document 1 discloses an encoding technique called Geometry-based Point Cloud Compression (G-PCC) for encoding this point cloud separately into geometry and attribute. The G-PCC is being standardized in MPEG-I Part 9 (ISO/IEC 23090-9).

Octree encoding is applied to compress the geometry, for example. Octree encoding is an encoding method in which a geometry data structure is converted into an octree as illustrated on the right side of FIG. 1 and encoded.

In this case, the geometry is represented using a voxel that is a three-dimensional region of a cuboid shape (including a cube shape) of a hierarchical structure as illustrated on the left side of FIG. 1. That is, whether or not a point is present is expressed for each voxel. The voxel in which the point exists is divided, and the presence or absence of the point is expressed in a small region (lower voxel) after the division. With respect to the voxel in which the point exists, such division is recursively repeated up to the lowest layer, thereby forming a hierarchical structure of the voxel.

Then, the octree expresses such a voxel representation (presence or absence of a point for each voxel) as an oct-tree as illustrated on the right side of FIG. 1. Each node of the octree corresponds to each voxel of the voxel representation. For example, a node corresponding to a voxel in which a point is present is represented as the value "1" and a node corresponding to a voxel in which no point is present is represented as the value "0". A child node (a node one level lower) is formed in the node corresponding to the voxel in which the point exists (the node with the value "1").

The bitstream of the encoded data generated by encoding the geometry as described above is also referred to as a geometry bitstream.

Furthermore, a method such as Predicting Weight Lifting, Region Adaptive Hierarchical Transform (RAHT), or Fix Weight Lifting is applied to compress the attribute. A bitstream of encoded data generated by encoding an attribute is also referred to as an attribute bitstream. Furthermore, a bitstream in which the geometry bitstream and the attribute bitstream are combined into one is also referred to as a G-PCC bitstream.

<Partial Access>

The G-PCC bitstream may include a partial access structure that may decode and reproduce the bitstream of some points independently of others. In the point cloud of the partial access structure, there are tiles and slices as data units that can be independently decoded and reproduced (independently accessible).

For example, Non-Patent Document 4 discloses a method for performing region-base partial access and LOD-base partial access for each tile using such a partial access structure in a case where a G-PCC bitstream is decoded to reproduce a point cloud. By this method, for example, reproduction control such as reproducing a point cloud in a viewable region at a specific time/field of view with high definition and reproducing a point cloud in a non-viewable region with low definition can be realized.

On the other hand, Patent Document 1 discloses an encoding method using a layer-group or a subgroup. As described above, the geometry of a point cloud can be a tree structure such as octree. The geometry 11 indicated by a triangle in FIG. 2 illustrates a state of the geometry structured as a tree.

The geometry 11 is hierarchized according to definition by being tree-structured. In the geometry 11, layers 0 to 6 (layer 0 to layer 6) indicate the respective layers in this hierarchy. The geometry is lower definition in the upper layer (higher definition in the lower layer). In order to reconstruct the geometry of a certain layer, the geometry of a higher layer is required.

The layer-group (layer_group) is a group of geometries obtained by dividing the geometry 11 by one or a plurality of layers. That is, the layer-group is constituted by (the geometry of) one or more layers. For example, in the geometry 11 of FIG. 2, the layer-group 1 (layer_group 1) includes the layer 0 to the layer 3. Furthermore, the layer-group 2 (layer_group 2) includes the layer 4. Furthermore, the layer-group 3 (layer_group 3) includes the layer 5 and the layer 6.

A subgroup is a group of geometries obtained by dividing the geometry 11 for each region. This division of the geometry takes place within the layer-group. That is, the subgroup is configured by the geometry divided for each region in the layer-group. For example, in the geometry 11 of FIG. 2, the geometry of the layer-group 2 is divided into two by the region, thereby forming the subgroup 2-1 (sg 2-1) and the subgroup 2-2 (sg 2-2). Furthermore, by dividing the geometry of the layer-group 3 into four by the region, the subgroup 3-1 (sg 3-1), the subgroup 3-2 (sg 3-2), the subgroup 3-3 (sg 3-3), and the subgroup 3-4 (sg 3-4) are formed. As illustrated in FIG. 2, in the layer-group 3, the region corresponding to the subgroup 2-1 is divided into two, whereby the subgroup 3-1 and the subgroup 3-2 are formed. That is, the geometries of the subgroup 3-1 and the subgroup 3-2 depend on the geometry of the subgroup 2-1. Similarly, in the layer-group 3, a region corresponding to the subgroup 2-2 is divided into two, whereby the subgroup 3-3 and the subgroup 3-4 are formed. That is, the geometries of the subgroup 3-3 and the subgroup 3-4 depend on the geometry of the subgroup 2-2.

The bitstream 12 in FIG. 2 illustrates a structural example of a bitstream generated by encoding such geometry. In the bitstream 12, the slices 1 to 7 (slice 1 to slice 7) are formed. The slice 1 (slice 1) corresponds to the layer-group 1 (layer_group 1). The slice 2 (slice 2) corresponds to the subgroup 2-1 (subgroup 2-1). The slice 3 (slice 3) corresponds to the subgroup 2-2 (subgroup 2-2). The slice 4 (slice 4) corresponds to the subgroup 3-1 (subgroup 3-1). The slice 5 (slice 5) corresponds to the subgroup 3-2 (subgroup 3-2). The slice 6 (slice 6) corresponds to the subgroup 3-3 (subgroup 3-3). The slice 7 (slice 7) corresponds to the subgroup 3-4 (subgroup 3-4). Each slice may be decoded independently of one another. That is, the bitstream 12 can be decoded independently for each subgroup (for each layer-group in a layer-group in which no subgroup is formed). Therefore, partial access can be realized by using the structure of such a layer-group and subgroup.

As illustrated in the syntax of FIG. 3, information such as the spatial configuration of each subgroup (the position, size, and the like of the region corresponding to the subgroup) (subgroup_bbdx_orgin, subgroup_bbdx size, and the like), the dependency between the layer-group and the subgroup (ref_layer_group_id, ref_subgroup_id, and the like), and the like is stored in the geometry data unit header (that is, the header region of the G-PCC bitstream).

For example, consider a case where the G-PCC bitstream is decoded to reconstruct the 3D data, and the user generates an image of the object 21 and the object 22 in FIG. 4 as viewed in the direction of the arrow from the position of the viewpoint 23. In this case, it is assumed that the user can see the object 22 but cannot see the object 21. That is, when generating the image from the viewpoint 23, the 3D data of the object 22 is necessary, but the 3D data of the object 21 is unnecessary. Therefore, reconstructing the high-definition 3D data of the object 21 and the object 22 is inefficient in transmission, decoding, reconstruction, and the like of the bitstream.

Therefore, it is conceivable to reconstruct the 3D data of the object 22 with high definition and reconstruct the 3D data of the object 21 with low definition using the partial access function described above. In this way, the efficiency in the transmission, decoding, reconstruction, and the like of the bitstream can be improved as compared with the case of reconstructing the 3D data of the object 21 and the object 22 with high definition. Note that, by reconstructing the 3D data of the object 21, it is possible to respond to the change in the position of the viewpoint 23 at a higher speed.

In the case of the method described in Non-Patent Document 4, partial access is possible in units of tiles. Thus, in the case of this method, the 3D data of the object 21 and the 3D data of the object 22 are tiled, respectively, like the tiles 24 and 25 illustrated at the top center of FIG. 4. Since the octree is formed for each tile, the octree 26 corresponding to the tile 24 and the octree 27 corresponding to the tile 25 are formed. Therefore, in order to reconstruct the 3D data of the object 22 with high definition and reconstruct the 3D data of the object 21 with low definition, it is only required to reconstruct the octree 27 up to the lower layer (layer B) and reconstruct the octree 26 up to the higher layer (layer A) as illustrated in the upper left part of FIG. 4.

In the case of this method, the granularity of the partial access depends on the number of tiles. That is, it is necessary to increase the number of tiles in order to reduce the granularity of partial access and improve the efficiency of partial decoding and adaptive distribution. However, when the number of tiles increases, the encoding efficiency of the G-PCC bitstream may decrease.

On the other hand, in the case of the method described in Patent Document 1, partial access can be performed in units of subgroups (or in units of layer-groups). Therefore, in the case of this method, the 3D data of the object 21 and the 3D data of the object 22 are set as one tile, like the tile 31 illustrated in the lower center of FIG. 4. Therefore, one octree 32 corresponding to the tile 31 is formed. However, in the octree 32, a low-definition layer-group A and a high-definition layer-group B are formed. Furthermore, in the layer-group B, the subgroup B-1 of the region of the object 21 and the subgroup B-2 of the region of the object 22 are formed. Note that the subgroup B-2 belongs to the layer-group A. Therefore, if the layer-group A is decoded and reconstructed, the subgroup B-2 can also be decoded and reconstructed. Therefore, in order to reconstruct the 3D data of the object 22 with high definition and reconstruct the 3D data of the object 21 with low definition, it is only required to reconstruct the layer-group A and the subgroup B-2 of the octree 32 as illustrated in the upper left part of FIG. 4.

That is, in the case of this method, the granularity of partial access can be made finer without increasing the number of tiles. Therefore, a reduction in the encoding efficiency of the G-PCC bitstream can be suppressed.

<ISOBMFF>

Non-Patent Document 2 discloses International Organization for Standardization Base Media File Format (ISOBMFF) which is a file container specification of an international standard technique, Moving Picture Experts Group-4 (MPEG-4) for moving image compression.

<Storage of G-PCC Bitstream in ISOBMFF>

Non-Patent Document 3 discloses a method of storing a G-PCC bitstream in ISOBMFF for the purpose of improving the efficiency of reproduction processing and network distribution of a bitstream encoded by the G-PCC from a local storage. This method is being standardized in MPEG-I Part 18 (ISO/IEC 23090-18).

FIG. 5 is a diagram illustrating an example of a file structure in that case. Hereinafter, a G-PCC bitstream stored in ISOBMFF is referred to as a G-PCC file.

The sequence parameter set is stored in GPCCDecoderConfigurationRecord of the G-PCC file. The GPCCDecoderConfigurationRecord may further store a geometry parameter set, an attribute parameter set, and a tile inventory depending on the sample entry type.

The sample in the media data box (Media) may store geometry and attribute corresponding to a one-point cloud frame. This sample may also store a geometry parameter set, an attribute parameter set, and a tile inventory depending on the sample entry type.

The G-PCC file has a structure for performing partial access and decoding on the basis of three-dimensional spatial information. The partial access is to access (extract data from a file) a partial point cloud that is a part of an object represented by a point cloud (that is, a part of point cloud data). In particular, in a distribution use case, by using such partial access, data can be distributed for each track that stores a partial point cloud (that is, adaptive distribution can be implemented), and it is useful for suppressing an increase in processing load and bandwidth load.

For example, the G-PCC file may be constituted by a single track, but may have a plurality of independently accessible tracks as illustrated in FIG. 6. The G-PCC tile track illustrated in FIG. 6 is a track that stores a partial point cloud, and stores data of a single or a plurality of tiles. The G-PCC tile base track stores information such as a parameter set and a tile inventory common to the G-PCC tile track associated with the track. The G-PCC tile base track and the G-PCC tile track are linked by a track reference (tref).

Figure 7:
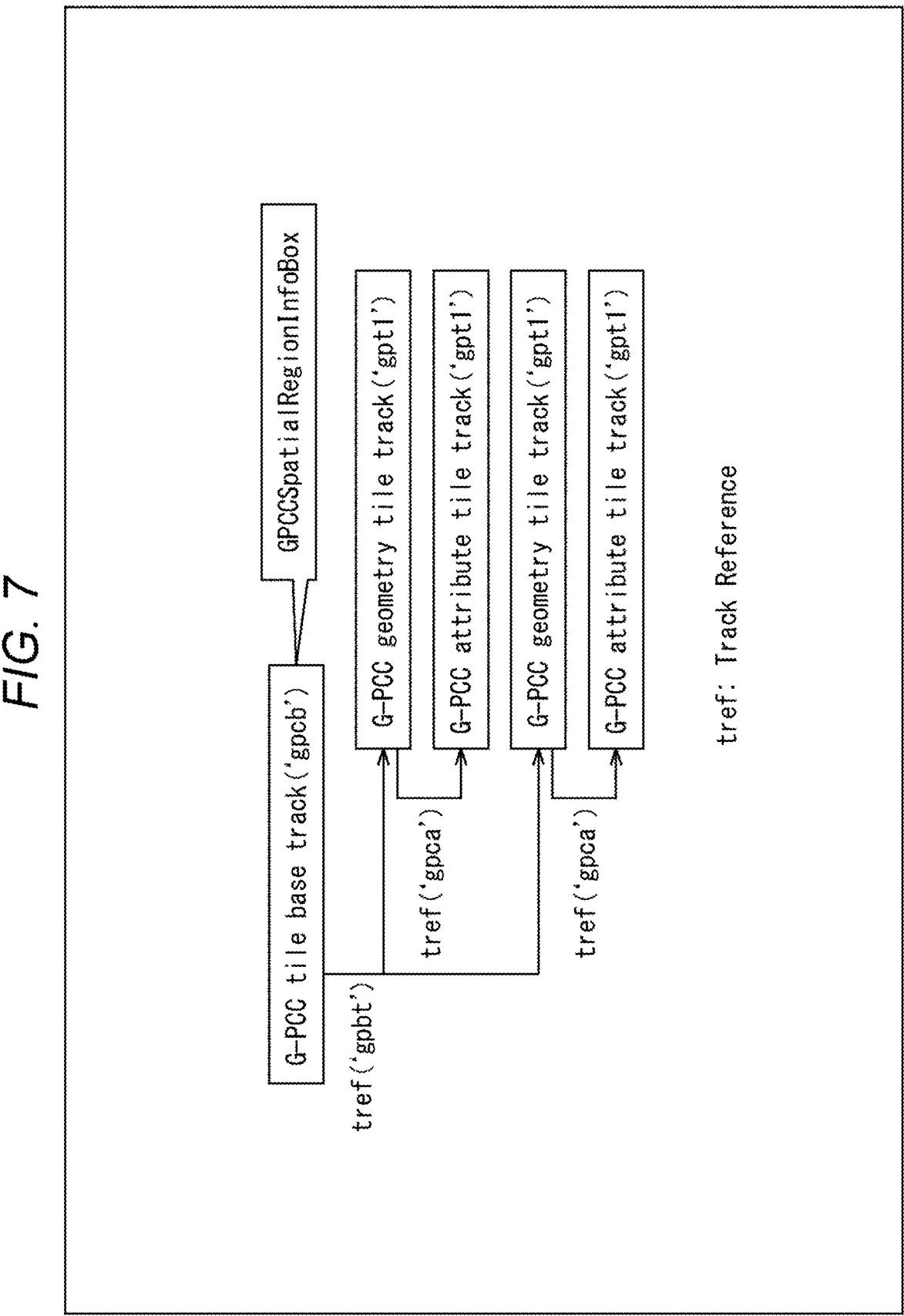
FIG. 7 is a diagram illustrating an example of a track structure of a G-PCC file.

FIG. 6 illustrates a configuration example in a case where the geometry and the attribute are stored in one G-PCC tile track. As illustrated in FIG. 7, the geometry and attribute may be stored in different G-PCC tile tracks. In that case, a G-PCC geometry tile track that stores the geometry and a G-PCC attribute tile track that stores the attribute are linked by a track reference (tref).

Figure 8:
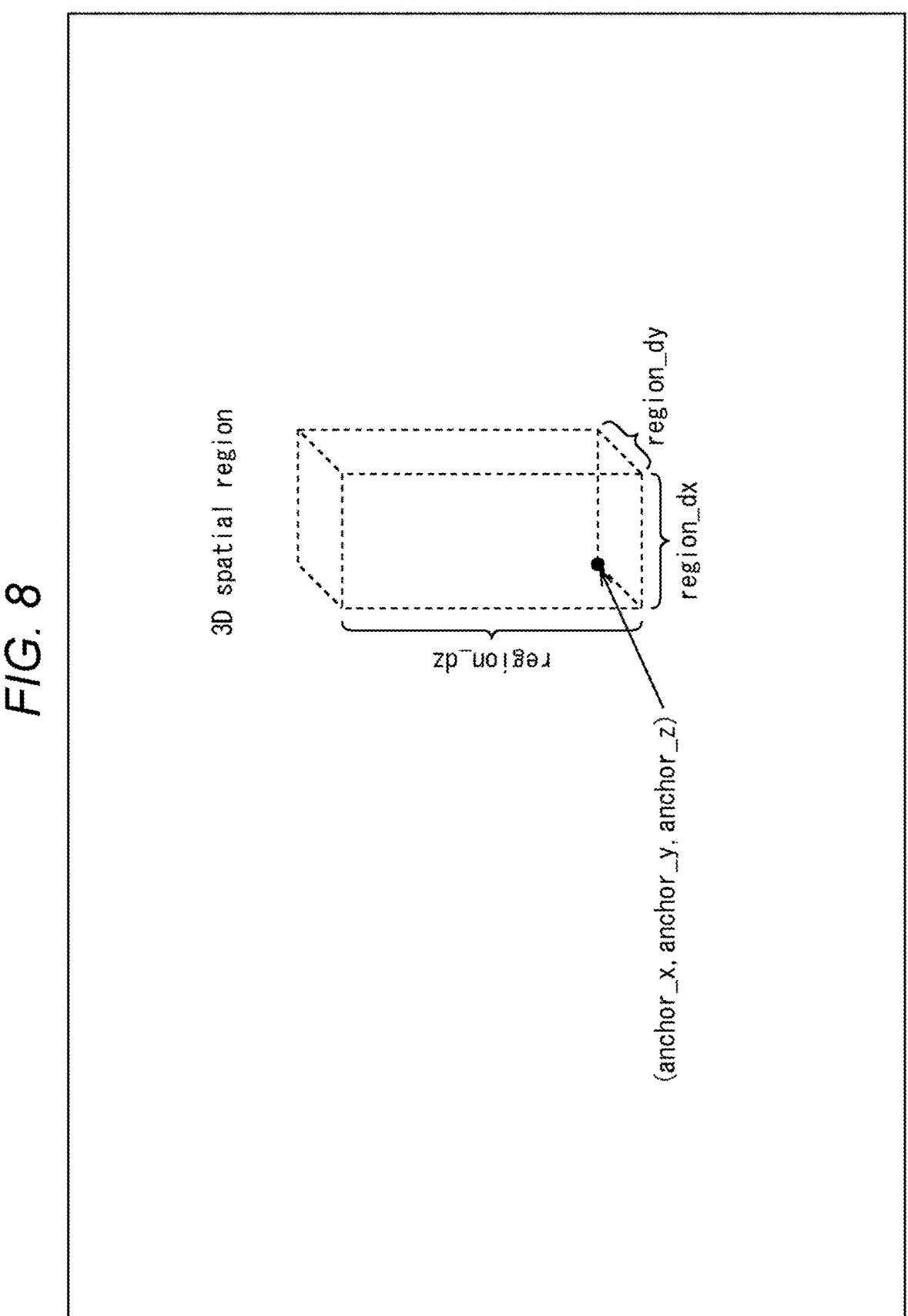
FIG. 8 is a diagram illustrating an example of a 3D spatial region.

In this G-PCC file, a three-dimensional spatial region (3D spatial region) can be defined as a partial point cloud. As illustrated in FIG. 8, the 3D spatial region is defined by a position (three-dimensional coordinates of reference point (anchor_x, anchor_y, anchor_z)) and a size (region_dx, region_dy, region_dz) of a reference point (anchor). Such information regarding the 3D spatial region (three-dimensional spatial information) is managed in the GPCC spatial region infobox (GPCCSpatialRegionInfoBox) stored in the sample entry of the G-PCC tile base track.

FIG. 9 illustrates an example of syntax of GPCCSpatialRegionInfoBox. As illustrated in the fourth to 11th lines from the top of FIG. 9, in the GPCCSpatialRegionInfoBox, information regarding the region is set for each 3D spatial region. For example, as illustrated in the fifth line from the top of FIG. 9, in the GPCCSpatialRegionInfoBox, 3DSpatialRegionStruct that defines each 3D spatial region is designated. FIG. 10 illustrates an example of syntax of 3DSpatialRegionStruct. As illustrated in FIG. 10, in this 3DSpatialRegionStruct, the position (anchor_x, anchor_y, anchor_z) and the size (region_dx, region_dy, region_dz) of the reference point of the 3D spatial region are set.

This 3D spatial region includes a single or a plurality of tiles. As illustrated in the sixth to 10th lines of FIG. 9, in the GPCCSpatialRegionInfoBox, tiles constituting each 3D spatial region are designated by using tile identification information (tile_id).

That is, in the G-PCC file, the 3D spatial region and the tiles constituting the 3D spatial region are managed in the system layer such as the sample entry.

Furthermore, in the G-PCC tile track, tiles stored therein are managed in the GPCC tile sample entry (GPCCTileSampleEntry). FIG. 11 illustrates an example of syntax of GPCCTileSampleEntry. As illustrated in the seventh to ninth lines from the top of FIG. 11, in GPCCTileSampleEntry, tiles stored in the G-PCC tile track are designated by using tile identification information (tile_id).

That is, in the G-PCC file, the 3D spatial region and the track storing the data thereof are associated with each other via the tile in the system layer. Therefore, the partial access is performed in the following flow, for example.

1. The decoder identifies the G-PCC tile base track and the G-PCC tile track in the G-PCC file.

2. The decoder parses the sample entry of the G-PCC tile base track, and obtains tile_id of the tile constituting the desired 3D spatial region from the GPCCSpatialRegionInfoBox.

3. The decoder parses the sample entries of all G-PCC tile tracks and identifies the G-PCC tile track in which the tile of the desired tile_id is stored.

4. Extract and decode data of a desired tile from the identified G-PCC tile track.

The position, size, shape, direction, number, and the like of the object represented by the point cloud may change in the time direction (may be dynamic). Therefore, the 3D spatial region and the tiles constituting the 3D spatial region may also change in the time direction (may be dynamic). The tiles stored in the track may also change in time direction (may be dynamic). Note that, in the present specification, for example, the fact that some objects such as information, a state, and a relationship change in the time direction is referred to as dynamic, and the fact that some objects such as information, a state, and a relationship do not change in the time direction is referred to as static.

The static three-dimensional spatial information of the partial point cloud is stored in the GPCCSpatialRegionInfoBox described above. The dynamic three-dimensional spatial information is stored in a dynamic spatial region timed metadata track linked to the G-PCC tile base track using a track reference (tref) as illustrated in FIG. 12. Note that, in a case where the tile stored in the G-PCC tile track changes in the time direction, tile identification information (tile_id) that changes in the time direction is stored in the sub sample information box.

<Application of Layer-Group Subgroup to G-PCC File>

In order to improve the efficiency of partial decoding (decoding and reconstruction of a partial point cloud) and adaptive distribution while suppressing a decrease in the encoding efficiency of the G-PCC bitstream, it has been desired to apply the method described in Patent Document 1 described above to such a G-PCC file.

In a case where the method described in above-described Patent Document 1 is applied to the G-PCC file, a processing flow in which the reproduction device processes the layer-group and the subgroup to improve the definition of the image viewed from the viewpoint (hereinafter, also referred to as a viewport) is as follows.

1. The reproduction device refers to GPCCSpatialRegionInfoBox and selects a tile (group) included in the viewport.

2. Further, in the tile, a subgroup corresponding to a spatial configuration near the center of the viewport or a spatial configuration at a short distance from the viewpoint is acquired with high definition.

That is, the reproduction device acquires a subgroup belonging to a lower layer-group of the tree structure and a layer-group and a subgroup having a dependency relationship necessary for decoding and reconstructing the subgroup among subgroups corresponding to a desired spatial configuration. That is, in order to implement partial decoding and adaptive distribution by the method described in Patent Document 1, it is necessary to grasp the spatial configuration of each subgroup (the position, size, and the like of the three-dimensional region corresponding to the subgroup) and the dependency between the layer-group and the subgroup in order to determine which layer-group and subgroup are to be reproduced according to the viewpoint and the like.

However, as described above, in the method described in Patent Document 1, the spatial configuration information of one or more subgroups constituting the tile and the dependency information between the layer-group to be held by the subgroup and the subgroup are stored in the header region of the G-PCC bitstream. Therefore, even in a case where the method described in Patent Document 1 is applied to the G-PCC file, it is necessary to parse the G-PCC bitstream in order to obtain these pieces of information. Therefore, the load of the reproduction processing increases, and there is a possibility that the efficiency of partial decoding and adaptive distribution is reduced.

3. Transmission of Space Configuration Information and Dependency Information by Content File

Method 1

Therefore, as illustrated in the top row of the table in FIG. 13, the spatial configuration information of the subgroup and the dependency information of the layer-group and the subgroup are stored in the system layer of the file container (G-PCC file) (Method 1).

For example, an information processing apparatus includes: a metadata generation unit that generates metadata including spatial configuration information of a subgroup and dependency information of the subgroup and the layer-group on the basis of a bitstream of geometry of 3D data; and a file generation unit that generates a file that stores the bitstream and the metadata. Furthermore, in the information processing method, metadata including the spatial configuration information of the subgroup and the dependency information of the subgroup and the layer-group is generated on the basis of the bitstream of the geometry of the 3D data, and a file storing the bitstream and the metadata is generated.

In addition, the information processing apparatus includes: an extraction unit that extracts a desired layer-group and a bitstream of geometry of 3D data corresponding to the subgroup stored in the file on the basis of spatial configuration information of the subgroup and dependency information of the subgroup and the layer-group stored as metadata in the file; and a decoding unit that decodes the extracted bitstream. Furthermore, in the information processing method, on the basis of the spatial configuration information of the subgroup and the dependency information of the subgroup and the layer-group stored in the file as the metadata, the bitstream of the geometry of the 3D data corresponding to the desired layer-group and the subgroup stored in the file is extracted, and the extracted bitstream is decoded.

Note that the layer-group is constituted by one or more layers in the tree structure based on the definition of the geometry. In addition, the subgroup is configured by geometry divided for each region in the layer-group. In addition, the spatial configuration information includes information indicating the position and size of the region corresponding to the subgroup. The dependency information is information indicating a subgroup or a layer-group as a reference destination.

In this way, the reproduction device that decodes the bitstream to reconstruct the 3D data and generates the viewport can easily obtain the spatial configuration information of the subgroup and the dependency information of the layer-group and the subgroup by referring to the system layer of the G-PCC file (without parsing the G-PCC bitstream). That is, by referring to the system layer of the G-PCC file, the reproduction device can easily grasp the spatial configuration of each subgroup (the position, size, and the like of the three-dimensional region corresponding to the subgroup) and the dependency between the layer-group and the subgroup. Therefore, it is possible to suppress an increase in the load of the reproduction processing by the reproduction device. As a result, it is possible to suppress a decrease in partial decoding efficiency such as extracting and decoding a part of the bitstream of the 3D data from the track and reconstructing the part of the 3D data. Furthermore, it is possible to suppress a decrease in the efficiency of adaptive distribution, such as selecting and acquiring some tracks of the G-PCC file, decoding the bitstream of the 3D data in the tracks, and reconstructing some 3D data.

Method 1-1

In a case where Method 1 is applied, spatial configuration information of a subgroup may be stored in a sample entry of a file container (G-PCC file), as illustrated in the second row from the top of the table of FIG. 13 (Method 1-1).

For example, the file generation unit described above may store the spatial configuration information in the sample entry of the file. Furthermore, the extraction unit described above may extract the bitstream on the basis of the spatial configuration information stored in the sample entry of the file.

In this way, the reproduction device that decodes the bitstream to reconstruct the 3D data and generates the viewport can easily obtain the spatial configuration information of the subgroup by referring to the sample entry.

Method 1-1-1

In a case where this Method 1-1 is applied, all layer-groups and subgroups may be stored in one track, as illustrated in the third row from the top of the table of FIG. 13. Then, dependency information of the layer-group and the subgroup may be stored in a sub sample information box (Method 1-1-1).

In this case, the G-PCC file has a track configuration as in the example illustrated in FIG. 14, for example. In the case of the example of FIG. 14, the G-PCC file has one G-PCC track (gpe1 or gpeg) 111. The G-PCC track 111 is associated with timed metadata (3D spatial region & layer) 112.
<Spatial Configuration Information>

In a case where this Method 1-1-1 is applied, the spatial configuration information may be stored in a GPCC layer infobox in a sample entry of the G-PCC file. For example, the file generation unit may store the spatial configuration information in the GPCC layer infobox in the sample entry. Furthermore, the extraction unit may extract the bitstream on the basis of the spatial configuration information stored in the GPCC layer infobox in the sample entry.

FIG. 15 is a diagram illustrating an example of syntax of the GPCC sample entry (GPCCSampleEntry extends VolumetricVisualSampleEntry ('gpe1')). As illustrated in this example, a GPCC layer infobox (GPCCLayerInfoBox) is stored in the GPCC sample entry. The spatial configuration information may be stored in the GPCC layer infobox.

In this way, the reproduction device that decodes the bitstream to reconstruct the 3D data and generates the viewport can easily obtain the spatial configuration information of the subgroup by referring to the GPCC layer infobox.

In this case, the spatial configuration information may be stored in a layer infostruct in a GPCC layer infobox in the sample entry of the G-PCC file. For example, the file generation unit may store the spatial configuration information in the layer infostruct in the GPCC layer infobox. Furthermore, the extraction unit may extract the bitstream on the basis of the spatial configuration information stored in the layer infostruct in the GPCC layer infobox. That is, in addition to the GPCC spatial region infobox (FIG. 9), the GPCC layer infobox may be provided in the GPCC sample entry, and the spatial configuration information of the sample group may be stored in the GPCC layer infobox.

FIG. 16 is a diagram illustrating an example of syntax of the GPCC layer infobox (GPCCLayerInfoBox extends FullBox ('gply', version=0, 0)). As illustrated in this example, a layer infostruct (LayerInfoStruct( )) is stored in the GPCC layer infobox. Note that tile_present is flag information indicating whether or not a tile is present. In a case where a tile is present, tile_present is set to "1", and in a case of being not present, it is set to "0". In a case where tiles are present, this layer infostruct is illustrated for each tile. The spatial configuration information may be stored in the layer infostruct.

FIG. 17 is a diagram illustrating an example of syntax of the layer infostruct (LayerInfoStruct( )). As illustrated in this example, the layer infostruct stores layer_group_id, subgroup_id, 3D spatial region struct (3DSpatialRegionStruct (1)), and the like. The layer_group_id indicates identification information of a layer-group. Note that the identification information of the layer-group of the lowest layer may be stored in the layer infostruct. The subgroup_id indicates identification information of a subgroup. Note that the identification information of the subgroup of the lowest layer may be stored in the layer infostruct. The 3D spatial region struct indicates the spatial configuration information of the layer_group_id and the subgroup corresponding to the subgroup_id. That is, in the layer infostruct, the spatial configuration information is indicated for each subgroup. Similarly to the case of the example of FIG. 10, information such as the position and size of the three-dimensional region is stored in the 3D spatial region struct. However, here, information about the three-dimensional region corresponding to the subgroup is stored. Note that the spatial configuration information of the subgroup of the lowest layer may be stored in the layer infostruct.

In this way, the reproduction device that decodes the bitstream to reconstruct the 3D data and generates the viewport can easily obtain the spatial configuration information of the subgroup by referring to the layer infostruct.
<Quality Information>

In a case where Method 1-1-1 is applied, the quality information indicating the definition of the layer-group may be stored in the sample entry. For example, the file generation unit may store quality information indicating the definition of the layer-group in the sample entry. Furthermore, the extraction unit may further extract the bitstream on the basis of quality information indicating the definition of the layer-group stored in the sample entry.

As illustrated in the example of FIG. 15, a GPCC layer quality infobox (GPCCLayerQualityInfoBox) is stored in the GPCC sample entry. Quality information may be stored in the GPCC layer quality infobox.

In this way, the reproduction device that decodes the bitstream to reconstruct the 3D data and generates the viewport can easily obtain the quality information of the layer-group by referring to the sample entry.

This quality information may also be stored in the GPCC layer quality infobox in the sample entry. For example, the file generation unit may store the quality information in the GPCC layer quality infobox in the sample entry. Furthermore, the extraction unit may extract the bitstream on the basis of the quality information stored in the GPCC layer quality infobox in the sample entry.

FIG. 18 is a diagram illustrating an example of syntax of the GPCC layer quality infobox (GPCCLayerQualityInfoBox( ) extends FullBox ('gplq', version=0, 0)). As illustrated in this example, the GPCC layer quality infobox stores layer_group_id, num_tree_depth, and the like. The layer_group_id indicates identification information of a layer-group. The num_tree_depth is quality information of the layer-group corresponding to the layer_group_id. More specifically, the num_tree_depth indicates the number of geometry tree depths included in the layer-group. That is, the num_tree_depth indicates the definition of each layer-group.

In this way, the reproduction device that decodes the bitstream to reconstruct the 3D data and generates the viewport can easily obtain the quality information of the layer-group by referring to the GPCC layer quality infobox.

<Dependency Information>

In a case where Method 1-1-1 is applied, the dependency information of subgroup and layer-group may be stored in the sub sample information box (SubSampleInformation-Box) of the file container (G-PCC file). For example, dependency information of a subgroup and a layer-group may be stored in codec specific parameters (codec_specific_parameters) in the sub sample information box.

For example, the file generation unit may store the bitstreams of all the layer-groups and all the subgroups in one track of the G-PCC file, and store the dependency information of the subgroups and the layer-group in the sub sample information box of the G-PCC file. In addition, the file generation unit may store the dependency information of the subgroups and the layer-groups in the codec specific parameters in the sub sample information box.

For example, in the G-PCC file, the bitstreams of all the layer-groups and all the subgroups are stored in one track, and the extraction unit may extract the bitstream on the basis of the dependency information of the subgroups and the layer-groups stored in the sub sample information box of the G-PCC file. In addition, the extraction unit may extract the bitstream on the basis of the dependency information of the subgroups and the layer-groups stored in the codec specific parameters in the sub sample information box.

FIG. 19 is a diagram illustrating an example of syntax of the sub sample information box (SubSampleInformationBox extends FullBox ('subs', version, flags)). As illustrated in this example, the sub sample information box stores codec specific parameters (codec_specific_parameters). Dependency information of a subgroup and a layer-group may be stored in the codec specific parameters.

FIG. 20 is a diagram illustrating an example of syntax of codec specific parameters. As illustrated in this example, layer group_id, subgroup_id, ref_layer_group_id, ref_subgroup_id, and the like are stored in the codec specific parameters. The layer_group_id indicates identification information of a layer-group. The subgroup_id indicates identification information of a subgroup. The ref_layer_group_id indicates identification information of a reference destination layer-group. The ref_subgroup_id indicates identification information of a reference destination subgroup. That is, dependency information (information indicating a subgroup or a layer-group as a reference destination) of the subgroup and the layer-group is stored in the codec specific parameters. Note that the layer-group has a dependency relationship only with one layer-group. In addition, a subgroup has a dependency relationship with only one subgroup. In a case where there is no subgroup, the subgroup_id and ref_subgroup_id are set to "0".

Therefore, the reproduction device that decodes the bitstream to reconstruct the 3D data and generates the viewport can easily obtain the dependency information of the subgroup and the layer-group by referring to the codec specific parameters in the sub sample information box.

<Others>

As described above, even in a case where Method 1-1-1 is applied, the reproduction device that decodes the bitstream to reconstruct the 3D data and generates the viewport can easily obtain the spatial configuration information of the subgroup and the dependency information of the layer-group and the subgroup by referring to the system layer of the G-PCC file (without parsing the G-PCC bitstream). Furthermore, the reproduction device can easily obtain the quality information of the layer-group by referring to the system layer of the G-PCC file. That is, by referring to the system layer of the G-PCC file, the reproduction device can easily grasp the spatial configuration of each subgroup (the position, size, and the like of the three-dimensional region corresponding to the subgroup), the dependency between the layer-group and the subgroup, and the definition of each layer-group. Therefore, it is possible to suppress an increase in the load of the reproduction processing by the reproduction device. As a result, it is possible to suppress a decrease in the efficiency of partial decoding by the reproduction device, such as extracting and decoding a part of the bitstream of the 3D data from the track and reconstructing the part of the 3D data.

Note that, in a case where the spatial configuration information and the dependency information (and the quality information) as described above are dynamic, the dynamic spatial region timed metadata (FIG. 12) may be extended to store these pieces of information. For example, in a case where the structure of the layer-group and the subgroup is dynamic, information such as GPCCLayerInfoBox and GPCCLayerQualityInfoBox may be stored in the timed metadata.

Method 1-1-2

Note that in a case where Method 1-1 is applied, layer-groups and subgroups may be stored in separate tracks as illustrated in the fourth row from the top of the table of FIG. 13. Then, the dependency information of the layer-group and the subgroup may be set in a track reference (Method 1-1-2).

In this case, in the G-PCC file, a track is formed for each subgroup (or layer-group), similarly to the examples of FIGS. 6 and 7 (examples in which a track is formed for each tile). In this case, the structure of the track is similar to that in the examples of FIGS. 6 and 7. That is, a layer base track and a layer track are formed in the G-PCC file.

An independently decodable layer-group (that is, the layer-group including the root of the tree structure) is stored in the layer base track. Not only the layer-group including the root of the tree structure but also other layer-groups and subgroups may be stored as long as decoding can be performed by the layer base track alone. The layer track stores other layer-groups and subgroups that cannot be independently decoded. Note that the identification information (layer_group_id) of the layer-group and the identification information (subgroup_id) of the subgroup stored in each track are static (unchanged).

<Spatial Configuration Information>

In a case where this Method 1-1-2 is applied, the spatial configuration information may be stored in a sample entry of the layer base track. For example, the spatial configuration information may be stored in the GPCC layer infobox (GPCCLayerInfoBox) in the sample entry, similarly to the case of Method 1-1-1. The content of the GPCC layer infobox is similar to the case where Method 1-1-1 is applied (FIG. 16). Further, the spatial information may be stored in the layer infostruct (LayerInfoStruct( )) in the GPCC layer infobox, similarly to the case of Method 1-1-1. The content of this layer infostruct is similar to the case where Method 1-1-1 is applied (FIG. 17).

In this way, the reproduction device that decodes the bitstream to reconstruct the 3D data and generates the viewport can easily obtain the spatial configuration information of the subgroup by referring to the sample entry of the layer base track.

<Quality Information>

In a case where Method 1-1-2 is applied, the quality information of the layer-group may be stored in a sample entry of the layer base track. For example, the quality information may be stored in a GPCC layer quality infobox (GPCCLayerQualityInfoBox) in the sample entry. The content of this GPCC layer quality infobox is similar to the case where Method 1-1-1 is applied (FIG. 18).

In this way, the reproduction device that decodes the bitstream to reconstruct the 3D data and generates the viewport can easily obtain the quality information of the layer-group by referring to the sample entry of the layer base track.

<Identification Information of Layer-Group Subgroup>

In addition, the layer base track and the sample entry of the layer track may store the identification information of the layer-group and the identification information of the sub-group stored in each track. For example, the identification information of the layer-group and the identification information of the subgroup stored in the track may be stored in the GPCC track layer infobox (GPCCTrackLayerInfoBox) in the sample entry of each track (the layer base track and the layer track).

FIG. 21 is a diagram illustrating an example of syntax of the GPCC track layer infobox (GPCCTrackLayerInfoBox extends FullBox ('gpt1', version=0, 0)). As illustrated in this example, the GPCC track layer infobox stores layer_group_id, subgroup_id, and the like. The layer_group_id indicates identification information of a layer-group stored in the track. The subgroup_id indicates identification information of a subgroup stored in the track.

<Information on Layer Base Track and Layer Track>

As described above, in the layer base track, the GPCC layer infobox (GPCCLayerInfoBox), the GPCC layer quality infobox (GPCCLayerQualityInfoBox), and the GPCC track layer infobox (GPCCTrackLayerInfoBox) may be signaled. Furthermore, in the layer track, a GPCC layer quality infobox (GPCCLayerQualityInfoBox) and a GPCC track layer infobox (GPCCTrackLayerInfoBox) may be signaled.

In this case, content of the GPCC layer infobox or the GPCC layer quality infobox is similar to the case where Method 1-1-1 is applied.

<Dependency Information>

In a case where Method 1-1-2 is applied, the dependency information of subgroups and layer-groups may be set in a track reference. For example, the file generation unit may store the bitstream in different tracks of the G-PCC file for each layer-group and each subgroup, and set the dependency information in the track reference of the G-PCC file. Furthermore, in the G-PCC file, the bitstream may be stored in different tracks of the G-PCC file for each layer-group and subgroup, and the extraction unit may acquire a track for storing the bitstream corresponding to a desired layer-group and subgroup on the basis of the dependency information set in the track reference of the G-PCC file, and extract the bitstream from the acquired track.

Figure 22:
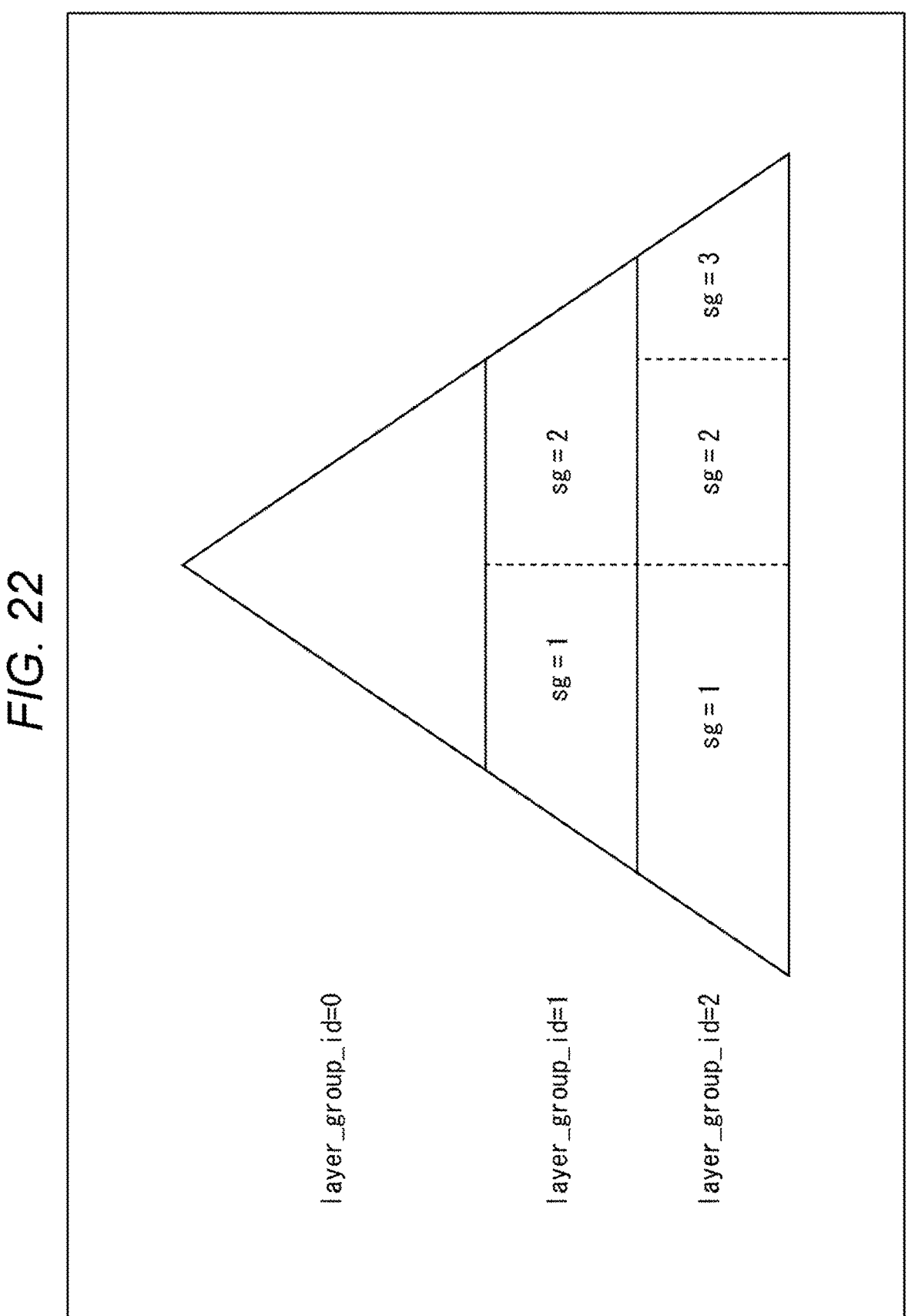
FIG. 22 is a diagram illustrating a configuration example of a layer-group and a subgroup.

For example, it is assumed that (the octree of) the geometry has a layer-group and subgroup configuration as illustrated in FIG. 22. That is, three layer-groups of layer_group_id=0, layer_group_id=1, and layer group_id=2 are formed. In addition, two subgroups (sg=1 and sg=2) are formed in the layer-group of layer_group_id=1. In addition, three subgroups (sg=1 to sg=3) are formed in the layer-group of layer group_id=2. All the subgroups (sg=1, and sg=2) of the layer-group of layer_group_id=1 belong to the layer-group of layer_group_id=0. A subgroup (sg=1) of the layer-group of layer_group_id=2 belongs to a subgroup (sg=1) of the layer-group of layer_group_id=1. A subgroup (sg=2 and sg=3) of the layer-group of layer_group_id=2 belongs to a subgroup (sg=2) of the layer-group of layer_group_id=1.

Figure 23:
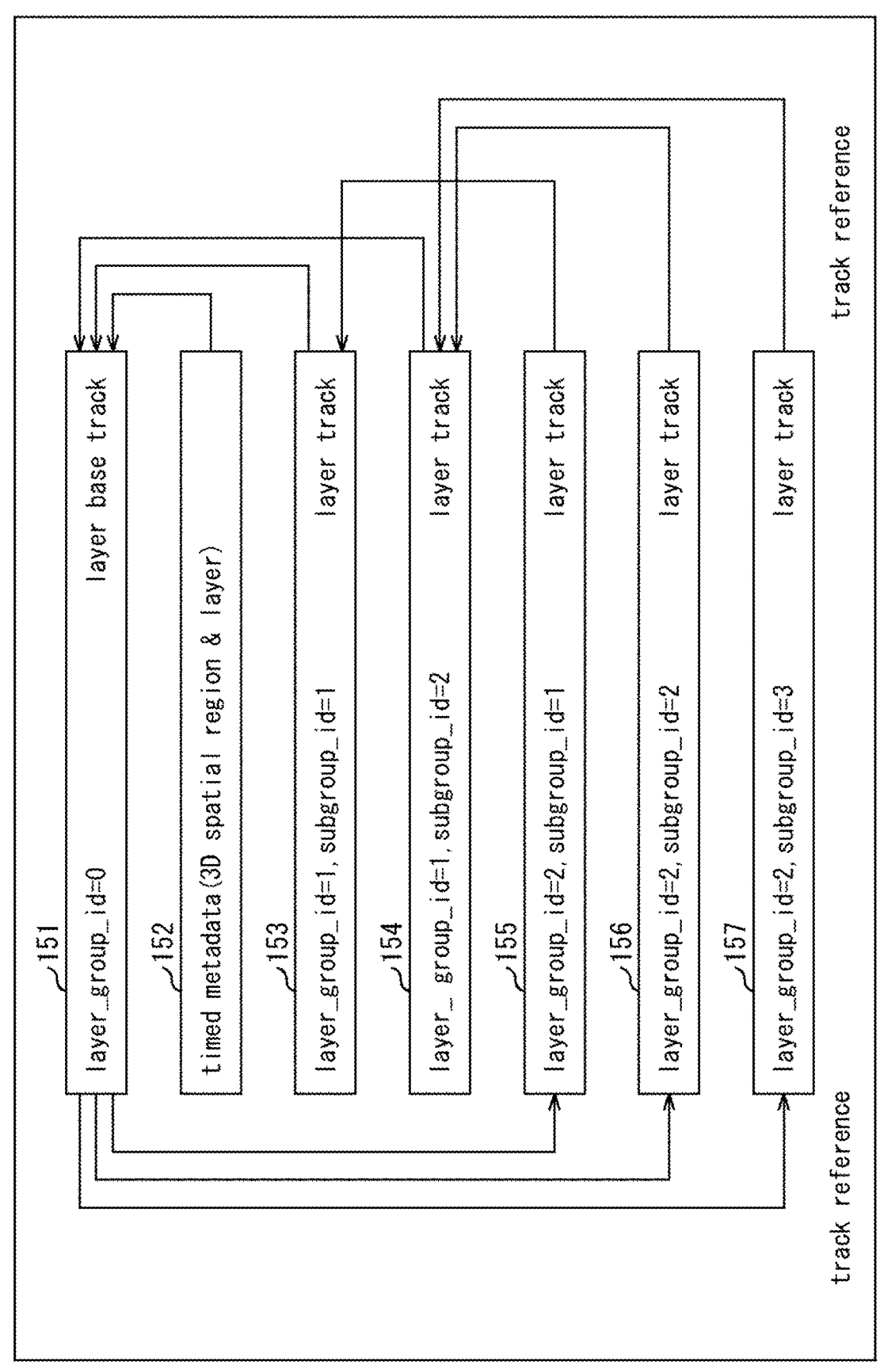
FIG. 23 is a diagram illustrating an example of a track configuration and a track reference.

In the case of having such a configuration of the subgroup, the configuration of the track is, for example, as illustrated in FIG. 23. That is, the layer base track 151 that stores the layer-group of layer_group_id=0 and the layer tracks 152 to 157 that store each subgroup of the other layer-groups are formed.

Then, in the track reference of the layer base track, information indicating the track storing the bitstream of the lowermost layer-group as a reference destination may be set as the dependency information. For example, the file generation unit may set, as the dependency information, information indicating a track storing the bitstream of the lowermost layer-group as a reference destination in the track reference of the layer base track storing the bitstream of the uppermost layer-group. Furthermore, the extraction unit may refer to the track that stores the bitstream of the lowermost layer-group on the basis of the dependency information set in the track reference of the layer base track that stores the bitstream of the uppermost layer-group.

Furthermore, in the track reference of the layer track, information indicating a track (layer track or layer base track) that stores a bitstream of a layer-group higher than the layer track as a reference destination may be set as the dependency information. For example, the file generation unit may set, as the dependency information, information indicating a track storing a bitstream of an upper layer-group as a reference destination in a track reference of a layer track storing a bitstream of a layer-group other than the uppermost layer-group. Furthermore, the extraction unit may refer to a track that stores a bitstream of an upper layer-group on the basis of dependency information set in a track reference of a layer track storing a bitstream of a layer-group other than the uppermost layer-group.

In this way, the reproduction device that decodes the bitstream to reconstruct the 3D data and generates the viewport can easily obtain the dependency information of the layer-group and the subgroup by referring to the track reference of each track.

Others

As described above, even in a case where Method 1-1-2 is applied, the reproduction device that decodes the bitstream to reconstruct the 3D data and generates the viewport can easily obtain the spatial configuration information of the subgroup and the dependency information of the layer-group and the subgroup by referring to the system layer of the G-PCC file (without parsing the G-PCC bitstream). Furthermore, the reproduction device can easily obtain the quality information of the layer-group by referring to the system layer of the G-PCC file. That is, by referring to the system layer of the G-PCC file, the reproduction device can easily grasp the spatial configuration of each subgroup (the position, size, and the like of the three-dimensional region corresponding to the subgroup), the dependency between the layer-group and the subgroup, and the definition of each layer-group. Therefore, it is possible to suppress an increase in the load of the reproduction processing by the reproduction device. As a result, it is possible to suppress a decrease in the efficiency of the adaptive distribution, such as selecting and acquiring some tracks of the G-PCC file, decoding the bitstream of the 3D data in the tracks, and reconstructing some 3D data.

Note that dependency information (for example, ref_layer_group_id, ref_subgroup_id, and the like) of the layer-group and the subgroup may be stored in the sample entry of the layer track. Furthermore, in that case, the track reference of the layer track may be omitted.

Furthermore, the GPCC track layer infobox (GPCCTrack-LayerInfoBox) may be stored only in the layer track storing the subgroup of the lowest layer of the tree structure of the geometry, and may not be stored in other layer tracks.

<Slice Order>

In the G-PCC, each slice is combined before decoding the bitstream. In a case where slice_reordering_constraint_flag=1, it is required to input the slice order indicating the slice combination order to the decoder while maintaining the slice order. For example, it is conceivable that the slices are combined in the order described by for loop in the track reference of the layer base track.

However, this technique can be applied only in a case where the slice order of the samples in each track (the sample combination order in reconstructing the bitstream) is static. On the other hand, in the configuration of the layer base track and the layer track described above, the allocation of the subgroup_id to the slice may change (may be dynamic) for each sample. Therefore, in the method of combining the slices according to the order of for loop in the track reference, it is difficult to cope with this.

Figure 24:
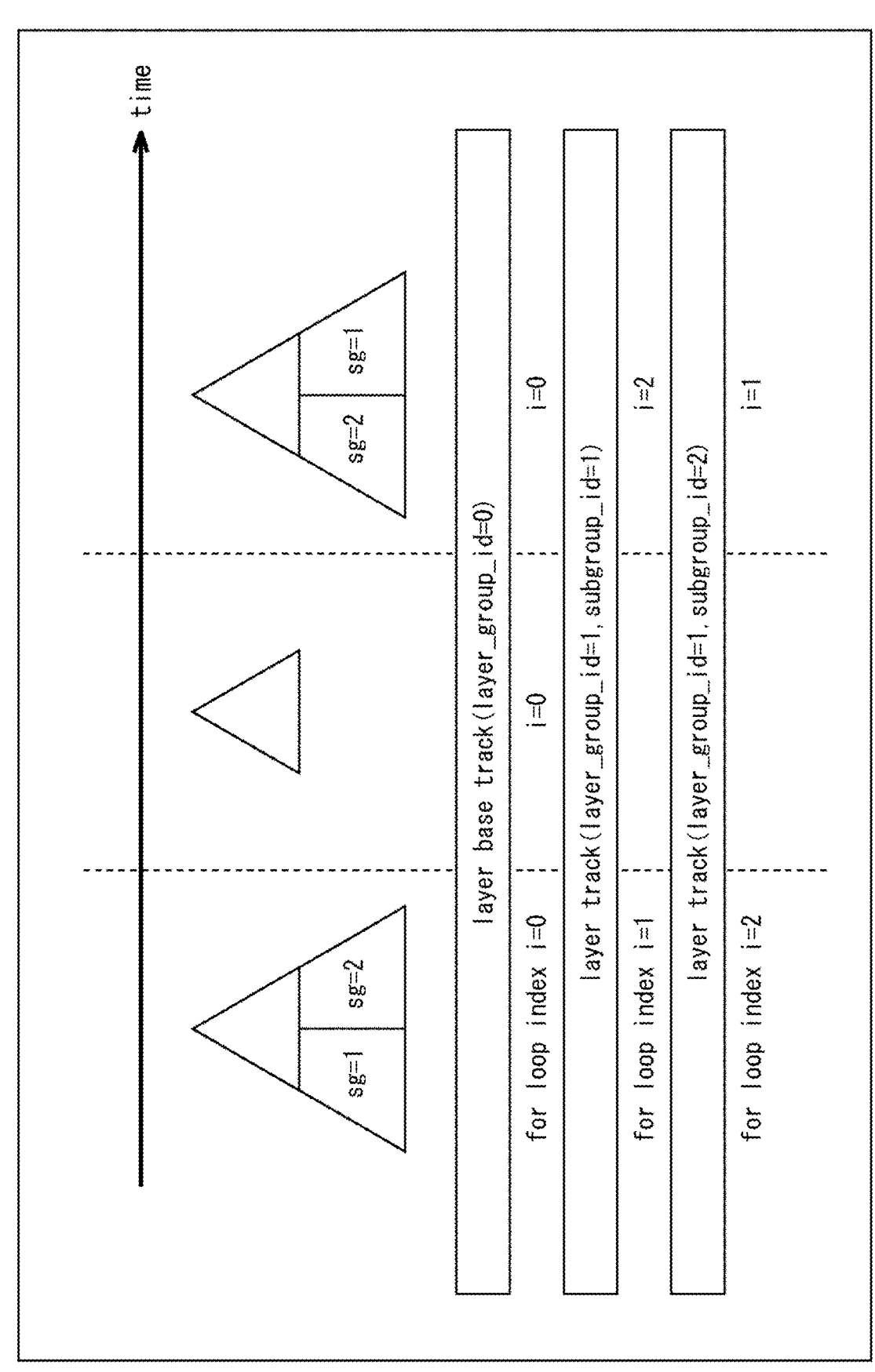
FIG. 24 is a diagram for explaining a slice order.

For example, in FIG. 24, it is assumed that the arrow direction is the time-series direction. In the case of this example, the tree structure of the geometry (the structure of the subgroup) is changing (dynamic) along this time series. On the other hand, the subgroup (or layer-group) stored in each track is static (does not change in the time-series direction). Therefore, it is necessary to make the order of the for loop in the track reference (the description order of each track) dynamic, but the order of the for loop is static in the methods described in Non-Patent Document and Patent Document described above.

Therefore, the order of combining the samples in each track is specified for each sample duration using timed metadata. That is, a slice order box (SliceOrderBox) that clearly indicates the order of combining the samples in each track is stored in the timed metadata for each sample duration.

FIG. 25 is a diagram illustrating an example of syntax of the slice order box (SliceOrderBox extends FullBox ('sord', version=0, 0)). As illustrated in this example, the slice order box stores identification information (track_id) of each track. The description order (storage order) by for loop of the identification information (track_id) of each track indicates the sample combination order. Such a slice order box is stored in the timed metadata for each sample duration.

In this way, it is also possible to cope with a change in the time direction of the tree structure (structure of the subgroup) of the geometry. That is, in a case where slice_reordering_constraint_flag=1, the slice order indicating the slice combination order can be maintained and input to the decoder.

Note that layer group_id and subgroup_id may be used instead of track_id. Furthermore, the slice combination order may be indicated using a sample group.

Method 1-2

In addition, in a case where Method 1 is applied, as illustrated in the fifth row from the top of the table of FIG. 13, the spatial configuration information of the subgroup and the dependency information of the layer-group and the subgroup may be stored in the sample entry of the file container (G-PCC file) (Method 1-2).

In this way, the reproduction device that decodes the bitstream to reconstruct the 3D data and generates the viewport can easily obtain the spatial configuration information of the subgroup and the dependency information of the layer-group and the subgroup by referring to the sample entry.

In addition, in a case where Method 1-2 is applied, similarly to the case of Method 1-1 described above, the quality information of the layer-group may be stored in the sample entry. However, for this Method 1-2, the quality information of the layer-group may be stored in the GPCC layer infobox in the sample entry. For example, the quality information of the layer-group may be stored in a layer infostruct in its GPCC layer infobox. That is, for example, the file generation unit may store the quality information of the layer-group in the GPCC layer infobox in the sample entry. Furthermore, the file generation unit may store the quality information of the layer-group in the layer infostruct in the GPCC layer infobox. Furthermore, the extraction unit may extract the bitstream on the basis of the quality information of the layer-group stored in the GPCC layer infobox in the sample entry. Furthermore, the extraction unit may extract the bitstream on the basis of the quality information of the layer-group stored in the layer infostruct in the GPCC layer infobox.

In this way, the reproduction device that decodes the bitstream to reconstruct the 3D data and generates the viewport can easily obtain the quality information of the layer-group by referring to ((the layer infostruct of) the GPCC layer infobox of) the sample entry.

Method 1-2-1

In a case where this Method 1-2 is applied, all layer-groups and subgroups may be stored in one track (Method 1-2-1), as illustrated in the sixth row from the top of the table of FIG. 13.

In this case, the G-PCC file has a track configuration as in the example illustrated in FIG. 14, for example. As described above, in the case of the example of FIG. 14, the G-PCC file has one G-PCC track (gpe1 or gpeg) 111 and timed metadata (3D spatial region & layer) 112 associated with the G-PCC track.

In a case where this Method 1-2-1 is applied, the spatial configuration information of the subgroup may be stored in the GPCC layer infobox in the sample entry of the G-PCC file, similarly to the case of Method 1-1-1. In addition, the spatial configuration information of the subgroup may be stored in the layer infostruct in the GPCC layer infobox in the sample entry of the G-PCC file.

In addition, in a case where this Method 1-2-1 is applied, the dependency information of the subgroup and the layer-group may also be stored in the GPCC layer infobox in the sample entry of the G-PCC file. For example, the dependency information of the subgroup and the layer-group may be stored in the layer infostruct in the GPCC layer infobox in the sample entry of the G-PCC file.

That is, for example, the file generation unit may store the bitstreams of all the layer-groups and all the subgroups in one track of the G-PCC file, and store the dependency information of the subgroups and the layer-groups in the sample entry of the G-PCC file. Furthermore, the file generation unit may store the dependency information of the subgroups and the layer-groups in the GPCC layer infobox in the sample entry. Furthermore, the file generation unit may store the dependency information of the subgroups and the layer-groups in the layer infostruct in the GPCC layer infobox. In addition, in the G-PCC file, the bitstreams of all the layer-groups and all the subgroups are stored in one track, and the extraction unit may extract the bitstream on the basis of the dependency information of the subgroups and the layer-groups stored in the sample entry of the G-PCC file. Furthermore, the extraction unit may extract the bitstream on the basis of the dependency information of the subgroups and the layer-groups stored in the GPCC layer infobox in the sample entry. Furthermore, the extraction unit may extract the bitstream on the basis of the dependency information of the subgroups and the layer-groups stored in the layer infostruct in the GPCC layer infobox.

In addition, in a case where Method 1-2-1 is applied, similarly to the case of Method 1-2, the quality information indicating the definition of the layer-group may be stored in ((the layer infostruct of) the GPCC layer infobox of) the sample entry.

Syntax of the GPCC layer infobox may be similar to the example of FIG. 16. FIG. 26 is a diagram illustrating an example of syntax of the layer infostruct (LayerInfo-Struct( )) in a case where Method 1-2-1 is applied. As illustrated in this example, the layer infostruct in this case stores layer_group_id, num_tree_depth, a 3D spatial region struct (3DSpatialRegionStruct(1)), subgroup_id, ref_sub-group_id, and the like. The layer group_id indicates identification information of a layer-group. The subgroup_id indicates identification information of a subgroup. The 3D spatial region struct indicates the spatial configuration information of the layer group_id and the subgroup corresponding to the subgroup_id. In the layer infostruct in this case, the spatial configuration information is indicated for all the subgroups.

The ref_subgroup_id indicates identification information of a reference destination subgroup. That is, the layer infostruct in this case stores dependency information of the subgroup and the layer-group. Note that the layer-group dependency is indicated by the processing order (description order) of for loop. Note that the layer-group (i) of i=n+1 depends on the layer-group (i) of i=n.

Num_tree_depth is the quality information of the layer-group corresponding to layer_group_id. More specifically, the num_tree_depth indicates the number of geometry tree depths included in the layer-group. That is, num_tree_depth is quality information indicating the definition of the layer-group.

Therefore, in this case, the reproduction device that decodes the bitstream to reconstruct the 3D data and generates the viewport can easily obtain the spatial configuration information of the subgroup, the dependency information of the subgroup and the layer-group, and the quality information of the layer-group by referring to (the layer infostruct of) the GPCC layer infobox in the sample entry of the G-PCC file.

Note that FIG. 27 illustrates an example of syntax of codec specific parameters in the sub sample information box in a case where Method 1-2-1 is applied. As illustrated in this example, layer_group_id, subgroup_id, and the like are stored in the codec specific parameters in this case. The layer_group_id indicates identification information of a layer-group. The subgroup_id indicates identification information of a subgroup. That is, in the codec specific parameters in this case, identification information of the layer-group and the subgroup for each slice is stored.

Note that, in a case where the spatial configuration information of the subgroup and the dependency information of the layer-group and the subgroup are dynamic (change in a time-series direction), these pieces of information is only required to be stored in dynamic spatial region timed metadata.

As described above, even in a case where Method 1-2-1 is applied, the reproduction device that decodes the bitstream to reconstruct the 3D data and generates the viewport can easily obtain the spatial configuration information of the subgroup and the dependency information of the layer-group and the subgroup by referring to the system layer of the G-PCC file (without parsing the G-PCC bitstream). Furthermore, the reproduction device can easily obtain the quality information of the layer-group by referring to the system layer of the G-PCC file. That is, by referring to the system layer of the G-PCC file, the reproduction device can easily grasp the spatial configuration of each subgroup (the position, size, and the like of the three-dimensional region corresponding to the subgroup), the dependency between the layer-group and the subgroup, and the definition of each layer-group. Therefore, it is possible to suppress an increase in the load of the reproduction processing by the reproduction device. As a result, reduction in the efficiency of partial decoding by the reproduction device can be suppressed.

Method 1-2-2

Also, in a case where Method 1-2 is applied, the layer-groups and subgroups may be stored in separate tracks as illustrated in the bottom row of the table of FIG. 13 (Method 1-2-2).

In this case, in the G-PCC file, a track is formed for each subgroup (or layer-group), similarly to the examples of FIGS. 6 and 7 (examples in which a track is formed for each tile). In this case, the structure of the track is similar to that in the examples of FIGS. 6 and 7. That is, in the G-PCC file, a layer base track and a layer track similar to the case of Method 1-1-2 are formed.

In a case where this Method 1-2-2 is applied, the spatial configuration information of the subgroup, the dependency information of the layer-group and the subgroup, and the quality information of the layer-group may be stored in a sample entry of the layer base track. For example, these pieces of information may be stored in the GPCC layer infobox (GPCCLayerInfoBox) in the sample entry, similarly to the case of Method 1-2-1. The content of the GPCC layer infobox is similar to the case of Method 1-1-1 (FIG. 16). Further, these pieces of information may be stored in the layer infostruct (LayerInfoStruct( )) in the GPCC layer infobox, similarly to the case of Method 1-2-1. The content of this layer infostruct is similar to the case of Method 1-2-1 (FIG. 26).

In addition, the layer base track and the sample entry of the layer track may store the identification information of the layer-group and the identification information of the sub-group stored in each track. For example, the identification information of the layer-group and the identification information of the subgroup stored in the track may be stored in the GPCC track layer infobox (GPCCTrackLayerInfoBox)

in the sample entry of each track (the layer base track and the layer track). The content of the GPCC track layer infobox is similar to the case of Method 1-1-2 (FIG. 21).

As described above, in the layer base track, the GPCC layer infobox (GPCCLayerInfoBox) and the GPCC track layer infobox (GPCCTrackLayerInfoBox) may be signaled. Furthermore, in the layer track, the GPCC track layer infobox (GPCCTrackLayerInfoBox) may be signaled.

Therefore, in this case, the reproduction device that decodes the bitstream to reconstruct the 3D data and generates the viewport can easily obtain the spatial configuration information of the subgroup, the dependency information of the subgroup and the layer-group, and the quality information of the layer-group by referring to ((the layer infostruct of) the GPCC layer infobox of) the sample entry of the layer base track.

<Dependency Information>

Note that in a case where Method 1-2-2 is applied, the dependency information of the subgroup and the layer-group may be further set in a track reference of the layer base track.

For example, the file generation unit may store the bitstream in different tracks of the G-PCC file for each layer-group and subgroup, and set the dependency information of the layer-group and the subgroup in the sample entry of the layer base track and the track reference of the layer base track. At that time, the file generation unit may store the dependency information of the layer-group and the subgroup in the GPCC layer infobox in the sample entry. At that time, the file generation unit may store the dependency information of the layer-group and the subgroup in the layer infostruct in the GPCC layer infobox.

Furthermore, in the G-PCC file, the bitstream may be stored in different tracks of the G-PCC file for each layer-group and subgroup, and the extraction unit may acquire a track for storing the bitstream corresponding to a desired layer-group and subgroup on the basis of the dependency information of the layer-group and subgroup set in the sample entry of the layer base track and the track reference of the layer base track, and extract the bitstream from the acquired track. At that time, the extraction unit may extract the bitstream on the basis of the dependency information of the layer-group and the subgroup stored in the GPCC layer infobox in the sample entry. At that time, the extraction unit may extract the bitstream on the basis of the dependency information of the layer-group and the subgroup stored in the layer infostruct in the GPCC layer infobox.

In addition, the file generation unit may set information indicating all the layer tracks storing the bitstreams of other layer-groups as reference destinations in the track reference of the layer base track storing the bitstream of the uppermost layer-group as the dependency information of the layer-group and the subgroup. Furthermore, the extraction unit may refer to all the layer tracks that store the bitstreams of other layer-groups on the basis of the dependency information set in the track reference of the layer base track that stores the bitstream of the uppermost layer-group.

Figure 28:
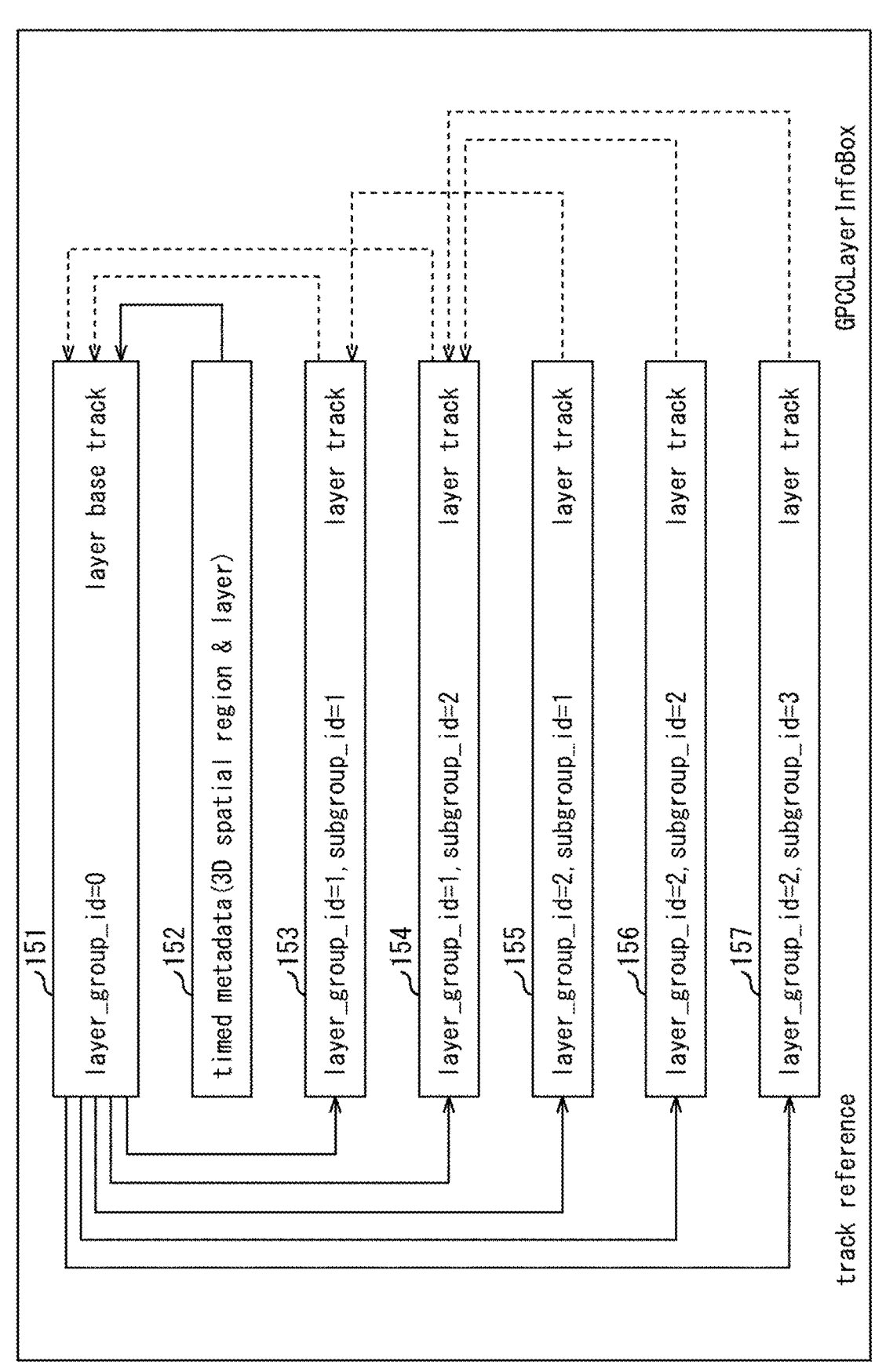
FIG. 28 is a diagram illustrating an example of a track configuration and a track reference.

That is, in the case of Method 1-2-2, as illustrated in FIG. 28, dependency information having each of all the layer tracks as a reference destination may be set in the track reference of the layer base track. Note that, in this case, as illustrated in FIG. 28, the dependency information is not set in the track reference of each layer track (substituted by the dependency information of the GPCC layer infobox).

As described above, even in a case where Method 1-2-2 is applied, the reproduction device that decodes the bitstream to reconstruct the 3D data and generates the viewport can easily obtain the spatial configuration information of the subgroup and the dependency information of the layer-group and the subgroup by referring to the system layer of the G-PCC file (without parsing the G-PCC bitstream). Furthermore, the reproduction device can easily obtain the quality information of the layer-group by referring to the system layer of the G-PCC file. That is, by referring to the system layer of the G-PCC file, the reproduction device can easily grasp the spatial configuration of each subgroup (the position, size, and the like of the three-dimensional region corresponding to the subgroup), the dependency between the layer-group and the subgroup, and the definition of each layer-group. Therefore, it is possible to suppress an increase in the load of the reproduction processing by the reproduction device. As a result, it is possible to suppress a reduction in the efficiency of the adaptive distribution.

<Information Transmission Using Matroska Media Container>

Figure 29:
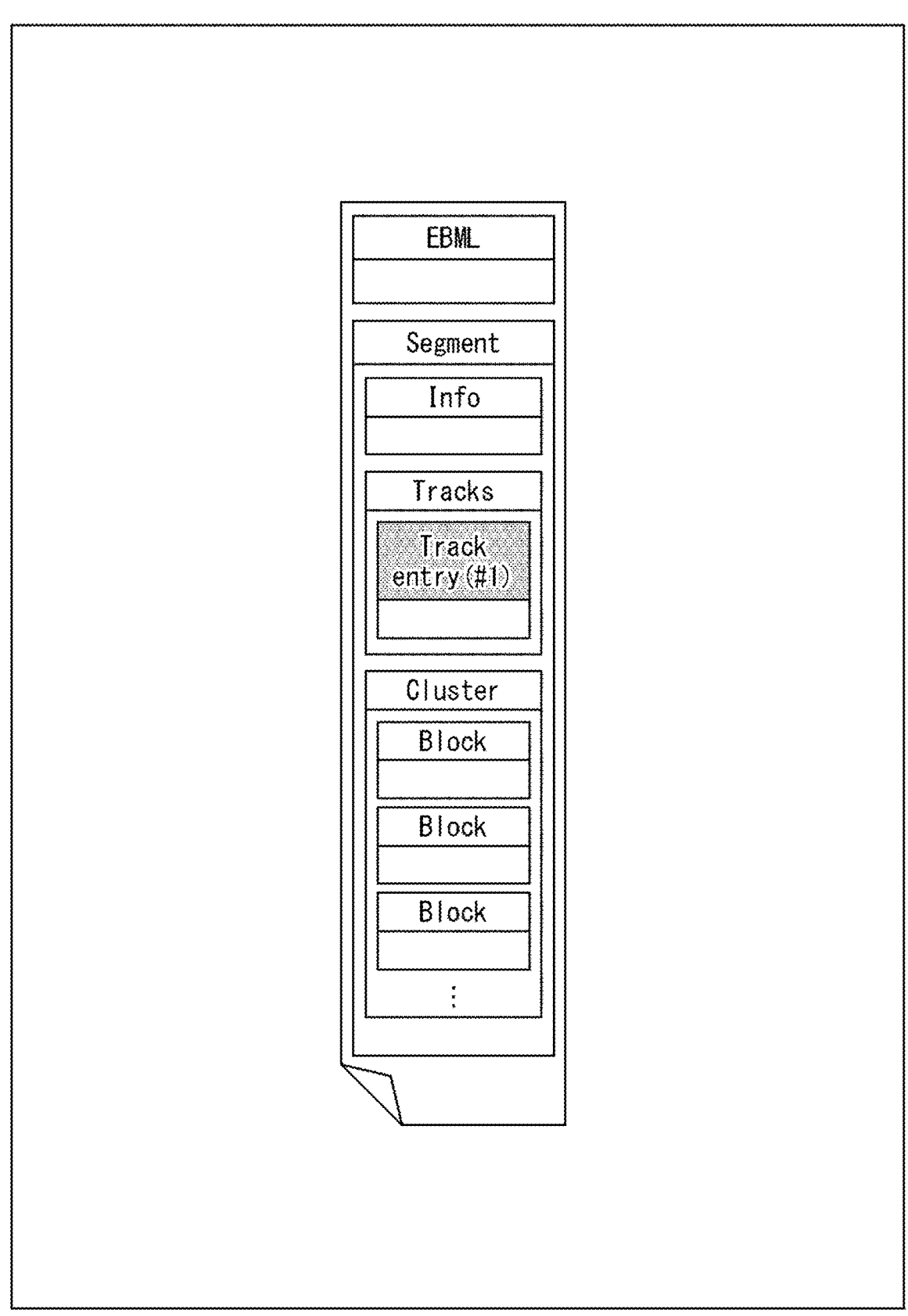
FIG. 29 is a diagram illustrating a configuration example of a Matroska media container.

Although the example in which the ISOBMFF is applied as the file format has been described above, any file to store the G-PCC bitstream may be used and a file format other than the ISOBMFF may be adopted. For example, the G-PCC bitstream may be stored in a Matroska media container. A main configuration example of the Matroska media container is illustrated in FIG. 29.

In this case, for example, the spatial configuration information of the subgroup, the dependency information of the subgroup and the layer-group, the quality information of the layer-group, and the like may be stored as a newly defined element under the Track Entry element. In addition, in a case where these pieces of information are stored in timed metadata, the timed metadata may be stored in a Track entry different from the Track entry in which the G-PCC bitstream is stored.

That is, also in this case, the spatial configuration information of the subgroup, the dependency information of the subgroup and the layer-group, the quality information of the layer-group, and the like are stored in the system layer of the Matroska media container. Therefore, the reproduction device that decodes the bitstream to reconstruct the 3D data and generates the viewport can easily obtain these pieces of information by referring to the system layer (without parsing the G-PCC bitstream). That is, the reproduction device can easily grasp the spatial configuration of each subgroup (the position, size, and the like of the three-dimensional region corresponding to the subgroup), the dependency between the layer-group and the subgroup, and the definition of each layer-group by referring to the system layer of the Matroska media container. Therefore, it is possible to suppress an increase in the load of the reproduction processing by the reproduction device. As a result, it is possible to suppress a decrease in efficiency of partial decoding and adaptive distribution.

4. First Embodiment

<File Generation Device>

The present technology described above can be applied to any device. FIG. 30 is a block diagram illustrating an example of a configuration of a file generation device that is an aspect of the information processing apparatus to which the present technology is applied. A file generation device 300 illustrated in FIG. 30 is a device that encodes point cloud data by applying G-PCC and stores a G-PCC bitstream generated by the encoding in ISOBMFF (G-PCC file).

The file generation device 300 applies the above-described present technology and stores the G-PCC bitstream in the G-PCC file so as to enable partial access. That is, the file generation device 300 stores the spatial configuration information of the subgroup and the dependency information of the layer-group and the subgroup in the system layer of the G-PCC file.

Note that, in FIG. 30, main parts of processing units, data flows, and the like are illustrated, and those illustrated in FIG. 30 are not necessarily all. That is, in the file generation device 300, there may be a processing unit not illustrated as a block in FIG. 30, or there may be processing or a data flow not illustrated as an arrow or the like in FIG. 30.

As illustrated in FIG. 30, the file generation device 300 includes an extraction unit 311, an encoding unit 312, a bitstream generation unit 313, a metadata generation unit 314, and a file generation unit 315. Furthermore, the encoding unit 312 includes a geometry encoding unit 321, an attribute encoding unit 322, and a metadata generation unit 323.

The extraction unit 311 extracts geometry data and attribute data from point cloud data input to the file generation device 300. The extraction unit 311 supplies data of the extracted geometry to the geometry encoding unit 321 of the encoding unit 312. Furthermore, the extraction unit 311 supplies the data of the extracted attribute to the attribute encoding unit 322 of the encoding unit 312.

The encoding unit 312 encodes data of a point cloud. The geometry encoding unit 321 encodes the geometry data supplied from the extraction unit 311 to generate a geometry bitstream. The geometry encoding unit 321 supplies the generated geometry bitstream to the metadata generation unit 323. Furthermore, the geometry encoding unit 321 also supplies the generated geometry bitstream to the attribute encoding unit 322.

The attribute encoding unit 322 encodes the data of the attribute supplied from the extraction unit 311 to generate an attribute bitstream. The attribute encoding unit 322 supplies the generated attribute bitstream to the metadata generation unit 323.

The metadata generation unit 323 refers to the supplied geometry bitstream and attribute bitstream, and generates metadata to be stored in the G-PCC bitstream. The metadata generation unit 323 supplies the generated metadata to the bitstream generation unit 313 together with the geometry bitstream and the attribute bitstream.

The bitstream generation unit 313 multiplexes the supplied geometry bitstream, attribute bitstream, and metadata to generate a G-PCC bitstream. The bitstream generation unit 313 supplies the generated G-PCC bitstream to the metadata generation unit 314.

The metadata generation unit 314 applies the present technology described above in <3. Transmission of Space Configuration Information and Dependency Information by Content File>, and generates metadata to be stored in the system layer of the G-PCC file on the basis of the supplied G-PCC bitstream. That is, the metadata generation unit 314 generates metadata including the spatial configuration information of the subgroup and the dependency information of the subgroup and the layer-group on the basis of the G-PCC bitstream. Note that the metadata generation unit 314 may also generate the quality information of the layer-group on the basis of the G-PCC bitstream. At that time, the metadata generation unit 314 can apply an arbitrary method among the various methods described above in <3. Transmission of Space Configuration Information and Dependency Information by Content File>. The metadata generation unit 314 supplies the generated metadata to the file generation unit 315 together with the G-PCC bitstream.

The file generation unit 315 applies the present technology described above in <3. Transmission of Space Configuration Information and Dependency Information by Content File>, and generates a G-PCC file (also referred to as a content file) that stores the supplied G-PCC bitstream and metadata. At that time, the file generation unit 315 can apply an arbitrary method among the various methods described above in <3. Transmission of Space Configuration Information and Dependency Information by Content File>. The file generation unit 315 outputs the G-PCC file (that is, the content file) generated as described above to the outside of the file generation device 300.

With such a configuration, the file generation device 300 can obtain a similar effect to the case of <3. Transmission of Space Configuration Information and Dependency Information by Content File>. That is, the file generation device 300 can suppress an increase in the load of the reproduction processing.

<Flow of File Generation Processing>

An example of a flow of file generation processing executed by the file generation device 300 will be described with reference to a flowchart of FIG. 31.

When the file generation processing is started, the extraction unit 311 of the file generation device 300 extracts the geometry and the attribute from the point cloud in step S301.

In step S302, the encoding unit 312 encodes the geometry and the attribute extracted in step S301 to generate a geometry bitstream and an attribute bitstream. The encoding unit 312 further generates the metadata.

In step S303, the bitstream generation unit 313 multiplexes the geometry bitstream, the attribute bitstream, and the metadata generated in step S302 to generate a G-PCC bitstream.

In step S304, the metadata generation unit 314 applies the present technology described above in <3. Transmission of Space Configuration Information and Dependency Information by Content File>, and generates metadata including the spatial configuration information of the subgroup and the dependency information of the subgroup and the layer-group on the basis of the G-PCC bitstream generated in step S303. This metadata is metadata stored in the system layer of the G-PCC file. At that time, the metadata generation unit 314 can apply an arbitrary method among the various methods described above in <3. Transmission of Space Configuration Information and Dependency Information by Content File>.

In step S305, the file generation unit 315 generates other information as necessary, applies the present technology described above in <3. Transmission of Space Configuration Information and Dependency Information by Content File>, and generates the G-PCC file (that is, the content file) storing the G-PCC bitstream generated in step S303 and the metadata generated in step S304.

In step S306, the file generation unit 315 outputs the G-PCC file (that is, the content file) generated in step S305 to the outside of the file generation device 300.

When the processing of step S306 ends, the file generation processing ends.

As described above, the file generation device 300 applies the present technology in the file generation processing, generates the metadata including the spatial configuration information of the subgroup and the dependency information of the subgroup and the layer-group, and stores the metadata in the system layer of the G-PCC file. In this way, the file generation device 300 can obtain a similar effect to the case of <3. Transmission of Space Configuration Information and Dependency Information by Content File>. That is, the file generation device 300 can suppress an increase in the load of the reproduction processing.

<Reproduction Device>

FIG. 32 is a block diagram illustrating an example of a configuration of a reproduction device that is an aspect of an information processing apparatus to which the present technology is applied. A reproduction device 400 illustrated in FIG. 32 is a device that decodes a G-PCC bitstream stored in ISOBMFF (G-PCC file), reconstructs a point cloud, and renders the point cloud to generate presentation information.

The reproduction device 400 applies the above-described present technology, extracts a bitstream of a desired 3D spatial region of a point cloud from the G-PCC file by partial access, decodes the extracted bitstream, and reconstructs the point cloud of the 3D spatial region. That is, the reproduction device 400 can reproduce only a part of the point cloud by partial access.

Note that, in FIG. 32, main parts of processing units, data flows, and the like are illustrated, and those illustrated in FIG. 32 are not necessarily all. That is, in the reproduction device 400, there may be a processing unit not illustrated as a block in FIG. 32, or there may be processing or a data flow not illustrated as an arrow or the like in FIG. 32.

As illustrated in FIG. 32, the reproduction device 400 includes a control unit 401, a file acquisition unit 411, a reproduction processing unit 412, and a presentation processing unit 413. The reproduction processing unit 412 includes a file processing unit 421, a decoding unit 422, and a presentation information generation unit 423.

The control unit 401 controls each processing unit in the reproduction device 400. The file acquisition unit 411 is controlled by the reproduction processing unit 412, acquires a G-PCC file or the like storing a point cloud to be reproduced, and supplies the G-PCC file or the like to (the file processing unit 421 of) the reproduction processing unit 412. For example, the file acquisition unit 411 may acquire the entire G-PCC file storing the point cloud to be reproduced under the control of the reproduction processing unit 412 and supply the entire G-PCC file to the reproduction processing unit 412. Furthermore, the file acquisition unit 411 may acquire information of the system layer of the G-PCC file that stores the point cloud to be reproduced under the control of the reproduction processing unit 412 and supply the information to the reproduction processing unit 412. Furthermore, the file acquisition unit 411 may acquire a track (for example, a layer base track, a layer track, or the like) designated by the reproduction processing unit 412 among the tracks stored in the G-PCC file that stores the point cloud to be reproduced, and supply the track to the reproduction processing unit 412.

The reproduction processing unit 412 performs a process related to reproduction of a point cloud stored in the supplied G-PCC file.

The file processing unit 421 of the reproduction processing unit 412 controls the file acquisition unit 411 to acquire the entire or a part of the G-PCC file. Then, the file processing unit 421 acquires information (G-PCC file or the like) supplied from the file acquisition unit 411. Further, the file processing unit 421 performs various processes using the acquired information. For example, the file processing unit 421 may control the file acquisition unit 411 on the basis of the information of the system layer of the G-PCC file. Further, the file processing unit 421 may extract the bitstream from the track of the G-PCC file. At that time, the file processing unit 421 applies the present technology described above in <3. Transmission of Space Configuration Information and Dependency Information by Content File>, and extracts a bitstream corresponding to a point cloud of a desired definition (layer-group) of a desired region (subgroup) on the basis of the spatial configuration information of the subgroup and the dependency information of the subgroup and the layer-group stored as metadata in the G-PCC file. The file processing unit 421 supplies the extracted bitstream to the decoding unit 422.

The decoding unit 422 applies the present technology described above in <3. Transmission of Space Configuration Information and Dependency Information by Content File>, decodes the bitstream supplied from the file processing unit 421, and generates data of geometry and attribute. The decoding unit 422 supplies data of the generated geometry and attribute to the presentation information generation unit 423.

The presentation information generation unit 423 constructs a point cloud using the supplied geometry and attribute data, and generates presentation information that is information for presenting (for example, displaying) the point cloud. For example, the presentation information generation unit 423 performs rendering using a point cloud, and generates a display image of the point cloud viewed from a predetermined viewpoint as the presentation information. The presentation information generation unit 423 supplies the presentation information generated in this manner to the presentation processing unit 413.

The presentation processing unit 413 performs processing of presenting the supplied presentation information. For example, the presentation processing unit 413 supplies the presentation information to a display device or the like outside the reproduction device 400 to present.

<Reproduction Processing Unit>

FIG. 33 is a block diagram illustrating a main configuration example of the reproduction processing unit 412. As illustrated in FIG. 33, the file processing unit 421 includes a bitstream extraction unit 431. The decoding unit 422 includes a geometry decoding unit 441 and an attribute decoding unit 442. The presentation information generation unit 423 includes a point cloud construction unit 451 and a presentation processing unit 452.

The bitstream extraction unit 431 extracts a bitstream from the supplied G-PCC file. At that time, the bitstream extraction unit 431 applies the present technology described above in <3. Transmission of Space Configuration Information and Dependency Information by Content File>, and extracts a bitstream corresponding to a point cloud of desired definition (layer-group) of a desired region (subgroup) from the G-PCC file on the basis of the spatial configuration information of the subgroup and the dependency information of the subgroup and the layer-group stored as metadata in the G-PCC file. At that time, the bitstream extraction unit 431 can apply an arbitrary method among the various methods described above in <3. Transmission of Space Configuration Information and Dependency Information by Content File>. The bitstream extraction unit 431 supplies the extracted geometry bitstream to the geometry decoding unit 441. Furthermore, the bitstream extraction unit 431 supplies the extracted attribute bitstream to the attribute decoding unit 442.

The geometry decoding unit 441 decodes the supplied geometry bitstream to generate geometry data. At that time, the geometry decoding unit 441 may decode the geometry bitstream by applying the present technology described above in <3. Transmission of Space Configuration Information and Dependency Information by Content File>. The geometry decoding unit 441 supplies data of the generated geometry to the point cloud construction unit 451. The attribute decoding unit 442 decodes the supplied attribute bitstream and generates data of the attribute. The attribute decoding unit 442 supplies the data of the generated attribute to the point cloud construction unit 451.

The point cloud construction unit 451 reconstructs a point cloud using the supplied geometry and attribute data. The point cloud construction unit 451 supplies the data of the reconstructed point cloud to the presentation processing unit 452.

The presentation processing unit 452 generates presentation information by using the supplied point cloud data. The presentation processing unit 452 supplies the generated presentation information to the presentation processing unit 413.

With such a configuration, the reproduction device 400 can obtain a similar effect to the case of <3. Transmission of Space Configuration Information and Dependency Information by Content File>. That is, the reproduction device 400 can suppress an increase in the load of the reproduction processing.

<Flow of Reproduction Processing>

An example of a flow of reproduction processing executed by the reproduction device 400 will be described with reference to a flowchart of FIG. 34.

When the reproduction processing is started, in step S401, the file processing unit 421 of the reproduction device 400 applies the present technology described above in <3. Transmission of Space Configuration Information and Dependency Information by Content File>, and controls the file acquisition unit 411 on the basis of the metadata such as the spatial configuration information of the subgroup and the dependency information of the layer-group and the subgroup stored in the G-PCC file (that is, the content file) to acquire a track (group) necessary for obtaining 3D data with desired definition in a desired region of the content file. The file acquisition unit 411 acquires the requested track (group) according to the control.

In step S402, (the bitstream extraction unit 431 of) the file processing unit 421 applies the present technology described above in <3. Transmission of Space Configuration Information and Dependency Information by Content File>, and acquires a sample (group) belonging to a desired time frame stored in the track (group) acquired in step S401 on the basis of metadata such as the spatial configuration information of the subgroup, the dependency information of the layer-group and the subgroup stored in the G-PCC file (that is, the content file). At that time, (the bitstream extraction unit 431 of) the file processing unit 421 can apply an arbitrary method among the various methods described above in <3. Transmission of Space Configuration Information and Dependency Information by Content File>.

In step S403, the geometry decoding unit 441 of the decoding unit 422 decodes the sample (group) of the geometry extracted in step S402, and generates data of the geometry. Furthermore, the attribute decoding unit 442 decodes the sample (group) of the attribute extracted in step S402, and generates data of the attribute.

In step S404, the point cloud construction unit 451 reconstructs a point cloud (that is, 3D data) using the data (decoded sample (group)) of the geometry and the attribute generated in step S403. That is, the point cloud construction unit 451 reconstructs a point cloud of a desired region with a desired definition.

In step S405, the presentation processing unit 452 generates presentation information by performing rendering or the like using the point cloud reconstructed in step S404. The presentation processing unit 413 supplies the presentation information to the outside of the reproduction device 400 for presentation.

When the processing of step S405 ends, the reproduction processing ends.

By executing each process as described above, the reproduction device 400 can obtain a similar effect to the case of <3. Transmission of Space Configuration Information and Dependency Information by Content File>. That is, the reproduction device 400 can suppress an increase in the load of the reproduction processing.

5. Transmission of Space Configuration Information and Dependency Information by Control File

Method 1-3

The present technology can also be applied to, for example, Moving Picture Experts Group phase-Dynamic Adaptive Streaming over HTTP (MPEG-DASH). For example, in a case where above-described Method 1 is applied, as illustrated in the second row from the top of the table of FIG. 35, in MPEG-DASH, the spatial configuration information of the above-described subgroup may be stored in Media Presentation Description (MPD) which is a control file that stores control information related to distribution of a bitstream (Method 1-3). Further, the quality information of the layer-group described above may be stored in the MPD.

For example, the information processing apparatus may include: a metadata generation unit that generates metadata including spatial configuration information of a subgroup on the basis of a bitstream of geometry of 3D data; and a control file generation unit that generates a control file that controls reproduction of a content file that stores the bitstream, and stores the metadata in the control file. Further, in the information processing method, the metadata including the spatial configuration information of the subgroup may be generated on the basis of the bitstream of the geometry of the 3D data, the control file for controlling the reproduction of the content file storing the bitstream may be generated, and the metadata may be stored in the control file.

Note that the subgroup is constituted by the geometry divided for each region in a layer-group constituted by one or more layers in the tree structure based on the definition of the geometry. Furthermore, the spatial configuration information includes information indicating the position and size of the region corresponding to the subgroup.

For example, the information processing apparatus may include: an analysis unit that analyzes a control file that controls reproduction of a content file that stores a bitstream of geometry of 3D data, and specifies an adaptation set necessary for obtaining a bitstream corresponding to a desired layer-group and a subgroup on the basis of spatial configuration information of the subgroup stored in the control file; an acquisition unit that acquires a track corresponding to the specified adaptation set of the content file; and a decoding unit that decodes a bitstream corresponding to the desired layer-group and subgroup stored in the acquired track. Furthermore, in the information processing method, a control file that controls reproduction of a content file that stores a bitstream of geometry of 3D data may be analyzed, an adaptation set necessary for obtaining a bitstream corresponding to a desired layer-group and a subgroup may be specified on the basis of spatial configuration information of the subgroup stored in the control file, a track corresponding to the specified adaptation set of the content file may be acquired, and a bitstream corresponding to the desired layer-group and subgroup stored in the acquired track may be decoded.

Note that the layer-group is constituted by one or more layers in the tree structure based on the definition of the geometry. The subgroup is configured by the geometry divided for each region in the layer-group. The spatial configuration information includes information indicating the position and size of the region corresponding to the subgroup.

Method 1-3-1

In a case where Method 1-3 is applied, in the file container (G-PCC file), the spatial configuration information of the subgroup may be stored in the sample entry, and the dependency information of the layer-group and the subgroup may be set in the track reference. In other words, in a case where Method 1-1-2 is applied, the spatial configuration information of the subgroup may be stored in the MPD of the DASH (Method 1-3-1). Further, the dependency information of the layer-group and the subgroup and the quality information of the layer-group may be stored in the MPD of the DASH.

FIG. 36 illustrates an example of a layer base descriptor in the case of Method 1-3-1. This layer base descriptor is stored in an adaptation set that refers to the layer base track. This layer base descriptor is stored in a supplemental property or an essential property newly defined in the adaptation set.

In FIG. 36, gplg.layerInfo indicates layer information. gplg.layerInfo@tileId indicates an identifier of a tile to which the layer information is applied. gplg.layerInfo.sub-Group indicates subgroup information. Only the information of the subgroup of the layer-group of the lowermost layer of the tree structure is stored. gplg.layerInfo.subGroup@layerGroupId is identification information of a layer-group. gplg.layerInfo.subGroup@subGroupId is identification information of a subgroup. gslg.layerInfo.layerGroup.sub-Group.spatialRegion is spatial configuration information indicating the position and size of the three-dimensional region corresponding to the subgroup (in the case of a layer-group in which no subgroup is set, the layer-group).

That is, the spatial configuration information and the like of the subgroup are stored in (the adaptation set referencing the layer base track of) the MPD as the layer base descriptor.

For example, the control file generation unit may store the spatial configuration information as the layer base descriptor in the adaptation set corresponding to the layer base track that stores the bitstream of the uppermost layer-group. Furthermore, the analysis unit may specify the adaptation set as the layer base descriptor on the basis of the spatial configuration information stored in the adaptation set corresponding to the layer base track that stores the bitstream of the uppermost layer-group.

In this way, the reproduction device that decodes the bitstream to reconstruct the 3D data and generates the viewport can easily obtain the spatial configuration information of the subgroup by referring to the MPD.

FIG. 37 illustrates an example of a layer id descriptor in the case of Method 1-3-1. This layer ID descriptor is stored in an adaptation set that refers to a layer base track or a layer track. This layer ID descriptor is stored in a newly defined supplemental property or essential property in the adaptation set.

In FIG. 37, gpli@layerGroupIds is identification information of a layer-group. gpli@numTreeDepth is the quality information of the layer-group corresponding to the layer_ group_id. More specifically, gpli@numTreeDepth indicates the number of geometry tree depths included in the layer-group. That is, gpli@numTreeDepth indicates the definition of each layer-group. gpli@subGroupIds is identification information of a subgroup.

That is, the quality information and the like of the layer-group are stored in (the adaptation set referencing the layer base track of) the MPD as the layer ID descriptor.

For example, the control file generation unit may store the quality information indicating the definition of the layer-group as the layer ID descriptor in the adaptation set corresponding to the layer base track and the adaptation set corresponding to the layer track storing the bitstream of the layer-group other than the uppermost layer. Furthermore, the analysis unit may specify the adaptation set on the basis of the quality information indicating the definition of the layer-group stored in the adaptation set corresponding to the layer base track and the adaptation set corresponding to the layer track storing the bitstream of the layer-group other than the uppermost layer as the layer ID descriptor.

In this way, the reproduction device that decodes the bitstream to reconstruct the 3D data and generates the viewport can easily obtain the quality information of the layer-group by referring to the MPD.

Note that the dependency information of the subgroup and the layer-group may be stored in the MPD using @dependencyId.

As described above, even in a case where Method 1-3-1 is applied, the reproduction device that decodes the bitstream to reconstruct the 3D data and generates the viewport can easily obtain the spatial configuration information of the subgroup and the quality information of the layer-group by referring to the MPD (without parsing the G-PCC bitstream). Furthermore, the reproduction device can easily obtain the dependency information of the subgroup and the layer-group by referring to the system layer of the G-PCC file. That is, by referring to the system layer of the MPD or the G-PCC file, the reproduction device can easily grasp the spatial configuration of each subgroup (the position, size, and the like of the three-dimensional region corresponding to the subgroup), the dependency between the layer-group and the subgroup, and the definition of each layer-group. Therefore, it is possible to suppress an increase in the load of the reproduction processing by the reproduction device. As a result, it is possible to suppress a decrease in the efficiency of the adaptive distribution, such as selecting and acquiring some tracks of the G-PCC file, decoding the bitstream of the 3D data in the tracks, and reconstructing some 3D data.

Method 1-3-2

In a case where Method 1-3 is applied, in the file container (G-PCC file), the spatial configuration information of the subgroup and the dependency information of the layer-group and the subgroup may be stored in the sample entry. In other words, in a case where Method 1-2-2 is applied, the spatial configuration information of the subgroup may be stored in the MPD of the DASH (Method 1-3-2). Further, the dependency information of the layer-group and the subgroup and the quality information of the layer-group may be stored in the MPD of the DASH.

FIG. 38 illustrates an example of a layer base descriptor in the case of Method 1-3-2.

In FIG. 38, gplg.layerInfo.layerGroup indicates layer-group information. The dependency relationships are listed in this order. gplg.layerInfo.layerGroup@id is identification information of a layer-group. gplg.layerInfo.layerGroup@numTreeDepth is the quality information of the layer-group. More specifically, gplg.layerInfo.layerGroup@numTreeDepth indicates the number of geometry tree depths included in the layer-group. That is, gplg.layerInfo.layerGroup@numTreeDepth indicates the definition of each layer-group. gplg.layerInfo.layerGroup.subGroup@id is identification information of the subgroup. gplg.layerInfo.layerGroup.subGroup@refId is identification information of a subgroup in which this subgroup has a dependency relationship. That is, it is the dependency information of the subgroup. gslg.layerInfo.layerGroup.subGroup.spatialRegion is spatial configuration information indicating the position and size of the three-dimensional region corresponding to the subgroup (in the case of a layer-group in which no subgroup is set, the layer-group).

That is, as the layer base descriptor, the spatial configuration information of the subgroup, the dependency information of the layer-group and the subgroup, the quality information of the layer-group, and the like are stored in (the adaptation set referencing the layer base track of) the MPD.

For example, the control file generation unit may store the quality information indicating the definition of the layer-group in the adaptation set corresponding to the layer base track as the layer base descriptor. Furthermore, the analysis unit may specify the adaptation set on the basis of the quality information indicating the definition of the layer-group stored in the adaptation set corresponding to the layer base track as the layer base descriptor. In addition, the control file generation unit may store the dependency information of the subgroup and the layer-group in the adaptation set corresponding to the layer base track as the layer base descriptor. Furthermore, the analysis unit may specify the adaptation set on the basis of the dependency information of the subgroup and the layer-group stored in the adaptation set corresponding to the layer base track as the layer base descriptor.

In this way, the reproduction device that decodes the bitstream to reconstruct the 3D data and generates the viewport can easily obtain the spatial configuration information of the subgroup, the dependency information of the layer-group and the subgroup, and the quality information of the layer-group by referring to the MPD.

FIG. 39 illustrates an example of a layer id descriptor in the case of Method 1-3-2. This layer ID descriptor is stored in an adaptation set that refers to a layer base track or a layer track.

In FIG. 39, gpli@layerGroupIds is identification information of a layer-group. gpli@subGroupIds is identification information of a subgroup.

As described above, even in a case where Method 1-3-2 is applied, the reproduction device that decodes the bitstream to reconstruct the 3D data and generates the viewport can easily obtain the spatial configuration information of the subgroup, the dependency information of the layer-group and the subgroup, and the quality information of the layer-group by referring to the MPD (without parsing the G-PCC bitstream). That is, by referring to the system layer of the MPD or the G-PCC file, the reproduction device can easily grasp the spatial configuration of each subgroup (the position, size, and the like of the three-dimensional region corresponding to the subgroup), the dependency between the layer-group and the subgroup, and the definition of each layer-group. Therefore, it is possible to suppress an increase in the load of the reproduction processing by the reproduction device. As a result, it is possible to suppress a decrease in the efficiency of the adaptive distribution, such as selecting and acquiring some tracks of the G-PCC file, decoding the bitstream of the 3D data in the tracks, and reconstructing some 3D data.

6. Second Embodiment

<File Generation Device>

Figure 40:
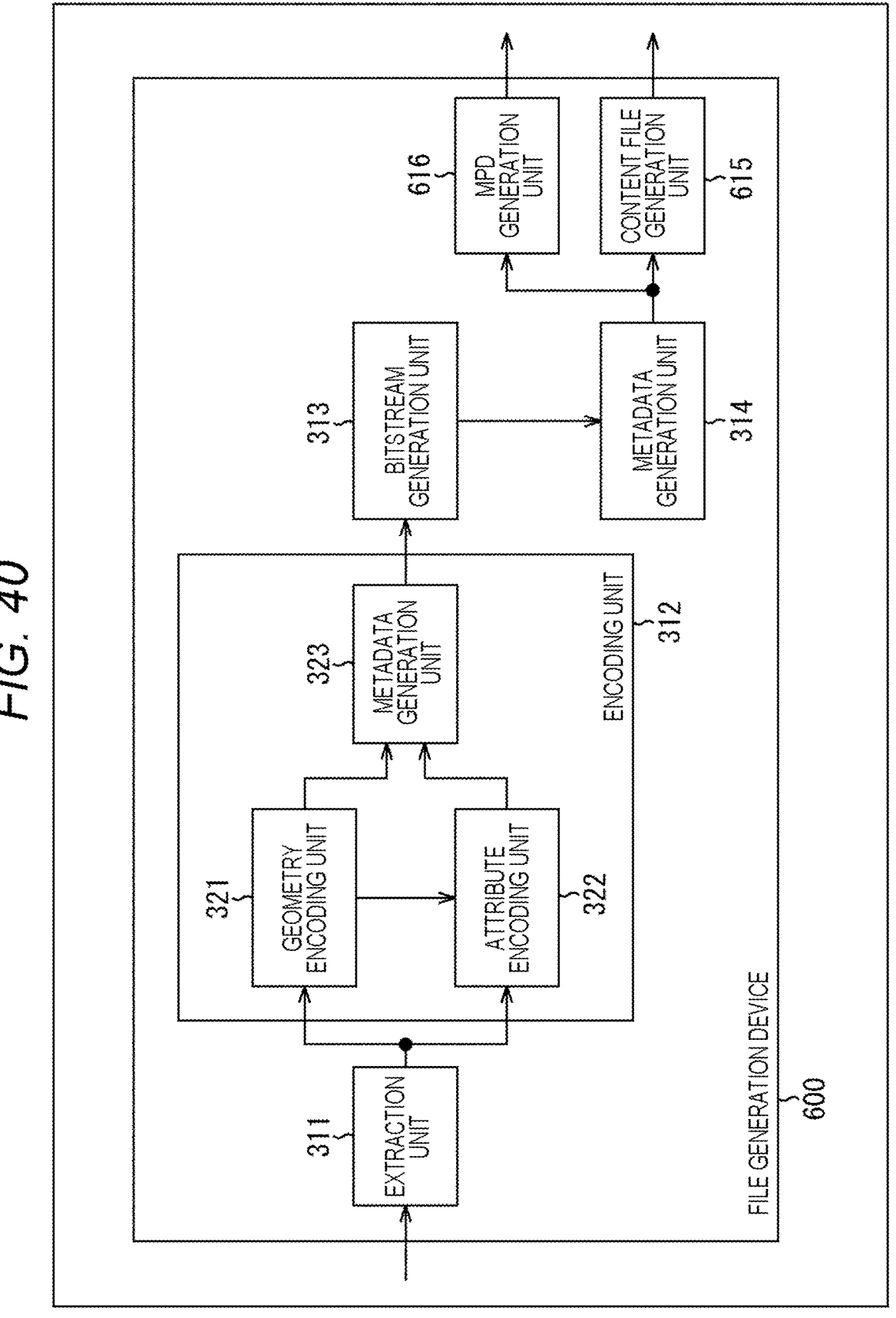
FIG. 40 is a block diagram illustrating a main configuration example of a file generation device.

(Each method of) the present technology described above can be applied to an arbitrary device. FIG. 40 is a block diagram illustrating an example of a configuration of a file generation device that is an aspect of the information processing apparatus to which the present technology is applied. Similarly to the file generation device 300, the file generation device 600 illustrated in FIG. 40 is a device that encodes point cloud data by applying G-PCC, and stores G-PCC content (G-PCC bitstream) generated by the encoding in a content file (ISOBMFF). However, the file generation device 600 further generates an MPD corresponding to the content file.

At that time, the file generation device 600 can apply the present technology described above in the chapter <3. Transmission of Space Configuration Information and Dependency Information by Content File> or <5. Transmission of Space Configuration Information and Dependency Information by Control File>. That is, the file generation device 600 may generate metadata including the spatial configuration information of the subgroup and the dependency information of the subgroup and the layer-group on the basis of the bitstream of the geometry of the 3D data, and generate a file that stores the bitstream and the metadata. In addition, the file generation device 600 may generate a control file (MPD) that controls reproduction of a content file that stores a bitstream, and store metadata including spatial configuration information of a subgroup in the control file.

Note that, in FIG. 40, main parts of processing units, data flows, and the like are illustrated, and those illustrated in FIG. 40 are not necessarily all. That is, in the file generation device 600, there may be a processing unit not illustrated as a block in FIG. 40, or there may be processing or a data flow not illustrated as an arrow or the like in FIG. 40.

As illustrated in FIG. 40, the file generation device 600 has a configuration basically similar to that of the file generation device 300 (FIG. 30). However, the file generation device 600 includes a content file generation unit 615 and an MPD generation unit 616 instead of the file generation unit 315.

Also in this case, the metadata generation unit 314 applies the present technology described above in <3. Transmission of Space Configuration Information and Dependency Information by Content File> or <5. Transmission of Space Configuration Information and Dependency Information by Control File>, and generates metadata including the spatial configuration information of the subgroup and the dependency information of the subgroup and the layer-group. At that time, the metadata generation unit 314 can apply an arbitrary method among the various methods described above in <3. Transmission of Space Configuration Information and Dependency Information by Content File> and <5. Transmission of Space Configuration Information and Dependency Information by Control File>. For example, the metadata generation unit 314 may include the quality information of the layer-group in the metadata. The metadata generation unit 314 supplies the generated metadata to the content file generation unit 615 together with the G-PCC bitstream. Further, the metadata generation unit 314 supplies the generated metadata to the MPD generation unit 616 together with the G-PCC bitstream.

The content file generation unit 615 applies the present technology described above in <3. Transmission of Space Configuration Information and Dependency Information by Content File>, generates a G-PCC file (content file) that stores the supplied G-PCC bitstream, and stores the metadata in the system layer. The content file generation unit 615 outputs the content file (G-PCC file) generated as described above to the outside of the file generation device 600.

The MPD generation unit 616 generates an MPD corresponding to the G-PCC file as a control file generation unit. Furthermore, the MPD generation unit 616 applies the present technology described above in the chapter <5. Transmission of Space Configuration Information and Dependency Information by Control File>, and stores the supplied metadata and the like in the MPD. That is, the MPD generation unit 616 stores at least the spatial configuration information of the subgroup in the MPD. At that time, the metadata generation unit 314 can apply an arbitrary method among the various methods described above in <5. Transmission of Space Configuration Information and Dependency Information by Control File>. The MPD generation unit 616 outputs the MPD generated as described above to the outside of the file generation device 600 (for example, a content file distribution server or the like).

With such a configuration, the file generation device 600 can obtain a similar effect to the case of <5. Transmission of Space Configuration Information and Dependency Information by Control File>. That is, the file generation device 600 can suppress an increase in the load of the reproduction processing.

<Flow of File Generation Processing>

Figure 41:
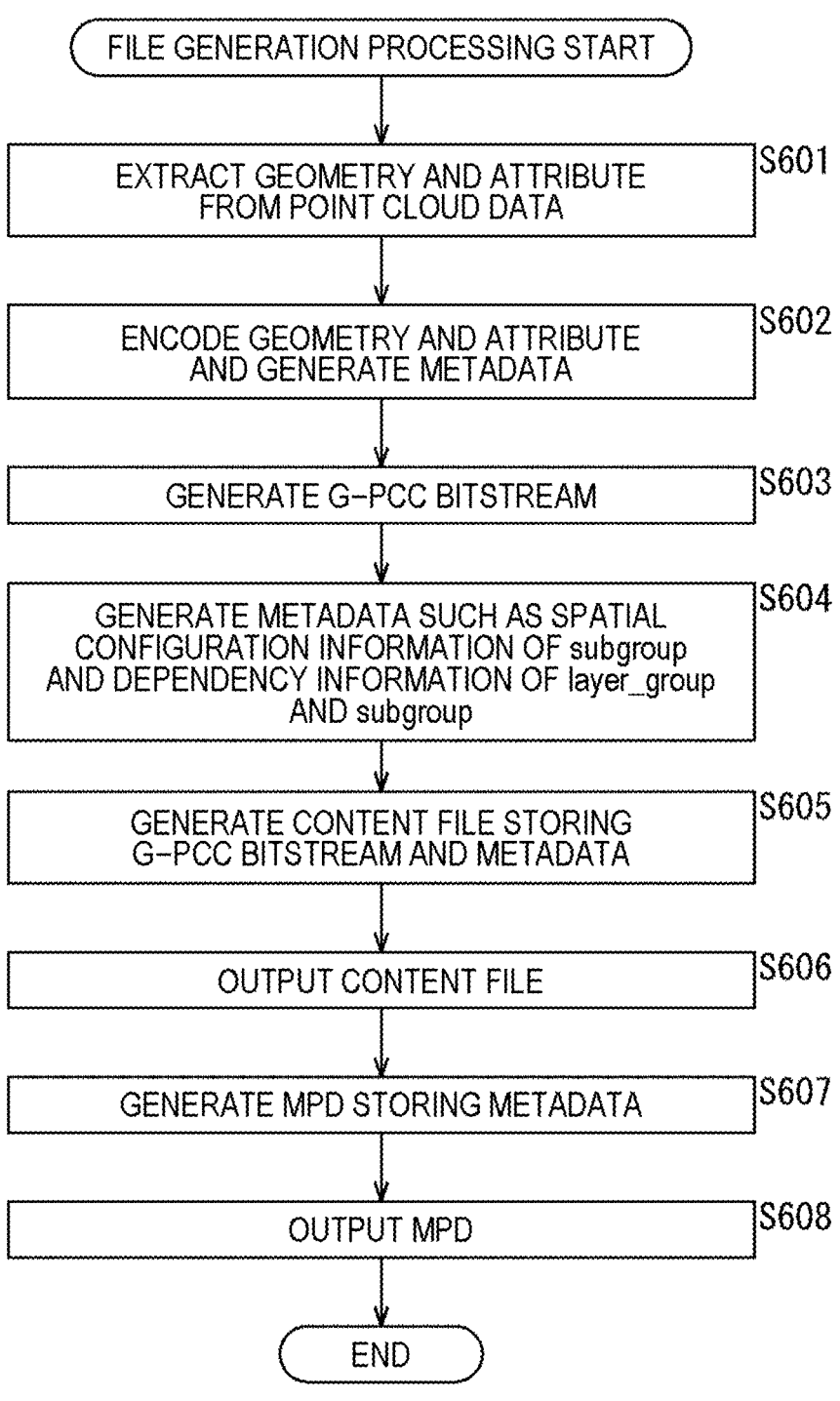
FIG. 41 is a flowchart illustrating an example of a flow of file generation processing.

An example of a flow of file generation processing executed by the file generation device 600 will be described with reference to a flowchart of FIG. 41.

When the file generation processing is started, each processing of steps S601 to S606 is executed similarly to each processing of steps S301 to S306 in the flowchart of the file generation processing of FIG. 31.

In step S607, the MPD generation unit 616 applies the present technology described in <5. Transmission of Space Configuration Information and Dependency Information by Control File>, generates the MPD corresponding to the content file generated in step S605, and stores the metadata including the spatial configuration information of the subgroup generated in step S604 in the MPD.

In step S608, the MPD generation unit 616 outputs the MPD to the outside of the file generation device 600. For example, the MPD is provided to a content file distribution server or the like.

When the processing of step S608 ends, the file generation processing ends.

By executing each processing as described above, the file generation device 600 can obtain a similar effect to the case of <5. Transmission of Space Configuration Information and Dependency Information by Control File>. That is, the file generation device 600 can suppress an increase in the load of the reproduction processing.

<Reproduction Device>

FIG. 42 is a block diagram illustrating an example of a configuration of a reproduction device that is an aspect of an information processing apparatus to which the present technology is applied. Similarly to the reproduction device 400, a reproduction device 700 illustrated in FIG. 42 is a device that decodes a content file, constructs a point cloud, and renders the point cloud to generate presentation information.

At that time, the reproduction device 700 can apply the present technology described above in <3. Transmission of Space Configuration Information and Dependency Information by Content File> or <5. Transmission of Space Configuration Information and Dependency Information by Control File>.

Note that, in FIG. 42, main parts of processing units, data flows, and the like are illustrated, and those illustrated in FIG. 42 are not necessarily all. That is, in the reproduction device 700, there may be a processing unit not illustrated as a block in FIG. 42, or there may be processing or a data flow not illustrated as an arrow or the like in FIG. 42.

As illustrated in FIG. 42, the reproduction device 700 basically has a similar configuration to the reproduction device 400 (FIG. 32). However, the reproduction device 700 includes a file acquisition unit 711 and an MPD analysis unit 712 instead of the file acquisition unit 411.

The file acquisition unit 711 acquires an MPD corresponding to a desired content file (content file to be reproduced) and supplies the MPD to the MPD analysis unit 712. In addition, the file acquisition unit 711 requests and acquires the track requested from the MPD analysis unit 712 among the tracks of the content file to the supply source of the content file to be reproduced. The file acquisition unit 711 supplies the acquired track (bitstream stored in the track) to the reproduction processing unit 412 (file processing unit 421).

When acquiring the MPD from the file acquisition unit 711, the MPD analysis unit 712 analyzes the MPD and selects a desired track. At that time, the MPD analysis unit 712 can apply the present technology described above in <5. Transmission of Space Configuration Information and Dependency Information by Control File>. For example, the MPD analysis unit 712 analyzes the MPD, and specifies an adaptation set necessary to obtain a bitstream corresponding to a desired layer-group and subgroup on the basis of spatial configuration information of the subgroup stored in the MPD or the like. The MPD analysis unit 712 requests the file acquisition unit 711 to acquire the track corresponding to the specified adaptation set.

The decoding unit 422 applies the present technology described above in <5. Transmission of Space Configuration Information and Dependency Information by Control File>, and decodes the slice of the G-PCC content stored in the track supplied from the file acquisition unit 711.

With such a configuration, the reproduction device 700 can obtain a similar effect to the case of <5. Transmission of Space Configuration Information and Dependency Information by Control File>. That is, the reproduction device 700 can suppress an increase in the load of the reproduction processing.

<Flow of Reproduction Processing>

Figure 43:
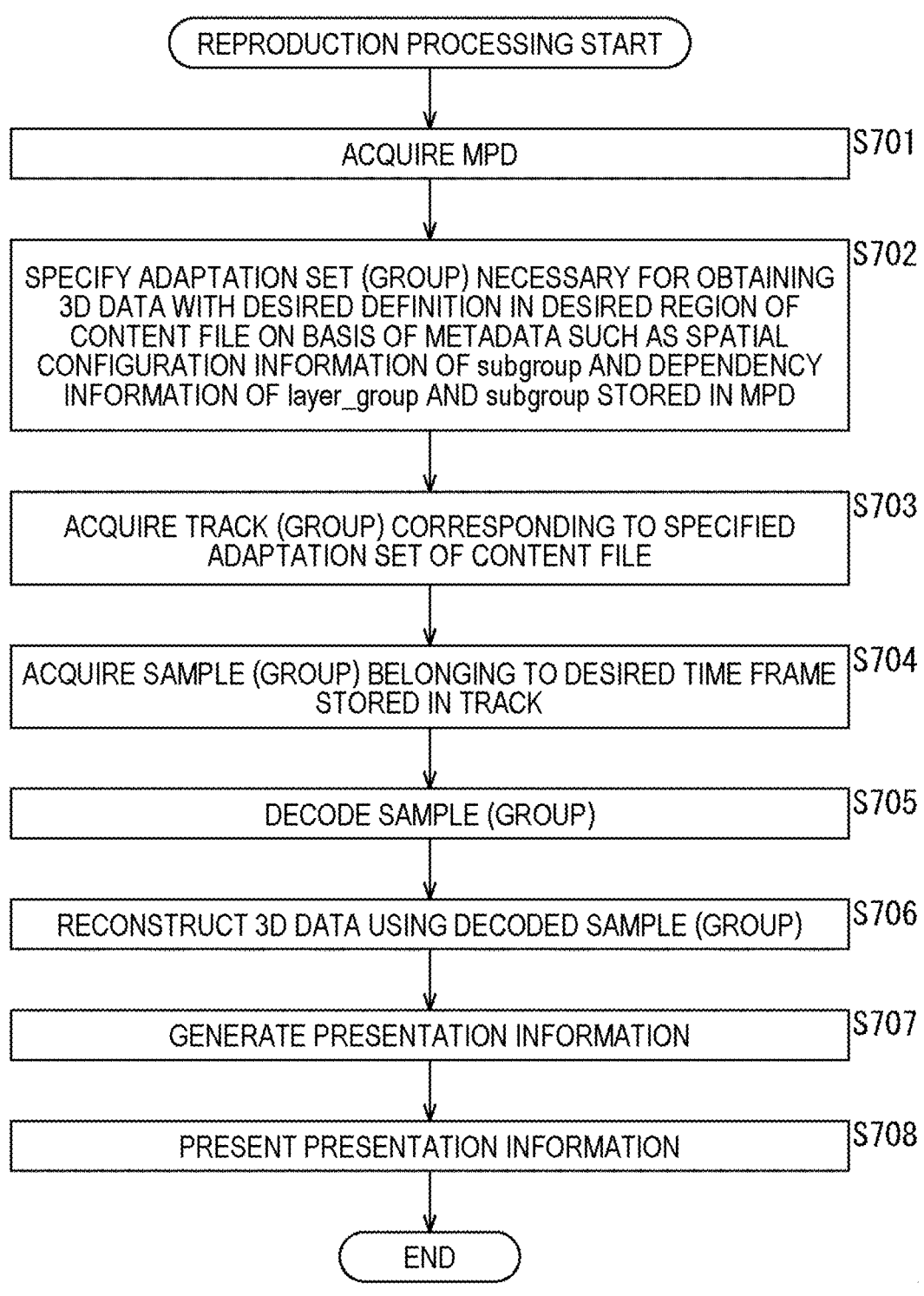
FIG. 43 is a flowchart illustrating an example of a flow of reproduction processing.

An example of a flow of reproduction processing executed by the reproduction device 700 will be described with reference to a flowchart of FIG. 43.

When the reproduction processing is started, the file acquisition unit 711 of the reproduction device 700 acquires the MPD corresponding to the content file to be reproduced in step S701.

In step S702, the MPD analysis unit 712 analyzes the acquired MPD, and specifies an adaptation set (group) necessary for obtaining 3D data of desired definition in a desired region of a content file on the basis of metadata such as spatial configuration information of a subgroup stored in the MPD.

In step S703, the file acquisition unit 711 acquires the track (group) corresponding to the adaptation set specified in step S702 of the content file to be reproduced.

Each processing of steps S704 to S708 is executed similarly to each processing of steps S402 to S406 of the reproduction processing of FIG. 34. When the processing of step S708 ends, the reproduction processing ends.

By executing each processing as described above, the reproduction device 700 can obtain a similar effect to the case of <5. Transmission of Space Configuration Information and Dependency Information by Control File>. That is, the reproduction device 700 can suppress an increase in the load of the reproduction processing.

7. Appendix

<Use With Tile Track>

In a case where the G-PCC file has a plurality of tracks, that is, for Method 1-1-2, Method 1-2-2, and Method 1-3 (including Method 1-3-1 and Method 1-3-2) described above, the tile track may be considered as a layer base track, and the G-PCC file may have a configuration of a layer base track and a layer track. In this manner, the above-described present technology may be applied to the configurations of the tile base track and the tile track. That is, in the G-PCC file, the configurations of the layer base track and the layer track and the configurations of the tile base track and the tile track may be used in combination.

<Computer>

The above-described series of processing can be executed by hardware or software. In a case where the series of processing is executed by software, a program that constitutes the software is installed in a computer. Here, the computer includes a computer incorporated in dedicated hardware, a general-purpose personal computer capable of executing various functions by installing various programs, and the like, for example.

FIG. 44 is a block diagram illustrating a configuration example of hardware of a computer that executes the above-described series of processing by a program.

In a computer 900 illustrated in FIG. 44, a central processing unit (CPU) 901, a read only memory (ROM) 902, and a random access memory (RAN) 903 are mutually connected via a bus 904.

An input/output interface 910 is also connected to the bus 904. An input unit 911, an output unit 912, a storage unit 913, a communication unit 914, and a drive 915 are connected to the input/output interface 910.

The input unit 911 includes, for example, a keyboard, a mouse, a microphone, a touch panel, an input terminal, and the like. The output unit 912 includes, for example, a display, a speaker, an output terminal, and the like. The storage unit 913 includes, for example, a hard disk, a RAM disk, a nonvolatile memory, and the like. The communication unit 914 includes a network interface, for example. The drive 915 drives a removable medium 921 such as a magnetic disk, an optical disk, a magneto-optical disk, or a semiconductor memory.

In the computer configured as described above, for example, the CPU 901 loads a program stored in the storage unit 913 into the RAM 903 via the input/output interface 910 and the bus 904 and executes the program, whereby the above-described series of processing is performed. The RAM 903 also appropriately stores data and the like necessary for the CPU 901 to execute various processing.

The program executed by the computer can be applied by being recorded on, for example, the removable medium 921 as a package medium or the like. In this case, the program can be installed in the storage unit 913 via the input/output interface 910 by attaching the removable medium 921 to the drive 915.

Furthermore, the program can also be provided via a wired or wireless transmission medium such as a local area network, the Internet, or digital satellite broadcasting. In this case, the program can be received by the communication unit 914 and installed on the storage unit 913.

In addition, this program can be installed in the ROM 902 or the storage unit 913 in advance.

<Targets to which Present Technology is Applicable>

Although the case where the present technology is applied to the method of storing the G-PCC bitstream in ISOBMFF has been mainly described above, the application target of the present technology is arbitrary and is not limited to the above examples. That is, the format of the file that stores the G-PCC bitstream is arbitrary, and is not limited to the ISOBMFF or the Matroska media container described above. Furthermore, an encoding/decoding method of 3D data (point cloud) is arbitrary, and is not limited to G-PCC. Furthermore, the format of the 3D data is arbitrary, and may be other than a point cloud. That is, as long as there is no contradiction with the features of the present technology described above, some or all of the specifications of the file, the encoding/decoding method, the 3D data, the generation/construction method thereof, and the like may be different from those of the above-described examples. In addition, some processes and specifications described above may be omitted.

Furthermore, the present technology can be applied to any configuration. For example, the present technology can be applied to various electronic devices.

Furthermore, for example, the present technology can also be implemented as a partial configuration of a device, such as a processor (for example, a video processor) as a system large scale integration (LSI) or the like, a module (for example, a video module) using a plurality of processors or the like, a unit (for example, a video unit) using a plurality of modules or the like, or a set (for example, a video set) obtained by further adding other functions to a unit.

Furthermore, for example, the present technology may also be applied to a network system including a plurality of devices. For example, the present technology may be implemented as cloud computing shared and processed in cooperation by a plurality of devices via a network. For example, the present technology may be implemented in a cloud service that provides a service related to an image (moving image) to any terminal such as a computer, an audio visual (AV) device, a portable information processing terminal, or an Internet of Things (IoT) device.

Note that, in the present specification, a system means a set of a plurality of components (devices, modules (parts), and the like), and it does not matter whether or not all the components are in the same housing. Consequently, both of a plurality of devices stored in different housings and connected via a network, and one device in which a plurality of modules is stored in one housing are systems.

<Field/Application to which Present Technology is Applicable>

The system, device, processing unit and the like to which the present technology is applied may be used in arbitrary fields such as traffic, medical care, crime prevention, agriculture, livestock industry, mining, beauty care, factory, household appliance, weather, and natural surveillance, for example. Furthermore, any application thereof may be used.

For example, the present technology can be applied to systems and devices used for providing content for appreciation and the like. Furthermore, for example, the present technology can also be applied to systems and devices used for traffic, such as traffic condition management and automated driving control. Moreover, for example, the present technology can also be applied to systems and devices used for security. Furthermore, for example, the present technology can be applied to systems and devices used for automatic control of a machine or the like. Moreover, for example, the present technology can also be applied to systems and devices provided for use in agriculture and livestock industry. Furthermore, the present technology can also be applied to systems and devices that monitor, for example, the status of nature such as a volcano, a forest, and the ocean, wildlife, and the like. Moreover, for example, the present technology can also be applied to systems and devices used for sports.

<Others>

Note that in the present specification, the "flag" is information for identifying a plurality of states, and includes not only information used for identifying two states of true (1) and false (0) but also information capable of identifying three or more states. Therefore, the value that may be taken by the "flag" may be, for example, a binary of 1/0 or a ternary or more. That is, the number of bits constituting this "flag" is arbitrary, and may be one bit or a plurality of bits. Furthermore, identification information (including the flag) is assumed to include not only identification information thereof in a bitstream but also difference information of the identification information with respect to a certain reference information in the bitstream, and thus, in the present specification, the "flag" and "identification information" include not only the information thereof but also the difference information with respect to the reference information.

Furthermore, various types of information (such as metadata) related to encoded data (bitstream) may be transmitted or recorded in any form as long as it is associated with the encoded data. Herein, the term "associate" is intended to mean to make, when processing one data, the other data available (linkable), for example. That is, the data associated with each other may be collected as one data or may be made individual data. For example, information associated with the encoded data (image) may be transmitted on a transmission path different from that of the encoded data (image). Furthermore, for example, the information associated with the encoded data (image) may be recorded in a recording medium different from that of the encoded data (image) (or another recording area of the same recording medium). Note that, this "association" may be not the entire data but a part of data. For example, an image and information corresponding to the image may be associated with each other in any unit such as a plurality of frames, one frame, or a part within a frame.

Note that, in the present specification, terms such as "combine", "multiplex", "add", "integrate", "include", "store", "put in", "introduce", "insert", and the like mean, for example, to combine a plurality of objects into one, such as to combine encoded data and metadata into one data, and mean one method of "associating" described above.

Furthermore, the embodiments of the present technology are not limited to the above-described embodiments, and various modifications are possible without departing from the scope of the present technology.

For example, a configuration described as one device (or processing unit) may be divided and configured as a plurality of devices (or processing units). Conversely, configurations described above as a plurality of devices (or processing units) may be combined and configured as one device (or processing unit). Furthermore, a configuration other than the above-described configurations may be added to the configuration of each device (or each processing unit). Moreover, when the configuration and operation of the entire system are substantially the same, a part of the configuration of a certain device (or processing unit) may be included in the configuration of another device (or another processing unit).

Furthermore, for example, the above-described program may be executed in an arbitrary device. In this case, the device is only required to have a necessary function (functional block, or the like) and obtain necessary information.

Furthermore, for example, each step in one flowchart may be executed by one device, or may be executed by being shared by a plurality of devices. Furthermore, in a case where a plurality of pieces of processing is included in one step, the plurality of pieces of processing may be executed by one device, or may be shared and executed by a plurality of devices. In other words, a plurality of pieces of processing included in one step can also be executed as processing of a plurality of steps. On the contrary, processing described as a plurality of steps can be collectively executed as one step.

Furthermore, for example, in a program executed by the computer, processing of steps describing the program may be executed in a time-series order in the order described in the present specification, or may be executed in parallel or individually at a required timing such as when a call is made. That is, as long as there is no contradiction, the processing of each step may be executed in an order different from the above-described order. Moreover, this processing of steps describing program may be executed in parallel with processing of another program, or may be executed in combination with processing of another program.

Furthermore, for example, a plurality of techniques related to the present technology can be implemented independently as a single body as long as there is no contradiction. A plurality of arbitrary present technologies can be implemented in combination. For example, part or all of the present technologies described in any of the embodiments can be implemented in combination with part or all of the present technologies described in other embodiments. Furthermore, a part or all of the present technologies described above may be implemented in combination with another technology not described above.

Note that the present technology can also have the following configuration.

(1) An information processing apparatus including:
  a metadata generation unit that generates metadata including spatial configuration information of a subgroup and dependency information of the subgroup and a layer-group on the basis of a bitstream of a geometry of 3D data; and
  a file generation unit that generates a file that stores the bitstream and the metadata,
  in which the layer-group is constituted by one or more layers in a tree structure based on definition of the geometry,
  the subgroup is configured by the geometry divided for each region in the layer-group,
  the spatial configuration information includes information indicating a position and a size of a region corresponding to the subgroup, and
  the dependency information is information indicating the subgroup or the layer-group as a reference destination.

(2) The information processing apparatus according to (1), in which the file generation unit stores the spatial configuration information in a sample entry of the file.

(3) The information processing apparatus according to (2), in which the file generation unit stores the spatial configuration information in a GPCC layer infobox in the sample entry.

(4) The information processing apparatus according to (3), in which the file generation unit stores the spatial configuration information in a layer infostruct in the GPCC layer infobox.

(5) The information processing apparatus according to any one of (2) to (4), in which the file generation unit stores quality information indicating definition of the layer-group in the sample entry.

(6) The information processing apparatus according to (5), in which the file generation unit stores the quality information in a GPCC layer quality infobox in the sample entry.

(7) The information processing apparatus according to (5), in which the file generation unit stores the quality information in a GPCC layer infobox in the sample entry.

(8) The information processing apparatus according to (7), in which the file generation unit stores the quality information in a layer infostruct in the GPCC layer infobox.

(9) The information processing apparatus according to any one of (2) to (8), in which the file generation unit is configured to:

store the bitstream of all of the layer-group and all of the subgroup in one track of the file; and store the dependency information in a sub sample information box of the file.

(10) The information processing apparatus according to (9), in which the file generation unit stores the dependency information in a codec specific parameter in the sub sample information box.

(11) The information processing apparatus according to any one of (2) to (8), in which the file generation unit is configured to:

store the bitstream in different tracks of the file for each of the layer-group and the subgroup; and set the dependency information in a track reference of the file.

(12) The information processing apparatus according to (11), in which the file generation unit sets information indicating the track for storing the bitstream of a lowermost layer-group as a reference destination in the track reference of a layer base track for storing the bitstream of an uppermost layer-group as the dependency information.

(13) The information processing apparatus according to (12), in which the file generation unit sets information indicating the track for storing the bitstream of an upper layer-group as a reference destination [to] in the track reference of the layer track for storing the bitstream of the layer-group other than the uppermost layer-group as the dependency information.

(14) The information processing apparatus according to any one of (2) to (8), in which the file generation unit is configured to:

store the bitstream of all of the layer-group and all of the subgroup in one track of the file; and store the dependency information in the sample entry.

(15) The information processing apparatus according to (14), in which the file generation unit stores the dependency information in a GPCC layer infobox in the sample entry.

(16) The information processing apparatus according to (15), in which the file generation unit stores the dependency information in a layer infostruct in the GPCC layer infobox.

(17) The information processing apparatus according to any one of (2) to (8), in which the file generation unit is configured to:

store the bitstream in different tracks of the file for each of the layer-group and the subgroup; and set the dependency information in the sample entry and a track reference of the file.

(18) The information processing apparatus according to (17), in which the file generation unit stores the dependency information in a GPCC layer infobox in the sample entry.

(19) The information processing apparatus according to (18), in which the file generation unit stores the dependency information in a layer infostruct in the GPCC layer infobox.

(20) The information processing apparatus according to any one of (17) to (19), in which the file generation unit sets information indicating all of the track for storing the bitstream of other layer-groups as a reference destination in the track reference of a layer base track for storing the bitstream of an uppermost layer-group as the dependency information.

(21) An information processing method including:

generating metadata including spatial configuration information of a subgroup and dependency information of the subgroup and a layer-group on the basis of a bitstream of a geometry of 3D data; and generating a file that stores the bitstream and the metadata, in which the layer-group is constituted by one or more layers in a tree structure based on definition of the geometry, the subgroup is configured by the geometry divided for each region in the layer-group, the spatial configuration information includes information indicating a position and a size of a region corresponding to the subgroup, and the dependency information is information indicating the subgroup or the layer-group as a reference destination.

(31) An information processing apparatus including:

an extraction unit that extracts a bitstream of a geometry of 3D data corresponding to a layer-group and a subgroup desired stored in a file on the basis of spatial configuration information of the subgroup and dependency information of the subgroup and the layer-group stored in the file as metadata; and a decoding unit that decodes the bitstream extracted, in which the layer-group is constituted by one or more layers in a tree structure based on definition of the geometry, the subgroup is configured by the geometry divided for each region in the layer-group, the spatial configuration information includes information indicating a position and a size of a region corresponding to the subgroup, and the dependency information is information indicating the subgroup or the layer-group as a reference destination.

(32) The information processing apparatus according to (31), in which the extraction unit extracts the bitstream on the basis of the spatial configuration information stored in a sample entry of the file.

(33) The information processing apparatus according to (32), in which the extraction unit extracts the bitstream on the basis of the spatial configuration information stored in a GPCC layer infobox in the sample entry.

(34) The information processing apparatus according to (33), in which the extraction unit extracts the bitstream on the basis of the spatial configuration information stored in a layer infostruct in the GPCC layer infobox.

(35) The information processing apparatus according to any one of (32) to (34), in which the extraction unit further extracts the bitstream on the basis of quality information indicating definition of the layer-group stored in the sample entry.

(36) The information processing apparatus according to (35), in which the extraction unit extracts the bitstream on the basis of the quality information stored in a GPCC layer quality infobox in the sample entry.

(37) The information processing apparatus according to (35), in which the extraction unit extracts the bitstream on the basis of the quality information stored in a GPCC layer infobox in the sample entry.

(38) The information processing apparatus according to (37), in which the extraction unit extracts the bitstream on the basis of the quality information stored in a layer infostruct in the GPCC layer infobox.

(39) The information processing apparatus according to any one of (32) to (38), in which, in the file, the bitstream of all of the layer-group and all of the subgroup is stored in one track, and the extraction unit extracts the bitstream on the basis of the dependency information stored in a sub sample information box of the file.

(40) The information processing apparatus according to (39), in which the extraction unit extracts the bitstream on the basis of the dependency information stored in a codec specific parameter in the sub sample information box.

(41) The information processing apparatus according to any one of (32) to (38), in which, in the file, the bitstream is stored in different tracks of the file for each of the layer-group and the subgroup, and the extraction unit acquires the track that stores the bitstream corresponding to the layer-group and the subgroup desired on the basis of the dependency information set in the track reference of the file, and extracts the bitstream from the track acquired.

(42) The information processing apparatus according to (41), in which the extraction unit refers to the track that stores the bitstream of a lowermost layer-group on the basis of the dependency information set [to] in the track reference of a layer base track that stores the bitstream of an uppermost layer-group.

(43) The information processing apparatus according to (42), in which the extraction unit refers to the track that stores the bitstream of an upper layer-group on the basis of the dependency information set in the track reference of a layer track that stores the bitstream of the layer-group other than the uppermost layer-group.

(44) The information processing apparatus according to any one of (32) to (38), in which, in the file, the bitstream of all of the layer-group and all of the subgroup is stored in one track, and the extraction unit extracts the bitstream on the basis of the dependency information stored in the sample entry.

(45) The information processing apparatus according to (44), in which the extraction unit extracts the bitstream on the basis of the dependency information stored in a GPCC layer infobox in the sample entry.

(46) The information processing apparatus according to (45), in which the extraction unit extracts the bitstream on the basis of the dependency information stored in a layer infostruct in the GPCC layer infobox.

(47) The information processing apparatus according to any one of (32) to (38), in which, in the file, the bitstream is stored in different tracks of the file for each of the layer-group and the subgroup, and the extraction unit acquires the track that stores the bitstream corresponding to the layer-group and the subgroup desired on the basis of the dependency information set in the sample entry and the track reference of the file, and extracts the bitstream from the track acquired.

(48) The information processing apparatus according to (47), in which the extraction unit extracts the bitstream on the basis of the dependency information stored in a GPCC layer infobox in the sample entry.

(49) The information processing apparatus according to (48), in which the extraction unit extracts the bitstream on the basis of the dependency information stored in a layer infostruct in the GPCC layer infobox.

(50) The information processing apparatus according to any one of (47) to (49), in which the extraction unit refers to all of the track for storing the bitstream of other layer-groups on the basis of the dependency information set in the track reference of a layer base track for storing the bitstream of an uppermost layer-group.

(51) An information processing method including:

extracting a bitstream of a geometry of 3D data corresponding to a layer-group and a subgroup desired stored in a file on the basis of spatial configuration information of the subgroup and dependency information of the subgroup and the layer-group stored in the file as metadata; and decoding the bitstream extracted, in which the layer-group is constituted by one or more layers in a tree structure based on definition of the geometry, the subgroup is configured by the geometry divided for each region in the layer-group, the spatial configuration information includes information indicating a position and a size of a region corresponding to the subgroup, and the dependency information is information indicating the subgroup or the layer-group as a reference destination.

(61) An information processing apparatus including:

a metadata generation unit that generates metadata including spatial configuration information of a subgroup on the basis of a bitstream of a geometry of 3D data; and a control file generation unit that generates a control file for controlling reproduction of a content file that stores the bitstream, and stores the metadata in the control file, in which the subgroup is configured by the geometry divided for each region in a layer-group constituted by one or more layers in a tree structure based on definition of the geometry, and the spatial configuration information includes information indicating a position and a size of a region corresponding to the subgroup.

(62) The information processing apparatus according to (61), in which the control file generation unit stores the spatial configuration information as a layer base descriptor in an adaptation set corresponding to a layer base track that stores the bitstream of an uppermost layer-group.

(63) The information processing apparatus according to (62), in which the control file generation unit stores quality information indicating definition of the layer-group as a layer ID descriptor in the adaptation set corresponding to the layer base track and the adaptation set corresponding to a layer track storing the bitstream of the layer-group other than the uppermost layer.

(64) The information processing apparatus according to (62), in which the control file generation unit stores quality information indicating definition of the layer-group as the layer base descriptor in the adaptation set corresponding to the layer base track.

(65) The information processing apparatus according to any one of (62) to (64), in which the control file generation unit stores dependency information of the subgroup and the layer-group as the layer base descriptor in the adaptation set corresponding to the layer base track.

(66) An information processing method including:

generating metadata including spatial configuration information of a subgroup on the basis of a bitstream of a geometry of 3D data; and generating a control file for controlling reproduction of a content file that stores the bitstream, and storing the metadata in the control file, in which the subgroup is configured by the geometry divided for each region in a layer-group constituted by one or more layers in a tree structure based on definition of the geometry, and the spatial configuration information includes information indicating a position and a size of a region corresponding to the subgroup.

(71) An information processing apparatus including:

an analysis unit that analyzes a control file that controls reproduction of a content file that stores a bitstream of a geometry of 3D data, and specifies an adaptation set necessary to obtain the bitstream corresponding to a layer-group and a subgroup desired on the basis of spatial configuration information of the subgroup stored in the control file;

an acquisition unit that acquires a track corresponding to the adaptation set specified of the content file; and a decoding unit that decodes the bitstream corresponding to the layer-group and the subgroup desired stored in the track acquired, in which the layer-group is constituted by one or more layers in a tree structure based on definition of the geometry, the subgroup is configured by the geometry divided for each region in the layer-group, and the spatial configuration information includes information indicating a position and a size of a region corresponding to the subgroup.

(72) The information processing apparatus according to (71), in which the analysis unit specifies, as a layer base descriptor, the adaptation set on the basis of the spatial configuration information stored in the adaptation set corresponding to a layer base track that stores the bitstream of an uppermost layer-group.

(73) The information processing apparatus according to (72), in which the analysis unit specifies, as a layer ID descriptor, the adaptation set on the basis of quality information indicating definition of the layer-group stored in the adaptation set corresponding to the layer base track and the adaptation set corresponding to a layer track storing the bitstream of the layer-group other than the uppermost layer.

(74) The information processing apparatus according to (72), in which the analysis unit specifies the adaptation set on the basis of quality information indicating definition of the layer-group stored in the adaptation set corresponding to the layer base track as the layer base descriptor.

(75) The information processing apparatus according to any one of (72) to (74), in which the analysis unit specifies the adaptation set on the basis of dependency information of the subgroup and the layer-group stored in the adaptation set corresponding to the layer base track as the layer base descriptor.

(76) An information processing method including:

analyzing a control file that controls reproduction of a content file that stores a bitstream of a geometry of 3D data, and specifying an adaptation set necessary to obtain the bitstream corresponding to a layer-group and a subgroup desired on the basis of spatial configuration information of the subgroup stored in the control file;

acquiring a track corresponding to the adaptation set specified of the content file; and decoding the bitstream corresponding to the layer-group and the subgroup desired stored in the track acquired, in which the layer-group is constituted by one or more layers in a tree structure based on definition of the geometry, the subgroup is configured by the geometry divided for each region in the layer-group, and the spatial configuration information includes information indicating a position and a size of a region corresponding to the subgroup.

REFERENCE SIGNS LIST

300 File generation device
311 Extraction unit
312 Encoding unit
313 Bitstream generation unit
314 Metadata generation unit
315 File generation unit
321 Geometry encoding unit
322 Attribute encoding unit
323 Metadata generation unit
400 Reproduction device
401 Control unit
411 File acquisition unit
412 Reproduction processing unit
413 Presentation processing unit
421 File processing unit
422 Decoding unit
423 Presentation information generation unit
431 Bitstream extraction unit
441 Geometry decoding unit
442 Attribute decoding unit
451 Point cloud construction unit
452 Presentation processing unit
600 File generation device
615 Content file generation unit
616 MPD generation unit
700 Reproduction device
711 File acquisition unit
712 MPD analysis unit
900 Computer

The invention claimed is:

1. An information processing apparatus comprising:
control circuitry configured to:
generate, on a basis of a bitstream of a geometry of 3D data, metadata including:
    first metadata including spatial configuration information of a subgroup, and
    second metadata including dependency information of the subgroup and a layer-group;
generate a file that stores the bitstream and the metadata; and
transmit the generated file,
wherein the first and second metadata are stored in respective predetermined first and second International Standards Organization Base Media File Format (ISOBMFF) entities,
wherein the layer-group is constituted by one or more layers in a tree structure based on a definition of the geometry,
wherein the subgroup is configured by the geometry, the geometry being divided for each region in the layer-group,
wherein the spatial configuration information includes information indicating a position and a size of a region in the layer-group corresponding to the subgroup, and
wherein the dependency information is information indicating the subgroup or the layer-group as a reference destination,
wherein the control circuitry stores the spatial configuration information in a sample entry of the file, the sample entry of the file being the first predetermined ISOBMFF entity,
wherein the first predetermined ISOBMFF entity in the sample entry comprises a Geometry-based point cloud compression (G-PCC) layer infobox, with the spatial configuration information being stored as a layer info-struct in the G-PCC layer infobox.

2. An information processing apparatus comprising:
control circuitry configured to:
generate, on a basis of a bitstream of a geometry of 3D data, metadata including:
    first metadata including spatial configuration information of a subgroup, and
    second metadata including dependency information of the subgroup and a layer-group;
generate a file that stores the bitstream and the metadata; and
transmit the generated file,
wherein the first and second metadata are stored in respective predetermined first and second International Standards Organization Base Media File Format (ISOBMFF) entities,
wherein the layer-group is constituted by one or more layers in a tree structure based on a definition of the geometry,
wherein the subgroup is configured by the geometry, the geometry being divided for each region in the layer-group,
wherein the spatial configuration information includes information indicating a position and a size of a region in the layer-group corresponding to the subgroup, and
wherein the dependency information is information indicating the subgroup or the layer-group as a reference destination,
wherein the control circuitry stores the dependency information in a codec specific parameter in a sub sample information box of the file, the sub sample information box being the second predetermined ISOBMFF entity, the dependency information being stored as codec_specific_parameters that are stored in the sub sample information box.

3. The information processing apparatus according to claim 2,
wherein the control circuitry stores the spatial configuration information in a sample entry of the file, the sample entry of the file being the first predetermined ISOBMFF entity.

4. The information processing apparatus according to claim 3,
wherein the control circuitry is configured to:
store the bitstream in different tracks of the file for each of the layer-group and the subgroup; and
set, as the dependency information, information indicating the track storing the bitstream of a lowermost layer-group as a reference destination in a track reference of a layer base track storing the bitstream of an uppermost layer-group.

5. The information processing apparatus according to claim 3,
wherein the control circuitry is configured to:
store the bitstream of all of the layer-group and all of the subgroup in one track of the file; and
store the dependency information in the sample entry.

6. The information processing apparatus according to claim 5,
wherein the control circuitry stores the dependency information in a layer infostruct in a Geometry-based point cloud compression (G-PCC) layer infobox in the sample entry.

7. The information processing apparatus according to claim 3, wherein the control circuitry is configured to:

store the bitstream in different tracks of the file for each of the layer-group and the subgroup; and set the dependency information in the sample entry and a track reference of the file.

8. The information processing apparatus according to claim 7, wherein the control circuitry stores the dependency information in a layer infostruct in a Geometry-based point cloud compression (G-PCC) layer infobox in the sample entry.

9. An information processing method performed by an information processing apparatus comprising:

on a basis of a bitstream of a geometry of 3D data, generating metadata including:

first metadata including spatial configuration information of a subgroup, and second metadata including dependency information of the subgroup and a layer-group;

generating a file that stores the bitstream and the metadata; and transmitting the generated file, wherein the first and second metadata are stored in respective predetermined first and second International Standards Organization Base Media File Format (ISOBMFF) entities, wherein the layer-group is constituted by one or more layers in a tree structure based on a definition of the geometry, wherein the subgroup is configured by the geometry, the geometry being divided for each region in the layer-group, wherein the spatial configuration information includes information indicating a position and a size of a region in the layer-group corresponding to the subgroup, and wherein the dependency information is information indicating the subgroup or the layer-group as a reference destination, wherein the spatial configuration information is stored in a sample entry of the file, the sample entry of the file being the first predetermined ISOBMFF entity, wherein the first predetermined ISOBMFF entity in the sample entry comprises a Geometry-based point cloud compression (G-PCC) layer infobox, wherein the spatial configuration information is stored as a layer infostruct in the G-PCC layer infobox, or wherein the spatial configuration information is stored in a sample entry of the file, the sample entry of the file being the first predetermined ISOBMFF entity, with the dependency information being stored in a codec specific parameter in a sub sample information box of the file, the sub sample information box being the second predetermined ISOBMFF entity, the dependency information being stored as codec specific parameters that are stored in the sub sample information box.

10. An information processing apparatus comprising:

control circuitry configured to:

receive a file that includes:

a bitstream of a geometry of 3D data corresponding to a layer-group and a subgroup, and metadata that includes:

first metadata including spatial configuration information of the subgroup, and second metadata including dependency information of the subgroup and the layer-group;

on a basis of the metadata, extract the bitstream of the geometry of the 3D data; and decode the extracted bitstream, wherein the first and second metadata are stored in respective predetermined first and second International Standards Organization Base Media File Format (ISOBMFF) entities, wherein the layer-group is constituted by one or more layers in a tree structure based on a definition of the geometry, wherein the subgroup is configured by the geometry, the geometry being divided for each region in the layer-group, wherein the spatial configuration information includes information indicating a position and a size of a region in the layer-group corresponding to the subgroup, and wherein the dependency information is information indicating the subgroup or the layer-group as a reference destination, wherein the control circuitry extracts the bitstream on a basis of the spatial configuration information stored in a sample entry of the file, the sample entry of the file being the first predetermined ISOBMFF entity, and wherein the first predetermined ISOBMFF entity in the sample entry comprises a Geometry-based point cloud compression (G-PCC) layer infobox, with the spatial configuration information being stored as a layer infostruct in the G-PCC layer infobox.

11. An information processing apparatus comprising:

control circuitry configured to:

receive a file that includes:

a bitstream of a geometry of 3D data corresponding to a layer-group and a subgroup, and metadata that includes:

first metadata including spatial configuration information of the subgroup, and second metadata including dependency information of the subgroup and the layer-group:

on a basis of the metadata, extract the bitstream of the geometry of the 3D data; and decode the extracted bitstream, wherein the first and second metadata are stored in respective predetermined first and second International Standards Organization Base Media File Format (ISOBMFF) entities, wherein the layer-group is constituted by one or more layers in a tree structure based on a definition of the geometry, wherein the subgroup is configured by the geometry the geometry being divided for each region in the layer-group, wherein the spatial configuration information includes information indicating a position and a size of a region in the laver-group corresponding to the subgroup, and wherein the dependency information is information indicating the subgroup or the layer-group as a reference destination, wherein the control circuitry extracts the bitstream on a basis of the dependency information stored in a codec specific parameter in a sub sample information box of the file, the sub sample information box being the second predetermined ISOBMFF entity, the dependency information being stored as codec_specific_parameters that are stored in the sub sample information box.

12. The information processing apparatus according to claim 11, wherein the control circuitry extracts the bitstream on a basis of the spatial configuration information stored in a sample entry of the file, the sample entry of the file being the first predetermined ISOBMFF entity.

13. The information processing apparatus according to claim 12, wherein, in the file, the bitstream is stored in different tracks of the file for each of the layer-group and the subgroup, and the control circuitry refers to the track that stores the bitstream of a lowermost layer-group on a basis of the dependency information set in a track reference of a layer base track that stores the bitstream of an uppermost layer-group.

14. The information processing apparatus according to claim 12, wherein, in the file, the bitstream of all of the layer-group and all of the subgroup is stored in one track, and the control circuitry extracts the bitstream on a basis of the dependency information stored in the sample entry.

15. The information processing apparatus according to claim 14, wherein the control circuitry extracts the bitstream on a basis of the dependency information stored in a layer infostruct in a Geometry-based point cloud compression (G-PCC) layer infobox in the sample entry.

16. The information processing apparatus according to claim 12, wherein, in the file, the bitstream is stored in different tracks of the file for each of the layer-group and the subgroup, and the control circuitry acquires the track that stores the bitstream corresponding to the layer-group and the subgroup on a basis of the dependency information set in the sample entry and the track reference of the file, and extracts the bitstream from the acquired track.

17. The information processing apparatus according to claim 16, wherein the control circuitry extracts the bitstream on a basis of the dependency information stored in a layer infostruct in a Geometry-based point cloud compression (G-PCC) layer infobox in the sample entry.

18. An information processing method performed by an information processing apparatus and comprising:

receiving a file that includes:

a bitstream of a geometry of 3D data corresponding to a layer-group and a subgroup, and metadata that includes:

first metadata including spatial configuration information of the subgroup, and second metadata including dependency information of the subgroup and the layer-group;

on a basis of the metadata, extracting the bitstream of the geometry of the 3D data;

decoding the extracted bitstream, wherein the first and second metadata are stored in respective predetermined first and second International Standards Organization Base Media File Format (ISOBMFF) entities, wherein the layer-group is constituted by one or more layers in a tree structure based on a definition of the geometry, the subgroup is configured by the geometry, the geometry being divided for each region in the layer-group, the spatial configuration information includes information indicating a position and a size of a region in the layer-group corresponding to the subgroup, and the dependency information is information indicating the subgroup or the layer-group as a reference destination; and one of:

extracting the bitstream on a basis of the spatial configuration information stored in a sample entry of the file, the sample entry of the file being the first predetermined ISOBMFF entity, the first predetermined ISOBMFF entity in the sample entry comprising a Geometry-based point cloud compression (G-PCC) layer infobox, with the spatial configuration information being stored as a layer infostruct in the G-PCC layer infobox, or extracting the bitstream on a basis of the dependency information stored in a codec specific parameter in a sub sample information box of the file, the sub sample information box being the second predetermined ISOBMFF entity, the dependency information being stored as codec specific parameters that are stored in the sub sample information box.

\* \* \* \* \*